United States Patent
Lafruit et al.

(10) Patent No.: US 6,640,015 B1
(45) Date of Patent: Oct. 28, 2003

(54) METHOD AND SYSTEM FOR MULTI-LEVEL ITERATIVE FILTERING OF MULTI-DIMENSIONAL DATA STRUCTURES

(75) Inventors: Gauthier Lafruit, St.-Lambrechts-Woluwe (BE); Lode Nachtergaele, Leuven (BE)

(73) Assignee: Interuniversitair Micro-Elektronica Centrum (IMEC VZW), Leuven (BE)

( * ) Notice: Subject to any disclaimer, the term of this patent is extended or adjusted under 35 U.S.C. 154(b) by 0 days.

(21) Appl. No.: 09/243,002

(22) Filed: Feb. 2, 1999

Related U.S. Application Data

(60) Provisional application No. 60/088,196, filed on Jun. 5, 1998.

(51) Int. Cl.[7] ............... G06T 5/00; G06F 17/14
(52) U.S. Cl. ............ 382/260; 382/240; 708/308; 708/401
(58) Field of Search .................. 382/260, 240, 382/304, 276; 375/240.19, 240.29; 708/308, 401

(56) References Cited

U.S. PATENT DOCUMENTS

| | | | | |
|---|---|---|---|---|
| 4,709,394 A | | 11/1987 | Bessler et al. ............ | 382/240 |
| 5,048,111 A | * | 9/1991 | Jones et al. ............. | 382/240 |
| 5,561,617 A | * | 10/1996 | van der Wal ............ | 708/308 |

FOREIGN PATENT DOCUMENTS

| | | | | |
|---|---|---|---|---|
| EP | 0 574 969 A2 | 5/1993 | ........... | G06F/15/68 |
| EP | 0 444 874 A2 | 2/1997 | ........... | G06F/15/68 |

OTHER PUBLICATIONS

"The Lifting Scheme: A New Philosophy in Biorthogonal Wavelet Constructions" Wim Sweldens, Proc. of the SPIE Conference, vol. 2569, pp. 68–79, 1995.

"VSLI architectures for Discrete Wavelet Transforms" Keshab K. Parhi & Takao Nishitani, IEEE Transactions on VSLI Systems, vol. 1, No. 2, Jun. 1993.

"Calculation Of Minimum Number Of Registers In 2–D Discrete Wavelet Transforms Using Lapped Block Processing" Tracy C. Denk & Keshab K. Parhi, IEEE Int. Symposium on Circuit and Systems, vol. 3, pp. 77–80, May 1994.

"The Recursive Pyamid Algorithm for the Discrete Wavelet Transform" M. Vishwanath, IEEE Transations on Signal Processing, vol. 42, No. 3, pp. 673–676, Mar. 1994.

"A VLSI Architecture for Real–Time Hierarchical Encoding/Decoding of Video using the Wavelet Transform" M. Vishwanath & Chaitali Chakrabarti, Proceedings of the International Conference on Acoustics, Speech and Signal Processing, Adelaide, Australia, pp. II–401, II–404, Apr. 1994.

\* cited by examiner

*Primary Examiner*—Scott Rogers
(74) *Attorney, Agent, or Firm*—Knobbe, Martens, Olson & Bear, LLP

(57) ABSTRACT

A system and method for multi-level iterative filtering of a data structure, e.g., an image, wherein elements of the data structure form the zero layer in the zero level and the data layer in each subsequent level is given by the results of one iteration. First, the method of the present system includes subdividing each level into a plurality of regions, there being data dependency between the data in one data layer in one level and the data layers in any other level of a region. Second, the method includes filtering each level by lapped-region processing. Lastly., the method includes scheduling the data processing of each level to provide substantially regional synchronization of the filtering at each level. In one embodiment, the sequence for traversing the regions is selected so that outputs from processing the regions are scheduled to occur at substantially equal time intervals. Also, in one embodiment, when the processing is stopped at the end of one region, the data dependencies in adjacent unprocessed regions are stored. The method of the present invention may be used for encoding or decoding.

40 Claims, 40 Drawing Sheets

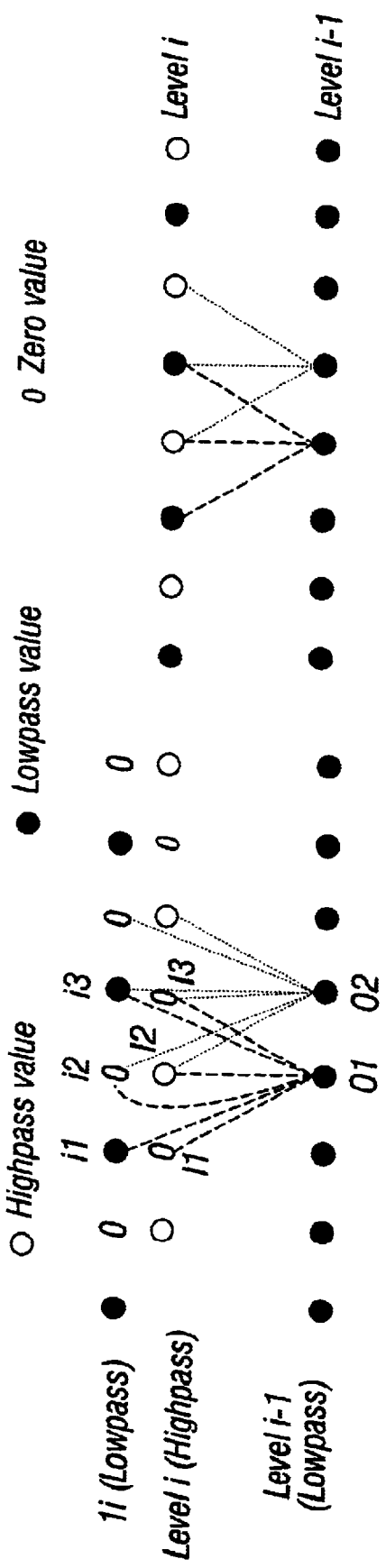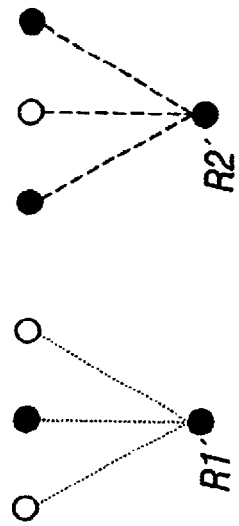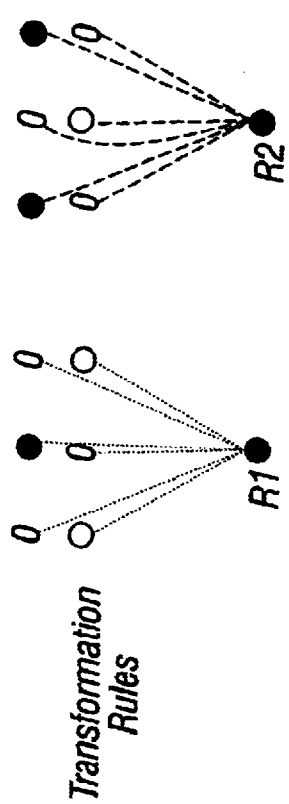
FIG. 23 A-1
FIG. 23 A-2
FIG. 23 B-1
FIG. 23 B-2

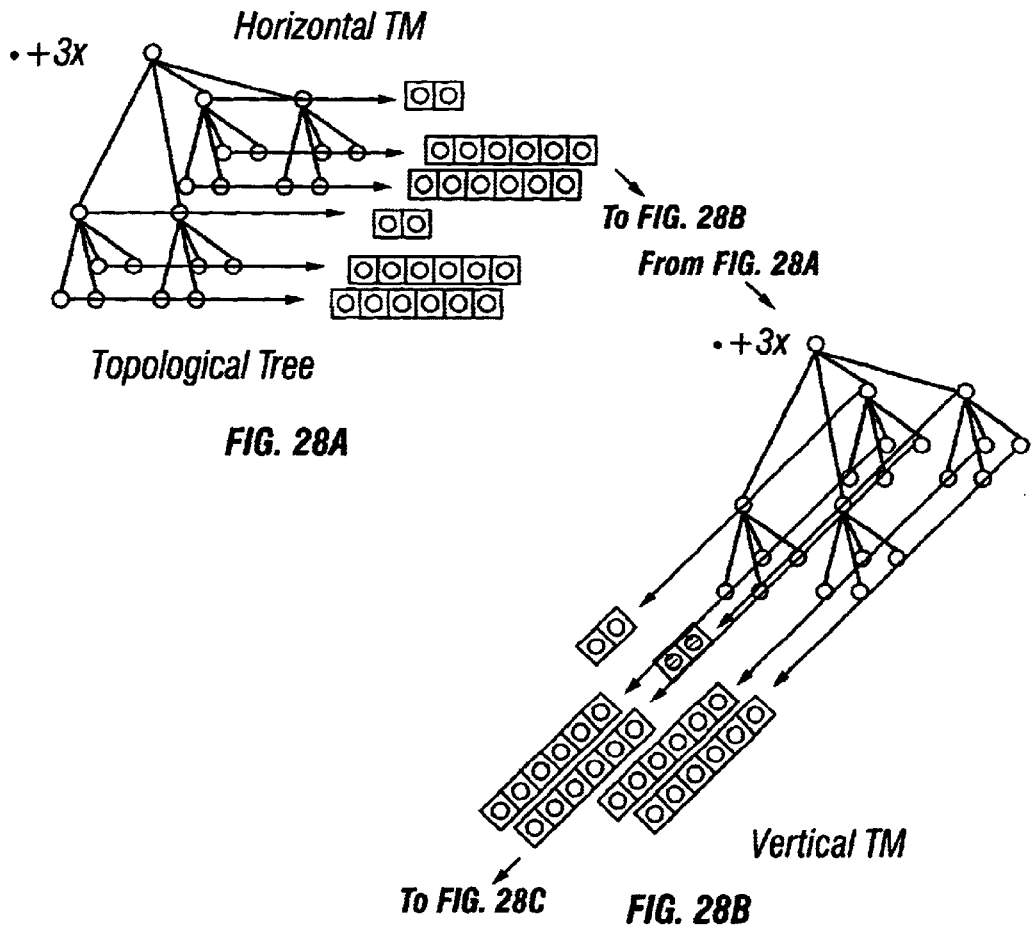
FIG. 28A Topological Tree / Horizontal TM
FIG. 28B Vertical TM
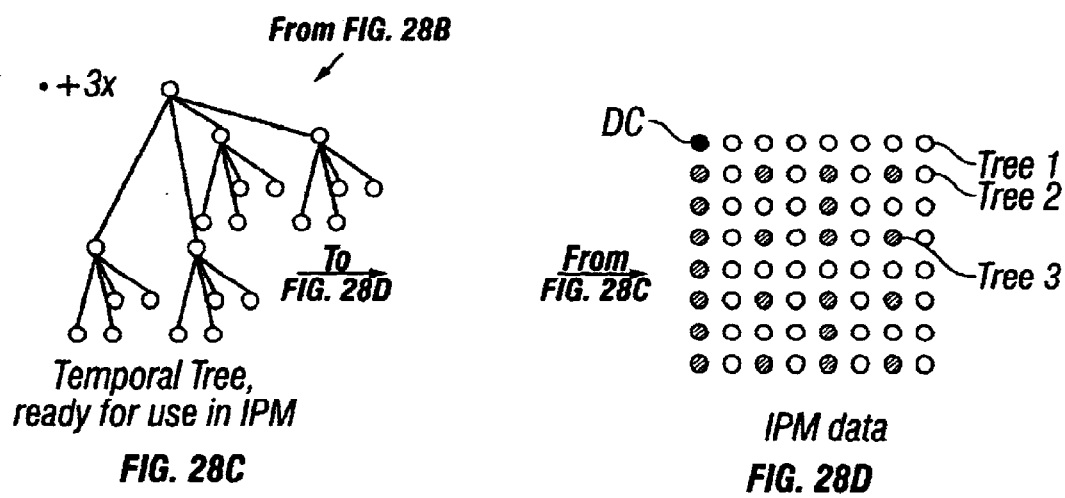
FIG. 28C Temporal Tree, ready for use in IPM
FIG. 28D IPM data

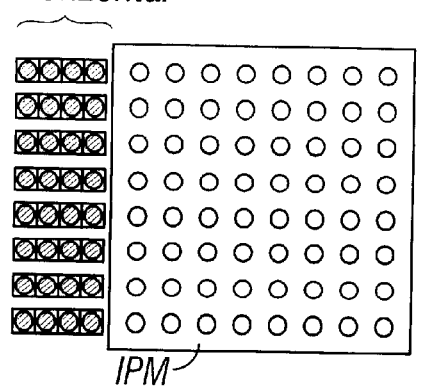
FIG. 28E
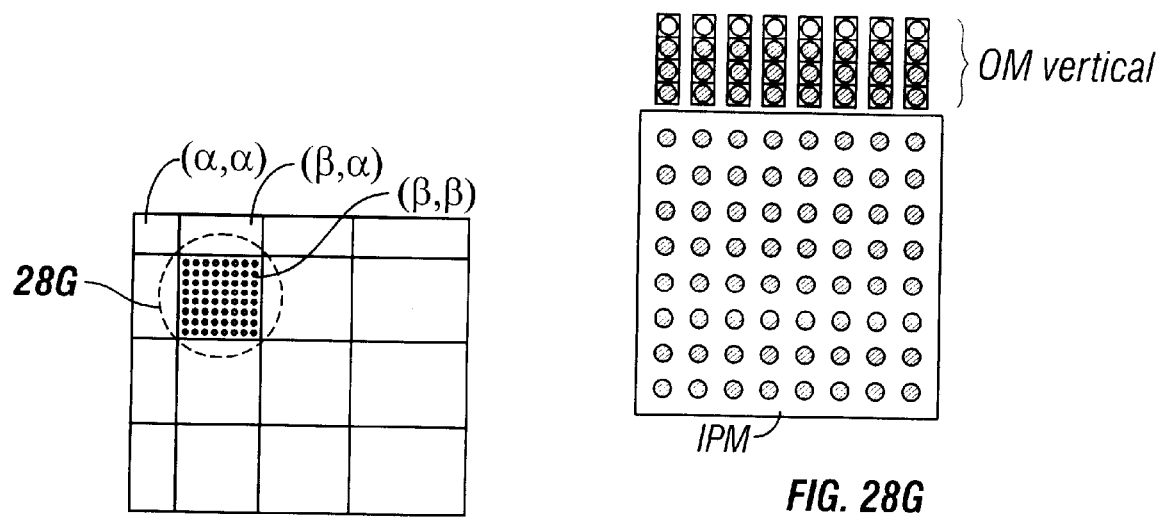
FIG. 28F
FIG. 28G

METHOD AND SYSTEM FOR MULTI-LEVEL ITERATIVE FILTERING OF MULTI-DIMENSIONAL DATA STRUCTURES

RELATED APPLICATIONS

This application claims priority to U.S. Provisional Patent Application No. 60/088,196, filed on Jun. 5, 1998 and European Patent Application No. 98200258.6, filed on Feb. 2, 1998.

BACKGROUND OF THE INVENTION

1. Field of the Inventions

The present invention relates to a method of multi-level iterative filtering of data structures of two dimensions or more and to a filtering system for carrying out the method which may be included in an encoder and/or a decoder. The present invention is particularly suitable for the filtering of image data.

2. Description of the Related Technology

In image processing systems, memory represents a high cost in size, power and speed, especially in multi-pass processing (e.g. iterative processing on multi-resolution data). In low-cost VLSI implementation styles, only limited-sized memories can be put on-chip, since for example, 10 kB cover already a silicon area of 11 mm$^2$ in 0.5 μm MIETEC CMOS triple layer metal technology. Off-chip memories, on the other hand, also represent a considerable cost, because read/write operations to and from external memory engender a power consumption that is typically orders of magnitude higher than the power consumption emanating from arithmetic operations. Furthermore, accesses to external memories are slow, compared to on-chip memory accesses, causing an impediment to the overall speed of the system. Real-time, power-efficient systems should therefore minimize the on-chip memory size and off-chip memory accesses.

Texture mapping on 3D objects in a virtual reality scene requires different texture resolutions, depending on the viewing distance. Current Discrete Cosine Transform (DCT) coding of textures only supports two levels of scalability (base layer+enhancement layer). Extending the number of resolution levels in a DCT scheme to more than two can be achieved with the multi-level Laplace Pyramid representation, at the expense of a 33% increase in the number of pixels to be coded. On the other hand, the wavelet texture coding, based on the Discrete Wavelet Transform (DWT), achieves an unlimited number of resolution levels, while providing excellent compression performance and is therefore better suited for applications requiring a large range of spatial scalability. FIGS. 1(a) and 2(a) show the algorithmic flow graphs of the multi-level DCT and Wavelet codings, respectively. Both schemes use essentially the same approach: a first stage transforms the image into a multi-resolution representation by successive filtering operations, and a second stage for the actual coding: parent-children coding for DWT, 8×8 block-oriented transform (DCT)-coding for DCT. With reference to FIG. 1(a), in multi-level DCT coding the input image 10 is filtered in the first filtering step 1 to form a high pass subimage 4 and a low pass subimage 11. High pass subimage 4 is output to the interface memory (IM) 8. The low pass subimage 11 is filtered in the second level filtering step 2 to form a high pass subimage 5 and a low pass subimage 12. Each filtering step 1,2,3 outputs a high pass subimage 4,5,6 to the IM 8. The low pass subimage 13 from the last filtering step (the highest level) is also output to the IM 8. Parent-children trees are indicated at 7. The stored subimages are compressed by DCT compression circuits 9 to form the transmitted compressed image.

With reference to FIG. 2(a), in multi-level DWT coding input image 10 is filtered in the first step 31 to form four subimages 11, 34–36. These subimages are referred to as LL (11), LH (36), HL (35) and HH (34). The LL subimage 11 contains the low frequency image information from both the vertical and the horizontal wavelet convolutions. The LH and HL subimages 36, 35 contain information from the vertical and horizontal wavelet convolutions whereby in each subimage each direction takes a different one, of the high frequency and low frequency image informations. The HH 34 transform contains the high frequency image information from both the vertical and horizontal wavelet convolutions. The LL subimage 11 is filtered in the second filtering step 32 to again form four LL, HH, HL and LH subimages 12, 37, 38, 39 respectively. The LL image 13 from the last filtering step (in the last level) is stored in the IM 8. The subimages 34–42 in the three levels are stored in the IM 8 before being compressed by the compression circuits 43, 44 for the HL, LH and HH subimages 34–42 and the LL subimage 13 respectively. Parent-children trees are shown at 7.

Note that the DWT coding requires information throughout the levels of the multi-resolution representation, while the DCT coding codes the blocks in each level separately. However, the DCT decoding does require a parent-children tree approach for the decoder memory optimization: all the DCT blocks that after decoding correspond to one particular 8×8 block in the decompressed image are preferably processed in the decoder simultaneously and should therefore be transmitted to the decoder as one cluster. Thus, the DCT encoding does not require the parent-children trees, but a memory optimized decoding process may exploit the data-dependencies of a parent-children tree. As a consequence, the data processing in the DWT and DCT encoders is essentially similar as seen from the memory optimization point of view: a successive filtering stage for obtaining the multi-resolution representation is followed by a coding stage with a parent-children data-dependency graph used at least in the decoding. Differences between the DCT and the DWT can be summarized as follows:

1. The parent-children data-dependency in the DCT codec is larger than in the wavelet codec: in the latter, the parent represents only one pixel, while in,the former, the parent extends over an 8×8 block.
2. The DWT inherently uses the multi-resolution representation for the image coding, while in the scalable DCT coding, the multi-resolution representation is an awkward pre-processing step that does not prepare the actual coding stage, i.e. the inter-relation between the levels is not exploited.
3. The number of pixels increases with 33% in the multi-resolution representation of the DCT codec, compared to the original image size, while the multi-level wavelet transformed image has the same size as the input image.
4. The arithmetic complexity of the multi-level DWT is typically smaller than that of its DCT counterpart.

These reasons indicate that DCT coding is not optimal for scalable coding.

In many applications it would be desirable to be able to change the resolution of not only the whole but also a part of a transmitted image. For instance in medical diagnosis many parts of an X-ray image or photograph are irrelevant whereas certain areas maybe vitally important and require maximum resolution (preferably-loss-free) and size. Where these images are transmitted via a telecommunications network (e.g. via the Internet), the availability of multiresolutional part images creates a difficulty. It is desirable to transmit an image with a reasonable resolution and size quickly which allows the viewer to decide generally on the suitability or correctness of the image. This initial transmission is preferably carried out at a high data compression of the image so as to provide high-speed transmission. Subsequently, the image resolution is preferably increasable selectively, i.e. it should be possible to change the resolution of a local area of the image without introducing artefacts at the borders of the local area and the main image. Dividing the image into blocks and compressing the image using the Discrete Cosine Transform (DCT) provides a method of transmitting a low resolution image quickly, however, the subsequent high fidelity areas may suffer from block artefacts. Using the Discrete Wavelet Transform (DWT) each level of resolution may be transmitted separately. Maximum resolution requires transmitting all the data derived from the image to the destination which has the disadvantage that maximum resolution can only be obtained after waiting for everything to arrive although the method does have the advantage that subsequent image improvement may be carried out at the destination and does not require additional transmissions. No currently available system provides both features: rapid transmission of a low resolution image followed by transmission of a limited amount of data to provide quick and efficient loss-free display of selectable zones of the image.

T. C. Denk, K. K. Parhi describe in an article entitled: "Calculation of minimum number of registers in 2-D discrete wavelet transforms using lapped block processing," *IEEE Int. Symposium on Circuit and Systems,* Vol. 3, pp. 77–80, London, England, May 1994 a technique for minimizing the on-chip memory requirements for the execution of the 2D wavelet transform iterative filtering process in a multi-processor architecture. No indication is given of how to adapt this technique to use less processors than one per level.

Aim of the Invention

It is an object of the present invention to provide a method and apparatus for efficient use of memory and/or memory accesses in the digital filtering of multi-dimensional data structures.

It is a further object of the present invention to provide a method and apparatus for digital filtering of multi-dimensional data structures which requires less processors than one per level.

It is still a further object of the present invention to provide a method and apparatus for digital filtering of multi-dimensional data structures which may be conveniently placed on a single chip.

SUMMARY OF THE INVENTION

The present invention may provide a method of multi-level iterative digital filtering of a data structure, whereby the elements of the data structure form the zero layer in the zero level and the data layer in each subsequent level is given by the results of one iteration, comprising the steps of: subdividing each level into a plurality of regions, there being data dependency between the data in one data layer in one level and the data layers in any other level of a region; filtering each level by lapped-region processing; and scheduling the data processing of each level to provide substantially regional synchronization of the filtering step at each level.

The present invention may also provide a method of multi-level iterative digital filtering of a data structure, whereby the elements of the data structure form the zero layer in the zero level and the data layer in each subsequent level is given by the results of one iteration, comprising the steps of: subdividing each level into a plurality of regions, there being data dependency between the data in one data layer in one level and the data layers in any other level of a region; filtering each level by lapped-region processing; and selecting the sequence for traversing the regions so that outputs from processing the regions are scheduled to occur at substantially equal time intervals.

The present invention may also provide a method of multi-level iterative digital filtering of a data structure, whereby the elements of the data structure form the zero layer in the zero level and the data layer in each subsequent level is given by the results of one iteration, comprising the steps of: subdividing each level into a plurality of regions, there being data dependency between the data in one data layer in one level and the data layers in any other level of a region; filtering each level by lapped-region processing; stopping the processing at the end of one region; and storing the data related to data dependencies included in adjacent unprocessed regions.

The present invention may also provide a filtering apparatus for multi-level iterative digital filtering of a data structure, whereby the elements of the data structure form the zero level and each subsequent level is defined by the results of one iteration, comprising: a control means for subdividing the data layer of each level into a plurality of regions, there being data dependency between the data in one data layer in one level and the data layers in any other level of a region; a filtering module for filtering each level by lapped-region processing, said filter module being adapted to schedule the data processing of each level to provide substantially regional synchronization of the filtering at each level.

The present invention may also provide a filtering apparatus for multi-level iterative digital filtering of a data structure, whereby the elements of the data structure form the zero level and each subsequent level is defined by the results of one iteration, comprising: a control means for subdividing the data layer of each level into a plurality of regions, there being data dependency between the data in one data layer in one level and the data layers in any other level of a region; a filtering module for filtering each level by lapped-region processing, said filter module being adapted to stop the processing at the end of one region and to store the data relating to data dependencies included in adjacent unprocessed regions.

Each of the above apparatuses may be used in an encoder. Further each of the above apparatuses may include means for individually carrying out any of the method steps of the appended method claims. Lapped regional processing may inlcude zero tree coding.

The present invention may further provide a filtering apparatus for multi-level iterative digital filtering of a multi-level representation of a data structure to reconstruct the data structure, the multi-level representation including data clusters, comprising: a filtering module for filtering the multi-level representation by lapped-cluster processing; a controller for controlling the flow of data through said filtering module, said controller being adapted to schedule the data processing in said filtering module so that substantially only the data which is required for reconstructing a region of the data structure is processed before beginning with the filtering process to reconstruct the next region of the data structure. The apparatus may be used in a decoder. A cluster may be a tree or part of a tree.

The present invention may provide a filtering apparatus for multi-level iterative digital filtering of a multi-level representation of a data structure to reconstruct the data structure, the multi-level representation including data clusters, comprising a filtering module for filtering the multi-level representation by lapped-cluster processing; a controller for controlling the flow of data through said filter module, said controller being adapted to stop the processing at the end of one region and to store the data relating to data dependencies included in adjacent non-reconstructed regions. The apparatus may be used in a decoder. Clusters can be trees or parts of trees.

Any of the above apparatuses (whether for encoding or decoding) may include at least one of an overlap memory, a tree memory and an inter pass memory.

The present invention may provide a method of multi-level iterative filtering of a multi-level representation of a data structure to reconstruct the data structure, the multi-level representation including data clusters, comprising the steps of: receiving the multi-level representation; filtering the representation by lapped cluster processing; scheduling the filtering process so that substantially only the data which is required for reconstructing a region of the data structure is processed before beginning with the filtering process to reconstruct the next region of the data structure.

The present invention may also provide a method and an apparatus for carrying out the method, for multi-level iterative filtering of a data structure in which the Lowpass and Highpass values of the iteration are created in couples, are treated as couples during arithmetic processing and are interleaved in memory, so that locality of reference is maintained.

The present invention may provide the advantage of the memory cost reduction obtained by algorithmic data reorganizations achieving a better behavioural match between the successive modules of the system. The inter-module buffer memories and their associated cost are therefore reduced. A reduction in memory size with one or two orders of magnitude can be obtained, while being very close to the minimal number of external (off-chip) memory accesses, ensuring high-speed, low-power capabilities. The present invention is particularly suitable for an application-specific, single-processor implementation of multi-resolution texture codecs.

The present invention may also provide a method and an apparatus for minimizing the memory size and access costs in a single-processor, scalable texture codec, which could be used in virtual world walkthroughs or facial animation scenes, e.g. in an MPEG-4 system. The present invention includes a method and an apparatus for carrying out the method, for optimising memory size and accesses during multi-level iterative filtering of a data structure, comprising the steps of:

subdividing the data structure into regions;

filtering the data structure by lapped region processing, the filtering step comprising the steps of:

determining which pixels in which levels of the multi-level iterative filtering are involved in the processing of a first region;

determining which pixels in which levels are involved in the processing of one or more second regions adjacent to the first region; and temporarily storing information generated while processing the first region which is required for processing the second regions. Regional synchronisation may be seen as the process of clustering an optimised number of pixels in the relevant levels of the multi-level iteration at the relevant time stamps in such a way that memory size is minimised by reducing the total number of pixels involved in the processing of any region while reducing the number of memory acesses by jumping as little as possible from one level to another in one region and only storing the least possible amount of data relevant for the processing of any other region which is not the currently processed region thus avoiding recalculation of this data when the other region is processed.

The dependent claims define further individual embodiments of the present invention. The present invention, its advantages and embodiments will now be described with reference to the following drawings.

BRIEF DESCRIPTION OF THE DRAWINGS

FIG. 1(*b*) is a schematic representation of a filtering stage of the codec in FIG. 1(*a*).

FIG. 2(*b*) is a schematic representation of a filtering stage of the codec in FIG. 2(*a*).

FIGS. 12(*a*2), (*b*2) and (*c*2) are temporal representations of the of the 1D HTA, VTA and MTA schedules respectively.

FIG. 23 is a detailed schematic representation of the transformation rules of FIG. 22(b).

FIGS. 28A to G are schematic representations of a decoding scheme in accordance with an embodiment of the present invention for a two-dimensional image showing the formation of temporal trees from topological trees.

DESCRIPTION OF THE ILLUSTRATIVE EMBODIMENTS

The present invention will be described with reference to certain embodiments and with reference to certain schematic drawings but the invention is not limited thereto but only by the claims. In particular the present invention will be described with reference to two-dimensional images but the invention is not limited thereto. The present invention is equally applicable to the multi-level iterative digital filtering of any multi-dimensional data structures. Further, the present invention will mainly be described with reference to DWT codecs but the present invention is generic and is therefore useful both for wavelet codecs, for multi-resolution DCT codecs and for similar codecs such as other hierarchical subband coding schemes. Further the present invention will mainly be described with reference to filtering of still images but the invention is not limited thereto and includes the use of the invention in filtering video data. The present invention will also mainly be described with reference to scalable DWT texture coding and the relevant terminology (parent-children tree, zero-trees, etc.) will be used but the present invention is not limited thereto, e.g. the methodology and results of the parent-children tree data-dependencies are equally applicable to a scalable DCT encoder. Still further, the present invention will mainly be described with reference to an encoder, but the present invention also relates to the corresponding decoder since there exists a symmetry between encoder and decoder. The present invention, therefore, also includes a filtering apparatus for a decoder in which the processing steps are performed in the opposite order to that of the encoder.

Figure 1A:
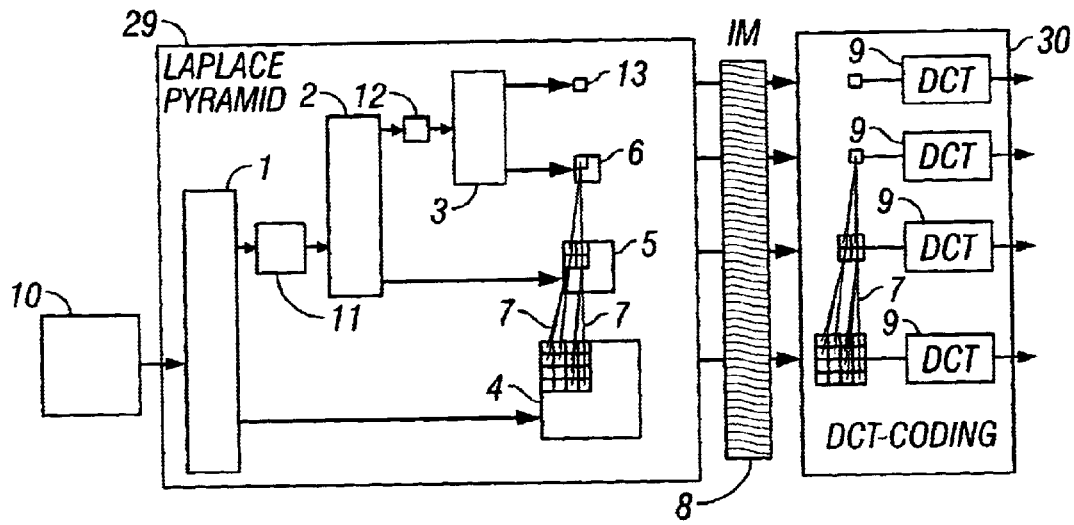
FIG. 1(*a*) shows a schematic representation of a scalable DCT codec based on a Laplace Pyramid.
Figure 1B:
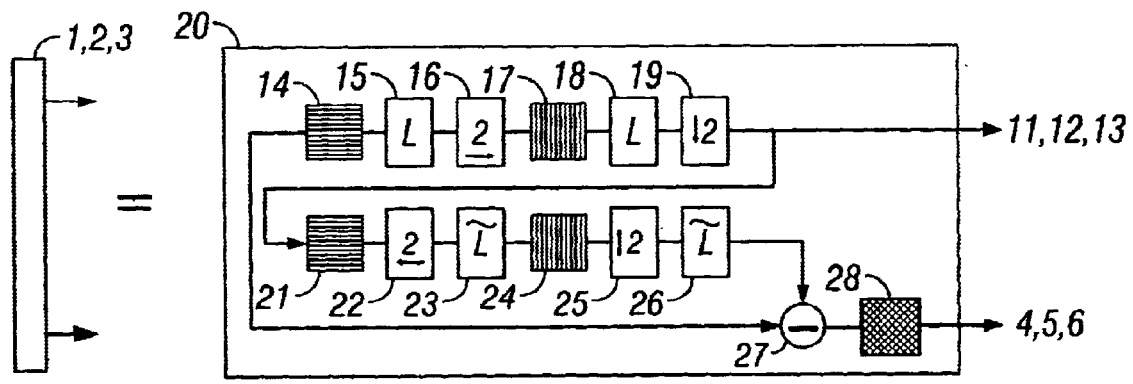

FIG. 1(b) is a schematic representation of a DCT filtering stage 20 which may be used with the present invention for any of the filtering steps 1, 2, 3 of FIG. 1(a). The filtering stage 20 outputs the low pass and high pass subimages 11, 4; 12, 5; 13, 6 of FIG. 1(a) respectively. To create low pass subimages 11–13, the input image or subimage is low pass filtered twice (L, 15, 18) and subsampled by rows and columns 16, 19, respectively using horizontal and vertical filtering memories 14, 17, respectively. The high pass subimages 4–6 are formed by the substraction 27 of the output 11–13 of the downsampled/upsampled output 11–13. The downsampling is performed by filtering steps 15, 18. The upsampling is performed by filtering steps 23, 26. L̄ The components of trees within the subimages 4–6 are stored in a special tree component memory 28.

Figure 2A:
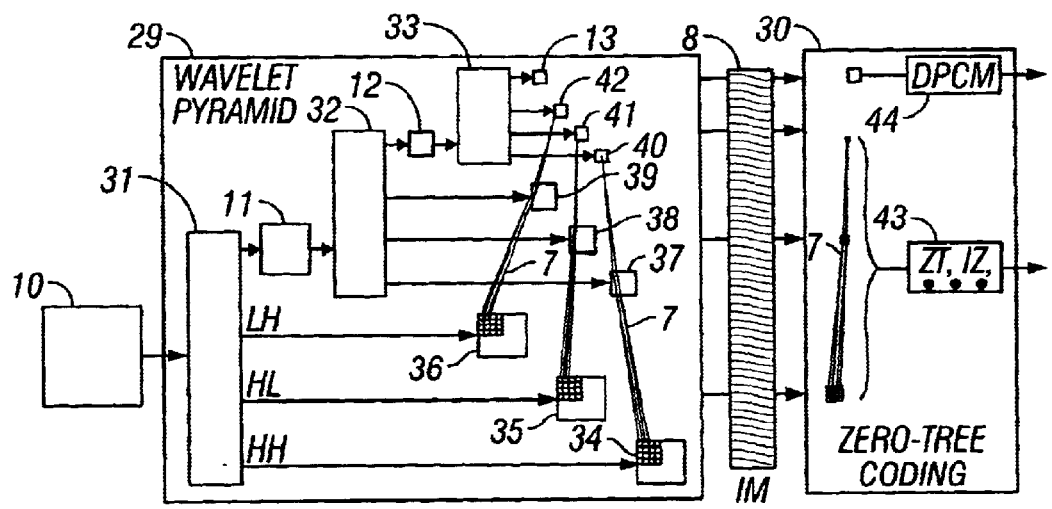
FIG. 2(*a*) shows a schematic representation of a scalable wavelet codec.
Figure 2B:
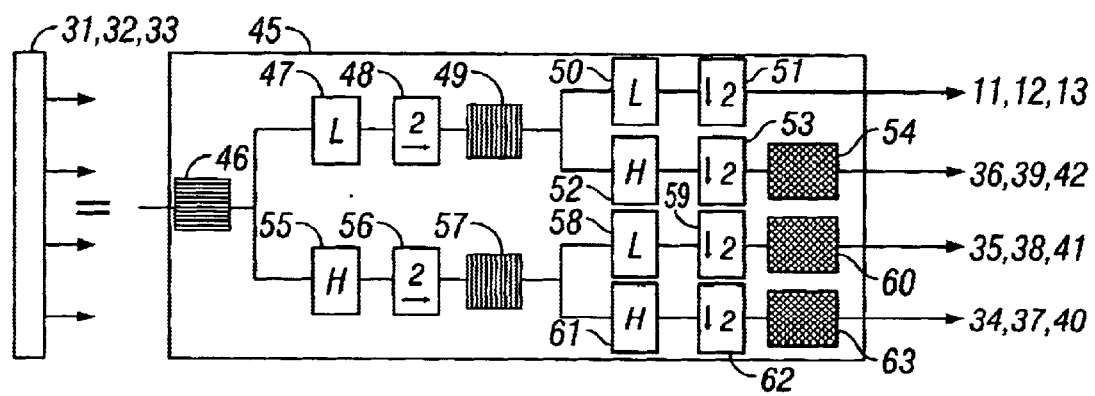

FIG. 2(b) is a schematic representation of a wavelet filtering stage 45 which may be used with the present invention to perform any of the filtering steps 31–33 of FIG. 2(a). The various subimages LL; LH; HL and HH 11–13; 36, 39, 42; 35, 38, 41; 34, 37, 40 are formed by consecutive low- or high-pass filtering steps 47, 50; 47, 52; 55, 58; 55, 61, respectively and subsampling and upsampling steps 48, 51, 53, 56, 59 and 62 on rows and columns as shown in FIG. 2(b). One horizontal filtering memory 46, two vertical filtering memories 49, 57 and three tree component memories 54, 60, 63 are required for the data processing.

The memories may be categorized by their algorithmic functionality (filtering memory, tree memory, interface memory) and their hardware functionality (foreground versus background memory). Filtering memory is involved in the filtering operations. It typically consists of a FIFO memory that stores the low-pass values of level i–1, on which the filtering is performed for creating the data values of level i. This memory is indicated as "FM" in FIGS. 1(b) and 2(b). Tree memory contains samples that are involved in the creation of parent-children trees 7, e.g. the HL, LH and HH values for the 2D-DWT and the Highpass values of the Laplace Pyramid for DCT coding (see FIGS. 1(a) and 2(a)). It is labelled as "TM" in FIGS. 1(b) and 2(b). IM 8 is needed for transferring data between two contiguous modules 29, 30 in a system (see FIGS. 1(a) and 2(a)). If the creation flow of the data in one module 29 matches the data consumption flow in the next module 30, the IM 8 will be small. However, if the data created in the first module 29 cannot be consumed instantaneously in the next module 330, a large IM 8 will be required between the two modules 29, 30. Finally, foreground memory contains data that after storage into memory, is immediately retrieved for being used by the same or another process, e.g. a cache memory. Foreground memory is typically put on-chip. On the contrary, background memory contains data that is stored for later use, without being immediately consumed by any other process.

Background memory is typically much larger than foreground memory and is thus often put off-chip. A memory optimization process should involve the following actions, in descending order of importance:

- foreground memory is preferred over background memory,
- foreground memory should be as small as possible,
- external access to background memory for loading foreground memory should be minimized,
- background memory should be kept within acceptable limits, i.e. it must fit in existing RAM modules (SRAM, DRAM, etc.).

Generally, the number of tree and interface memory (TM and IM, respectively) accesses; as well as the write access cycle count of the filtering memory (FM), do not differ substantially in different traversal activations. Therefore, only the memory read accesses corresponding to the iterative filtering process need to be analyzed.

Figure 3A:
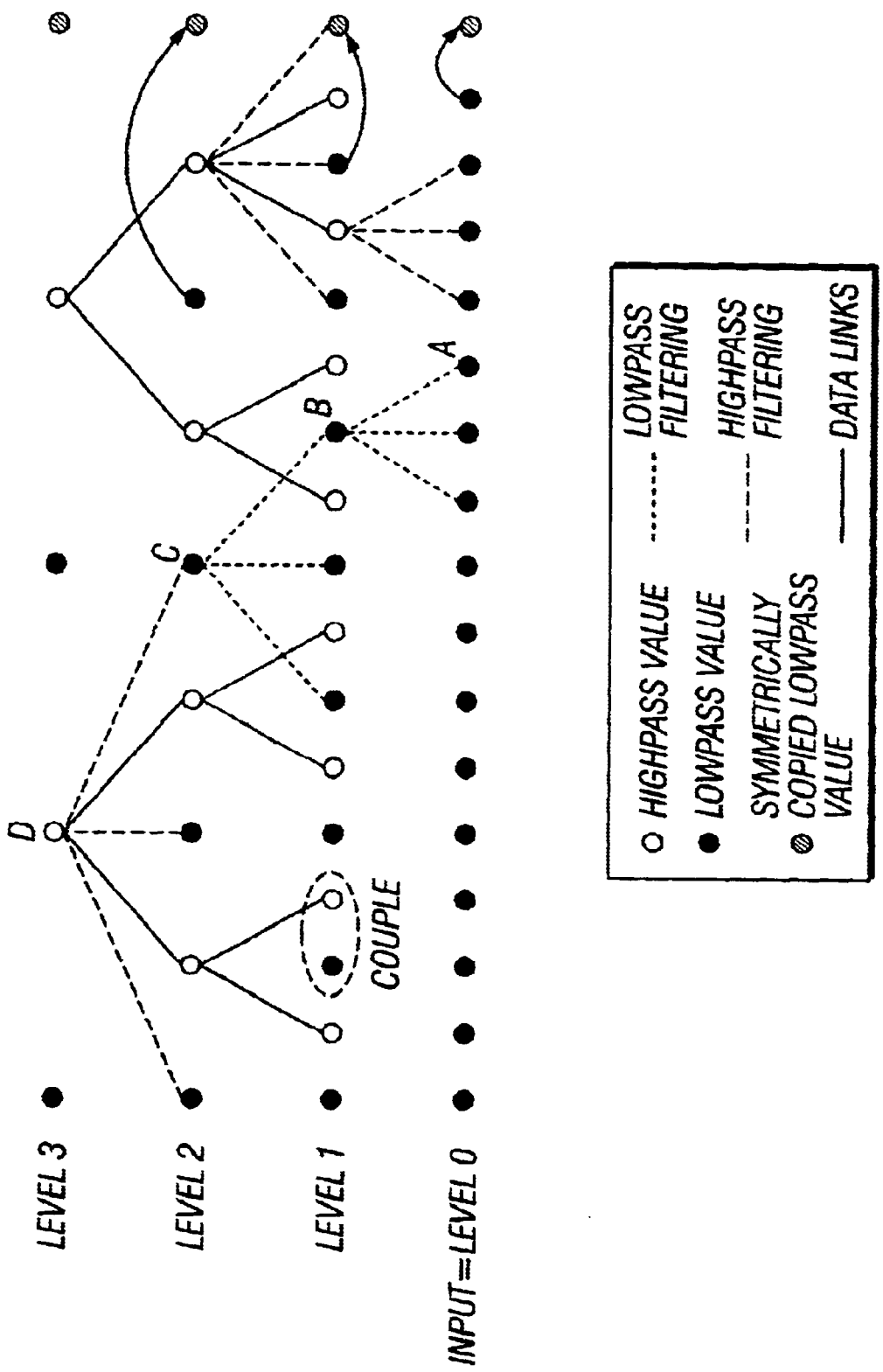
FIG. 3 shows the topological representations of the in-place data organisation of the 1D lifting scheme-based wavelet transform for a fictitious 3-tap wavelet, whereby FIG. 3(*a*) represents the multi-level wavelet transform with data-dependency links and parent-child trees and FIG. 3(*b*) summarizes the transformation rules.
Figure 3B:
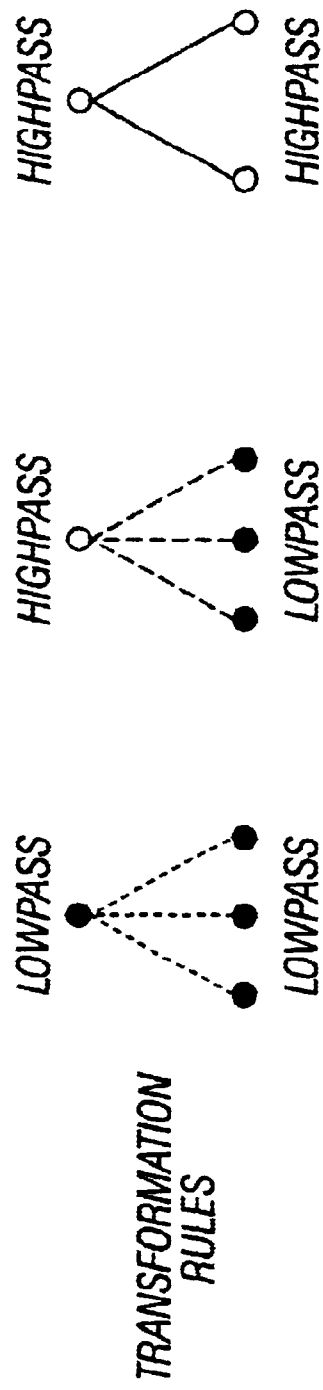

FIG. 3(a) shows a construction of the one dimensional (1D) DWT, using the in-place organization of Sweldens' Lifting Scheme, described in: W. Sweldens, "The Lifting Scheme: A New Philosophy in Biorthogonal Wavelet Constructions," *Proc. of the SPIE Conference,* Vol. 2569, pp. 68–79, 1995 or in: W. Sweldens, I. Daubechies, "Factoring Wavelet Transforms into Lifting Steps," AT&T technical report, No. BL0112170-960927-20TM, NJ, September 1996. The transformation rules are shown in FIG. 3(b). Three iteration levels are shown but the method may be applied to any number of levels. 3-tap filtering is shown but the present invention is not limited thereto and may be extended to any number of taps N where N is usually given by N=2M+1 where M is an integer. The Lowpass and Highpass values of level i shown in FIG. 3(a) are constructed by alternatively applying a Lowpass and Highpass filtering on the Lowpass values of level i−1, using rules A and B of FIG. 3(b), i.e. a low pass value in one level is calculated from three low pass values in the level below and a high pass value in one level is calculated from three low pass values in the level below. Where no image data exists at a boundary (e.g. an outer edge of the image) the adjacent image data to the boundary is simply copied as indicated in FIG. 3(a), a process which is usually described as providing symmetrical extensions at the boundaries. Parent-children trees are constructed by using rule C of FIG. 3(b), i.e. a tree is constructed from high-pass values taken from all the levels, whereby the number of values in a lower level is always twice the number in the next level above. For a limited number of samples, all these rules are explicitly shown in FIG. 3(a). The convention of these various types of links will be used in the figures so that the between one figure and the next can be followed.

Figure 3B:
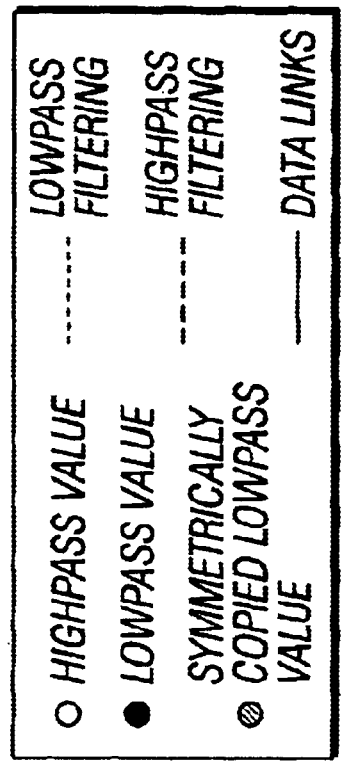

The main advantage of the Lifting Scheme is that the arithmetic complexity can be reduced asymptotically up to a factor 2 by calculating the Lowpass values from the Highpass values. Consequently, Low- and Highpass values are always created in couples, as indicated in FIG. 3(a). Thus, for every two Lowpass values in level i, one Lowpass and one Highpass value is created in level i+1, mimicking implicitly the subsampling operations (see FIG. 2(b)) in the wavelet transform. It is clear from FIG. 3(a) that much information must be processed in lower levels before a value can be created in the last level. For example, to obtain the Highpass value d in level 3 of FIG. 3(a), using a fictitious (fictitious, since the Lowpass and Highpass filters of biorthogonal wavelets do not have the same number of taps) biorthogonal 3-tap Lowpass/3-tap Highpass filter wavelet transform, the Lowpass values in level 0 (=input), level 1 and level 2 should be read/calculated up to the data-dependency line abcd. Such a line, called a Time Front, indicates up to which particular time stamp action(s) (filtering and/or grouping of data) should be taken. In a multi-processor architecture, one processor may be allocated to each level and the values of each level may be created at a speed determined only be the arrival rate of the data required for the processing. It is very convenient to skew the representation of FIG. 3(a) in order to obtain a straight, vertically-positioned Time Front line, resulting in the representation of FIG. 4 which is a so-called temporal representation of the wavelet transform of FIG. 3. All samples at the left of this Time Front line a, b, c, d have been read and/or created before the current time stamp, those at the right will be handled at future time stamps and those on the Time Front are read/created from a to d, at the current time stamp. This skewing process results from a start-up phenomenon: to create the first value in each level a differing amount of values must be processed. This means that the first values in the various levels are created at different times, the later the creation time, the higher the level. For the creation of the first sample in level i in the start-up phase by an iterative 2M+1 tap filter, $\alpha_i$ samples should be read from the input as given by the following equation.

$$\alpha_i = M \cdot (2^i - 1) + 1 \qquad \text{Eq.(1)}$$

This also implies that the first parent-children tree can only be created after having read $\alpha_L$ samples, with L representing the number of levels in the DWT. Table 1 tabulates the latencies $\alpha_i$ in different configurations.

Figure 5A:
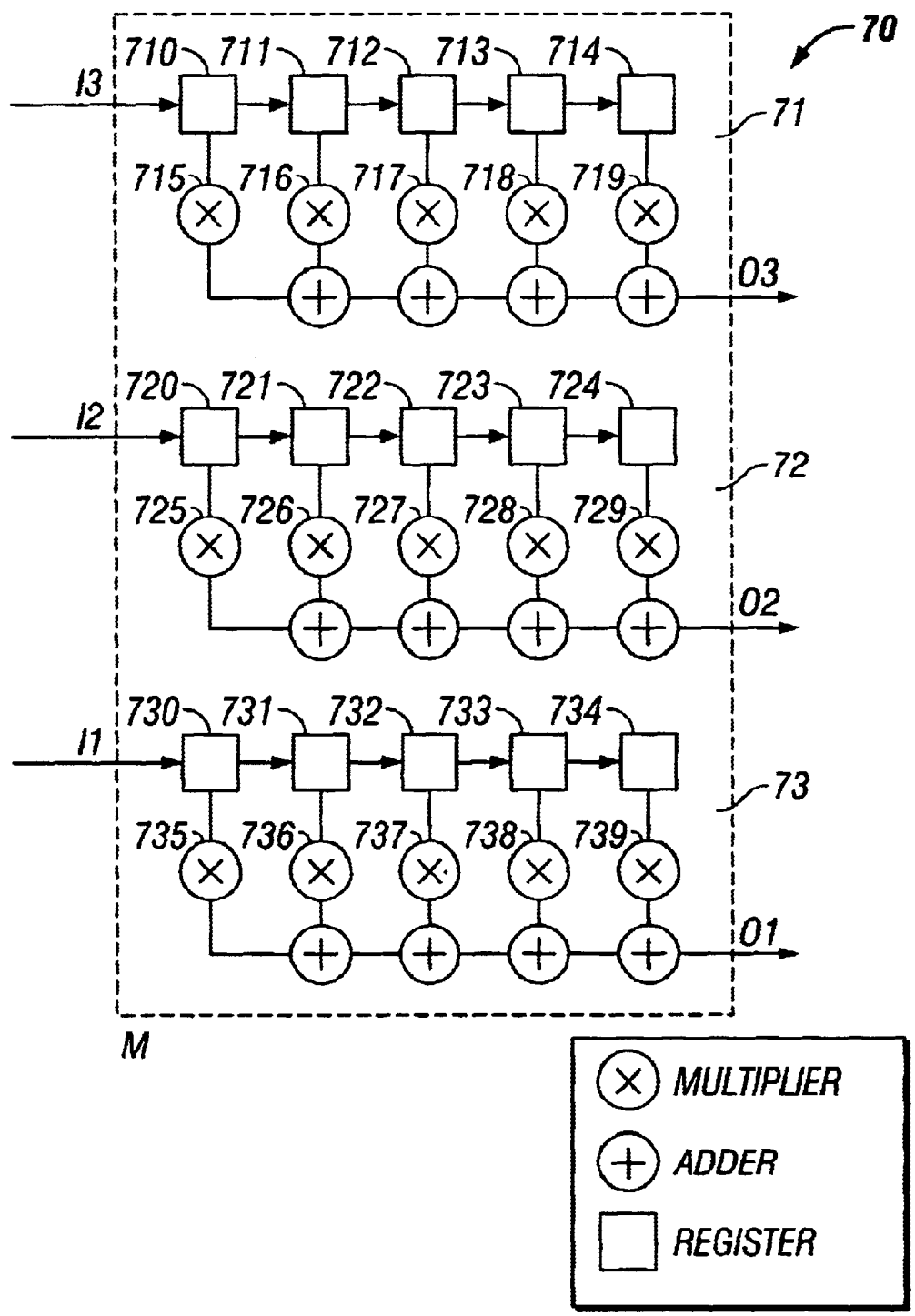
FIGS. 5(*a*), (*b*) and (*c*) are schematic representations of processor architectures which may be used with the present invention.
Figure 5B:
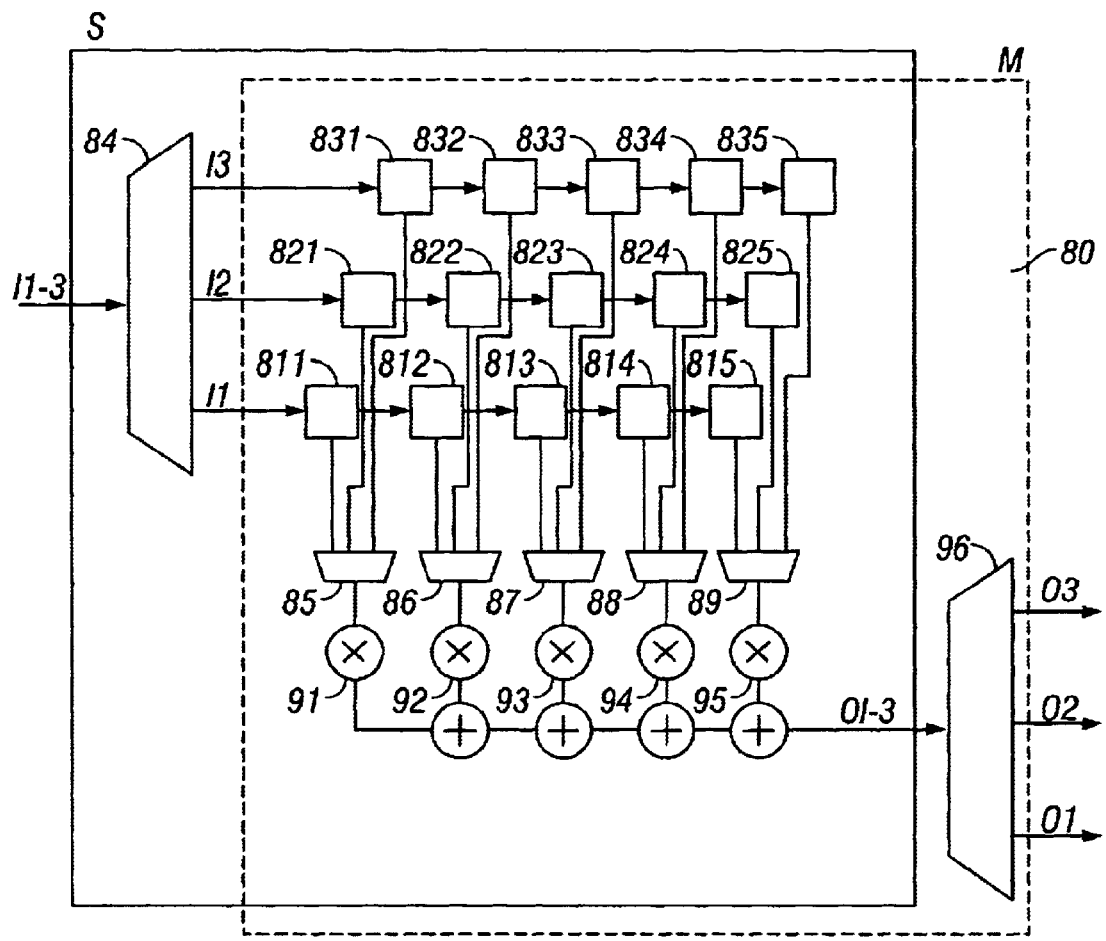
Figure 5B:
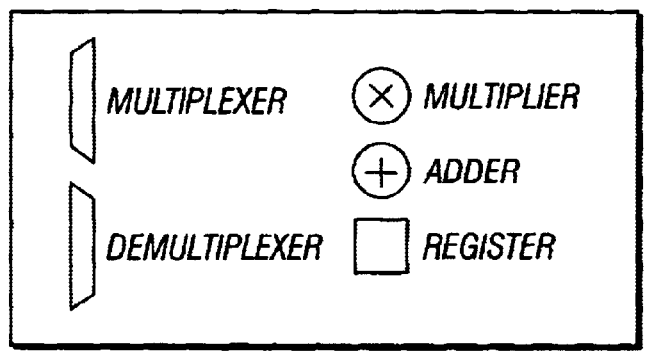
Figure 5C:
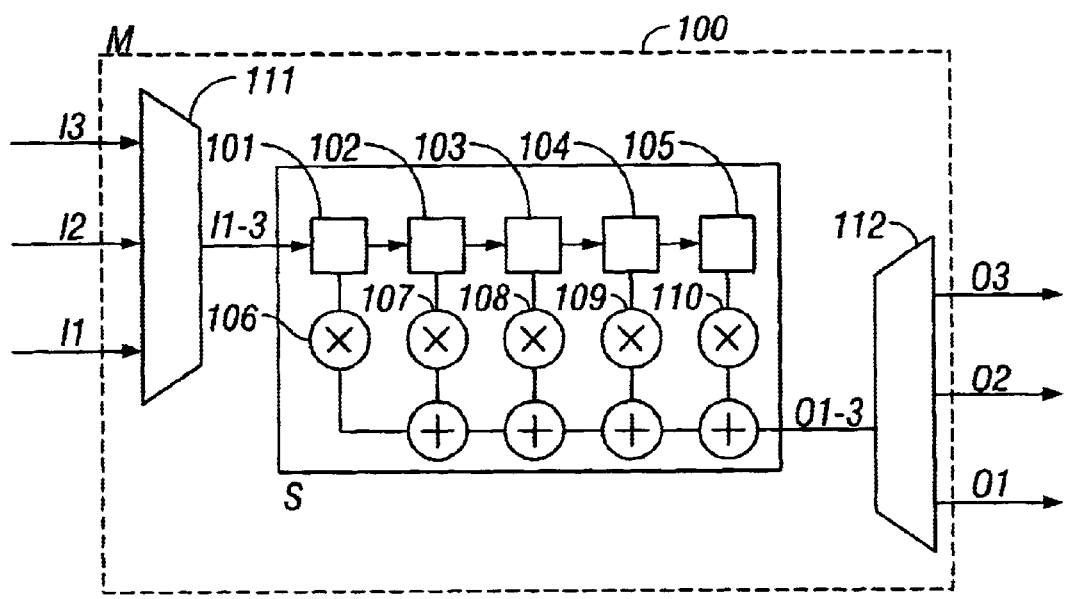
Figure 5C:
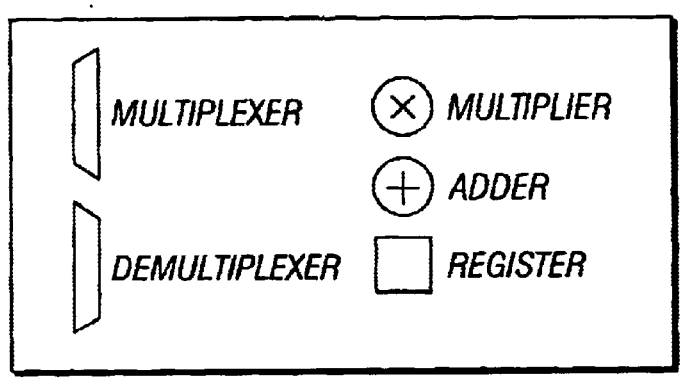

FIGS. 5(a) to (c) show schematic representations of processor architectures 70, 80, 100 which may be used with the present invention. The representations include functional units such as registers, multipliers, adders and multiplexers. Functional circuits may be provided equivalent to these functional units but the invention is not limited thereto. In particular, processor architectures in accordance with the present invention may be implemented and configured in any suitable way as required by the features of the, claims. In particular, these functional units may be provided by software programs running on any suitable processor, microprocessor, microcontroller, computer, workstation, or similar or may be provided by dedicated hardware such as ASIC's, FPGA's.

Since filtering is performed with a moving mask window, a typical processor structure 70 may be as shown in FIG. 5(a), in which each processor 71; 72; 73 may include multiple hold and multiply operators (HAM) 710, 715 . . . 714, 719; 720, 725 . . . 724, 729; 730, 735 . . . 734, 739, one for each filter-tap. Each HAM includes a register 710–714; 720–724; 730–734, e.g. a FIFO register, and a multiplier 715–719; 725–729; 735–739. The outputs of the HAM's are accumulated by adders to generate the outputs O1 to O3. Structure 70 functions in the following way: initial data (e.g. the image to be processed) is input as I1 to the first processor 73. The Highpass values of the filtered results O1 are output as the results of the first level and the Lowpass values from O1 are used as the input I2 of the next processor 72. Similarly, the second processor 72 outputs the results O2 of the filtering which include the Highpass values for the second level and the Lowpass values which are used as the input I3 for the third processor 71. Data can be used whenever it is available as the three processors are effectively independent of each other.

This structure 70 requires large hardware resources (large number of registers, multipliers and adders), resulting in a high VLSI cost (see Table 2), compared to the relatively small number of activations in higher levels of the wavelet transform, for instance. It is preferred in accordance with the present invention if the number of processors required for filtering is reduced to less than one per level, most preferably to a single processor architecture, where the simultaneous activations of different levels are spread over successive processing steps. Consequently, in accordance with the present invention, data of the different levels may be appropriately routed through multiplexers 84–89 to one unique set of HAMs 811, 91 . . . 815, 95; 821, 91 . . . 825, 95; 831, 91 . . . 835, 95 and to a demultiplexer 96, as shown in FIG. 5(b). The processor 80 shown schematically in FIG. 5(b) operates, in the following way. Initial data (e.g. the image to be processed) is first input as I1 to the processor 80. The multiplexers 84–89 direct this data through the HAM's 811, 91 . . . 814, 95 to form the filtered output O1 which includes the Highpass values of the first level and the Lowpass values of the first level which are returned as input I2 to the processor 80. I2 is processed by the HAM's 821, 91 . . . 825, 95 to form output O2. O2 includes the Highpass values of the second level as well as the Lowpass values which are returned as an input I3 to the processor 80. Further levels are processed in the same way using the next available set of HAM's. The arithmetic cost (area cost in VLSI due to multipliers) in FIG. 5(a) is thus replaced by (i) additional calculation cycles, which is unavoidable since we migrate from a multiple to a single processor architecture and (ii) a multiplexer cost in FIG. 5(b), which is area expensive in VLSI implementations. This multiplexer cost can be avoided by the configuration 100 of FIG. 5(c) which includes a demultiplexer 111, HAM's 101, 106; . . . 105, 110 and multiplexer 112. Processor 100 functions in the following way. Initial data I1 is filtered and the first level output O1. The Lowpass values of O1 are returned as I2 to processor 100 and are filtered to produce the second level output O2. Each further level is processed in this way. Whereas the processor 70 can perform concurrent storage and processing of data in several levels, processor 80 is able to perform concurrent storage from different levels but only process data from one level and the processor 100 can only store and process data from one level at a time.

This arrangement has the disadvantage that the FIFO registers 101–105 must be fully loaded with the appropriate data from external memory each time the processing switches from one level to another, requiring for a 2M+1 tap filter, 2M+1 additional load cycles. Table 3 summarizes the main characteristics of the different single- and multiprocessor structures 70, 80 100 of FIGS. 5a–c, for an L-level, 2M+1 tap filter Laplace pyramid, calculated from a N-sample input. From Table 3 we find that the implementation style of FIG. 5(c) is particularly preferred in accordance with the present invention compared to FIG. 5(a) or (b), as long as level switching and the resulting memory access cycles cost is kept within acceptable limits.

It is preferred in accordance with the present invention if the data structure to be filtered as part of the encoding step is subdivided into regions and in order to avoid artefacts at the boundaries of the regions in the transmitted and decoded structure, lapped-region processing is preferably used. Lapped-region processing in accordance with this invention is the same as lapped-block processing except that regions are used for the processing (not necessarily all the same size) rather than blocks. A region may includeone or more blocks, i.e. may be a block or a plurality of blocks. Lapped region processing requires that during the processing of any region in any level the required overlap data from the adjacent region or regions must be available. If this data is not available, the processor 100 may simply stop, or the wrong information may be used or it may be necessary to swap the complete state of the processor 100 with the data required to calculate the missing values and swap back before processing can continue. Providing overlap data at the appropriate time results in a requirement to schedule the activities of the various HAM's properly if excessive use of memory is to be avoided and hence results in the requirement of accurate scheduling of how data is read, written into memory and processed.

In the above, the background memory requirements for the implementations of FIGS. 5(a)–(c) have not been discussed or shown. These memory requirements are highly dependent upon the exact scheduling scheme used, particularly for the processor architectures 80 and 100 in FIGS. 5(b) and (c).

Figure 6:
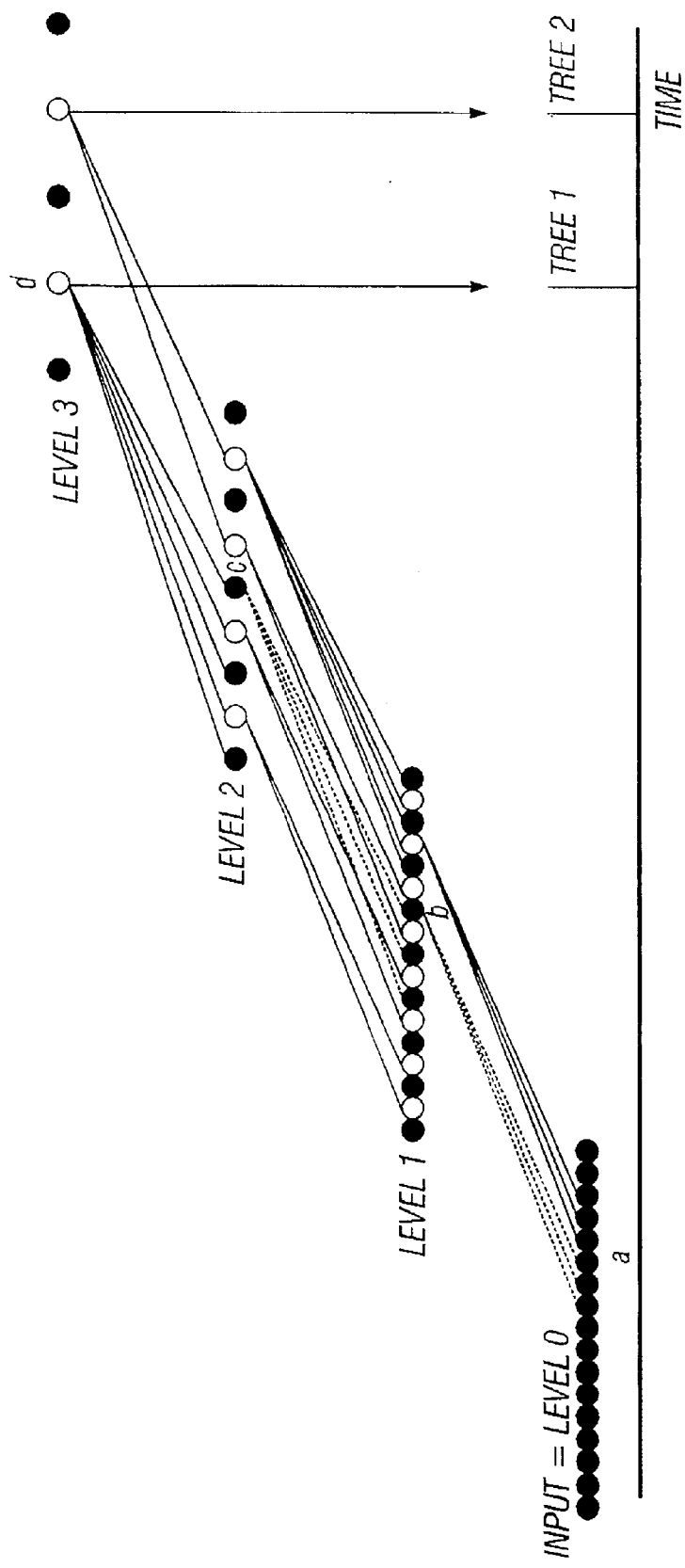
FIG. 6 is a temporal representation of the wavelet transform using the Horizontal Traversal Activation Schedule in which the levels are created one after each other.

From Table 3 it is clear that level switching negatively influences the overall memory cycle budget in a single processor architecture corresponding to FIG. 5(c). A straightforward approach to avoid level switching, without infringing the data-dependencies, would be to traverse the image completely at each level before continuing with the next level, as shown in the temporal representation of the wavelet transform FIG. 6. This scheduling will be referred to as the Horizontal Traversal Activation (HTA) schedule in which all levels are created one after another. The average number of memory read accesses per calculated Highpass value is tabulated in Table 6 (in section a7). From Table 6 (row 7), we observe that the HTA schedule yields the minimal number of memory read accesses in all 1D schedules: it is the minimal number which is obtained in the processor configurations of FIGS. 5(a) and (b).

Figure 7:
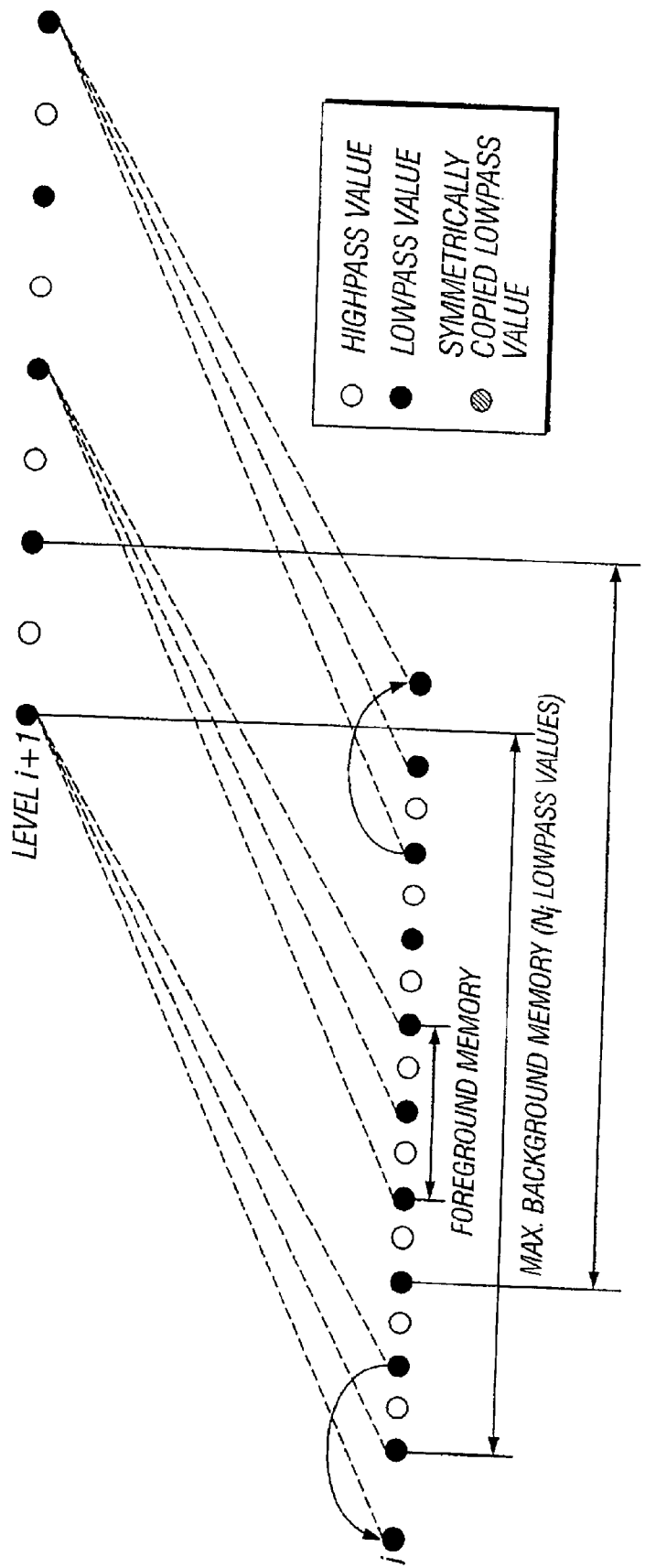
FIG. 7 shows a temporal representation of the background filtering memory required between level i and i+1 in the HTA schedule.

Any data that is created, but not directly consumed, should be stored in memory during the full time period between its creation and its last consumption. For instance, as shown in FIG. 7 any lowpass value created in HTA in level i will not be consumed before starting the filtering in level i+1. Therefore, the $n_i$ lowpass values of level i must necessarily be stored into a background filtering memory. Any data that is involved in a filtering operation in level i is extracted from that background memory, transferred to the foreground filtering memory, corresponding to the FIFO structure 101–105 of FIG. 5(c) and is reused during the next 2M filtering operations in level i, by a ripple-through process through the 2M+1 registers 101–105. The Lowpass filter output samples created during these filtering operations are stored into the background filtering memory at exactly the same position as their topologically corresponding lowpass values in level i, since these values will not be reused in any other higher level filtering process. The background filtering memory is thus equal to the maximum of $n_i$ over the involved levels (0 to L−1), yielding a background filtering memory of N samples (maximum at i=0).

Figure 8:
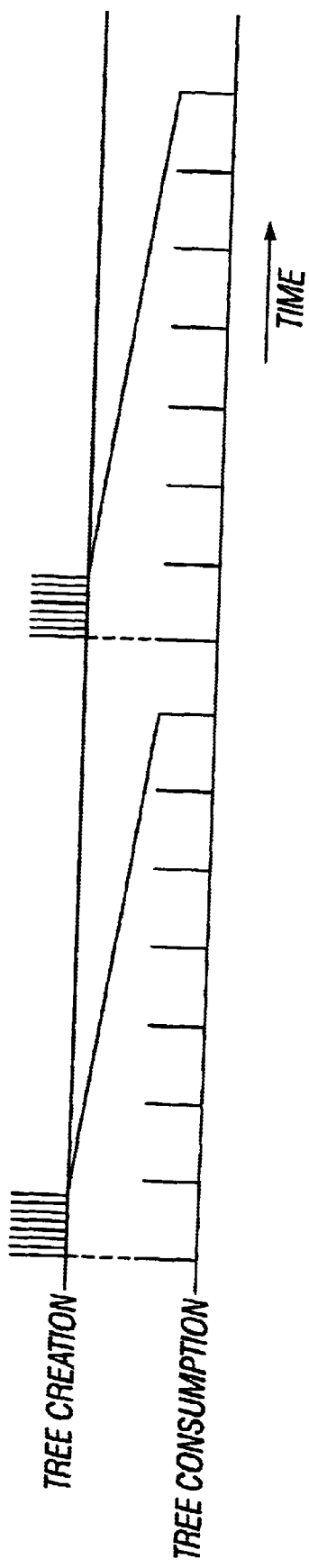
FIG. 8 shows the bursty formation of the parent-children trees and how they are spread out over time by the interface memory to ensure uniform activation of the next module.

None of the parent-children trees will be created as long as the processing in the last level L has not yet been started. Just before the processing starts in level L, all children of all parent-children trees are created and should therefore be stored in a background tree memory, which is as large as the size of all trees together (with the exclusion of the parent samples), yielding a total of approximately N samples. The transfer of the trees to the Interface Memory is only initiated at the processing of level L. Thus, as shown in FIG. 8, these trees are only released at the very end of the wavelet transform processing, in a very short burst. The consumption of the trees is slower resulting in a large interface memory 8 (approximately N samples) which should spread this burst over time for avoiding overloading of the subsequent coding module 30.

On the other hand, a vertical calculation trajectory along the data-dependency lines in the topological data representation reduces the signal lifetimes and their corresponding memory requirements. The Recursive Pyramid Algorithm (RPA, see K. K. Parhi, T. Nishitani, "VLSI architectures for Discrete Wavelet Transforms," *IEEE Transactions on VLSI Systems,* Vol. 1, No. 2, June 1993, or M. Vishwanath, "The Recursive Pyramid Algorithm for the Discrete Wavelet Transform," *IEEE Transactions on Signal Processing,* Vol. 42, No. 3, pp. 673–676, March 1994) and the Modified Recursive Pyramid Algorithm (MRPA, see M. Vishwanath, C. Chakrabarti: "A VLSI architecture for real-time hierarchical encoding/decoding of video using the wavelet transform" *Proceedings of the International Conference on Acoustics, Speech and Signal Processing, Adelaide,* Australia, pp. II-401–II-404, April 1994) can be categorized in this class of so-called Vertical Traversal Activation (VTA) schedules, traversing the levels (only three are shown) according to:

RPA: 1,2,1,3,1,2,1,4,1,2,1,3,1,2,-,1,2,1,3,1,2,1,4,1,2,1,3, 1,2,- where the "−" sign indicates an idle cycle.

MRPA: (1),(1,2),(1),(1,2,3)(1),(1,2),(1),(1,2,3,4),(1),(1,2,3),(1), . . . where the parentheses are just used for readability Notice the relationship between the MRPA and the RPA: the last activated level in a group delimited by parentheses in the MRPA corresponds to the next element of the RPA. The MRPA schedule is shown in the temporal representation of FIG. 9. Deviations from the above MRPA schedule can possibly occur (with filters larger than 3 taps) at the start-up phase, due to the latency of eq. (1).

In the Recursive Pyramid Algorithm, two successive activations always apply to different levels. Using the Modified Recursive Pyramid Algorithm, no level is activated contiguously, except for level 1, which is activated twice before jumping to another level. The average number of accesses per calculated Iighpass value is tabulated in Table 6 (columns (b) & (c)).

In the configuration of FIG. 5(*b*), the filtering memory is essentially only of the foreground type, since any data is directly reused in the following filtering operation, without any long-term storage. The scheduling of VTA ensures that only the last 2M+1 Lowpass values of levels 0 to L−1 should be stored, leading to a total foreground filtering memory of L.(2M+1) samples (see FIG. 9) and no background filtering memory. However, using a processor configuration of FIG. 5(*c*), the foreground memory stores 2M+1 samples and the rest is put in the background memory of size L.2M (the last sample to be put in the FIFO registers 101–105 of each level will be fetched from the previous level at the appropriate time stamp).

Unlike the HTA schedule, VTA processing has a predominant vertical direction, ensuring that the parent-children trees are processed as soon as possible. FIG. 10 shows the evolution of the tree memory during VTA. Unfortunately, because of the interlevel data dependencies and the edge effects expressed in eq. (1), a larger region than that spanning the Highpass values for the current parent-children tree, must be processed. All Highpass values, corresponding to this region α (see FIG. 9), have to be stored (samples A, B, C, D, E, F, G and A'). Only a fraction of these Highpass values (samples A, B, C, D, E, F, G in FIG. 9 or region T in FIG. 10) contribute to the current parent-children tree. All other Highpass values (sample A' in FIG. 9 or region S in FIG. 10) are inevitably created during the ripple-through of Lowpass values from the bottom levels to the top levels, but are part of later-coming trees. Notice that for small filters, region S is quite small (see FIG. 10), but for wide filters and a large number of levels, S can become much wider than region T (see also Table 1: high $\alpha_i$ values). Region T can be considered as the foreground tree memory since it contains data that will soon be released as a full parent-children tree. Region S contains data that will be released after a longer period of time and is thus considered as background tree memory. Notice that once a tree is created, region T is emptied from its content, which is transferred to the interface memory. Region T can then be involved in the creation of the next parent-children tree, as shown in FIG. 10. Region T then becomes part of the background memory S', while part (region T') of the current background memory S gets the functionality of the foreground tree memory for storing data of the next-coming parent-children tree.

Figure 9:
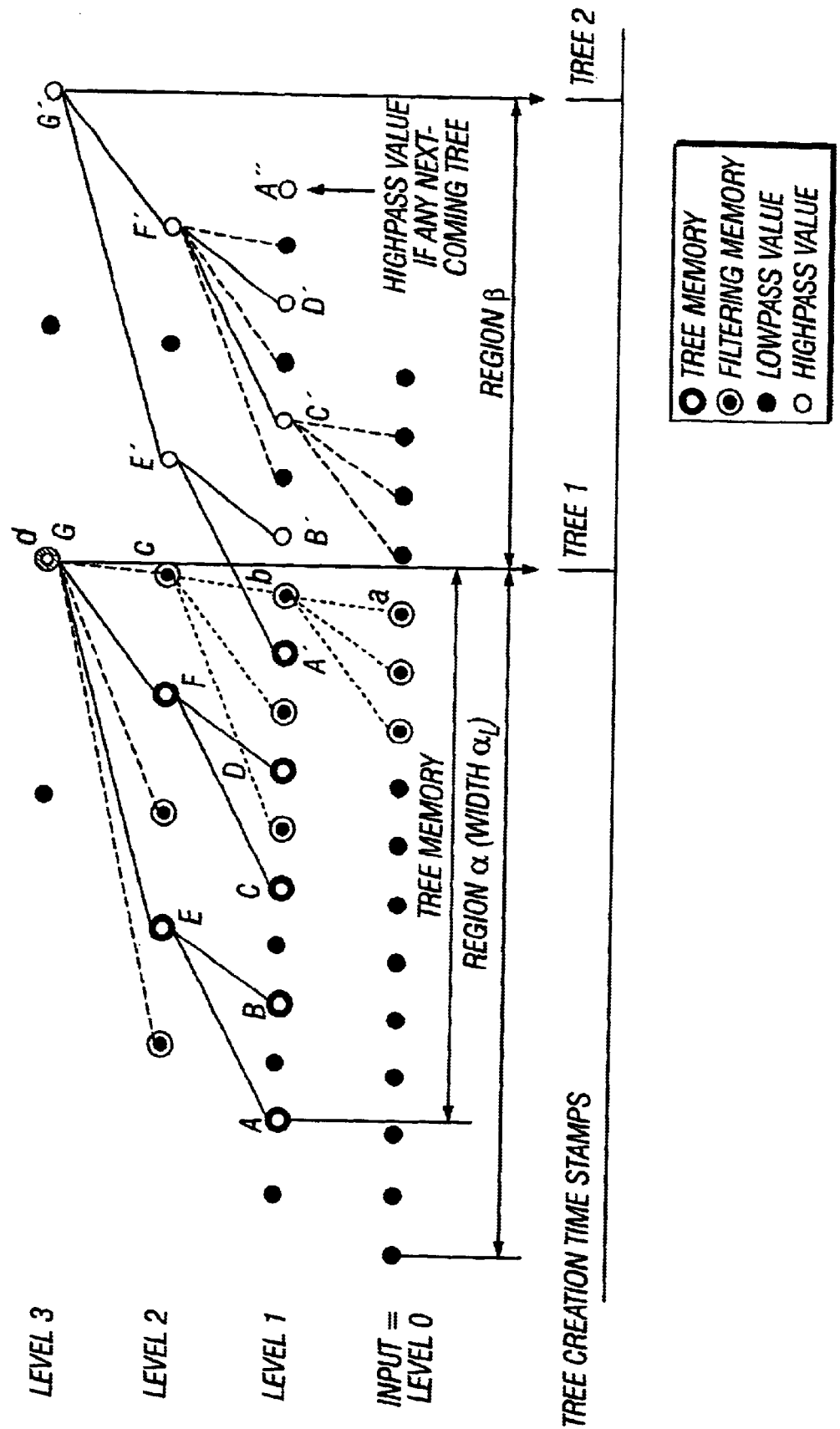
FIG. 9 is a temporal representation of the wavelet transform using the Vertical Traversal Activation Schedule (MPA).
Figure 10:
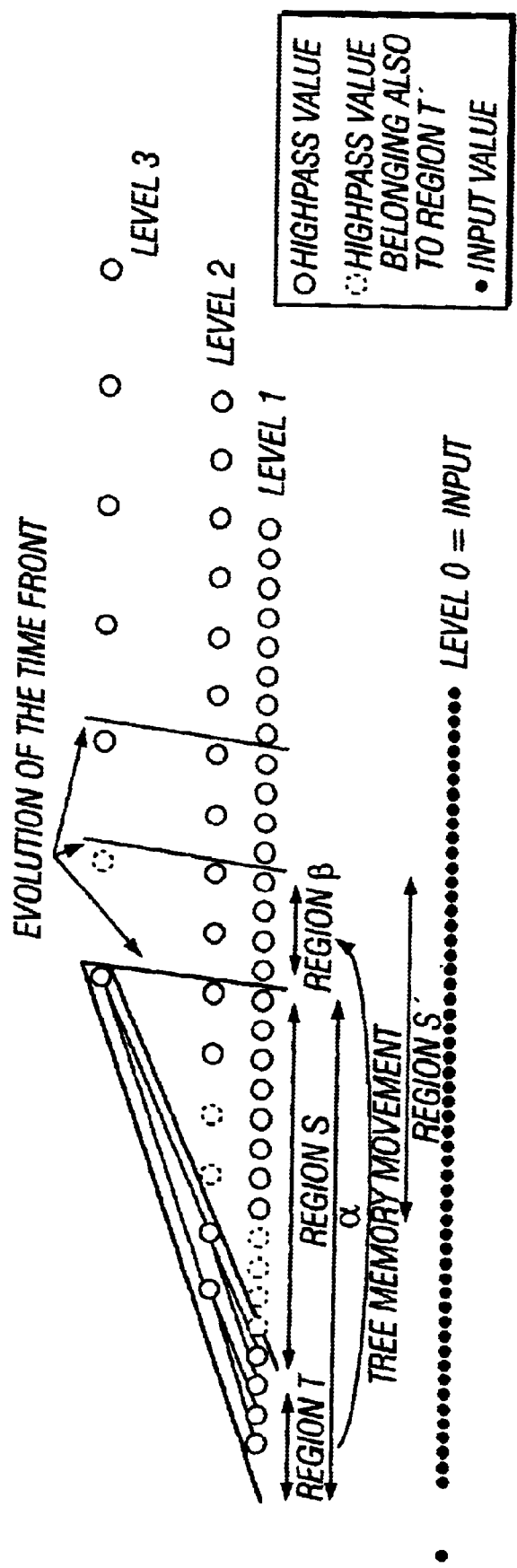
FIG. 10 is a representation of the evolution of a tree memory during the VTA schedule.

From FIG. 9, it can be seen that all trees, which are the vertically oriented clusters of Highpass values joined by solid lines, are created uniformly in time for the steady-state (β) regions which follow the start-up phase, region α, so that the zero-tree coding module has enough time to process the current parent-children tree, before the next tree is to be processed. The interface memory is therefore also restricted to one parent-children tree (possibly two if double-buffering is required). It thus contains data that is directly involved in the zero-tree coding and is thus considered as a foreground memory. Columns (b) and (c) from Table 6 summarize the main results.

The VTA schedules described above (RPA and MRPA) only minimize the memory requirements as long as filtering is concerned. If other functionalities than just the filtering process in the wavelet transform are considered—for instance the parent-children tree formation—it can be seen that the filtering memory only plays a marginal role in the full memory requirements compared to the contribution of the tree memory, e.g. in the formulae of Table 6, $\sigma_L$ is typically much larger than L.2M and 2M+1(see Table 1). Thus, putting the wavelet transform into a larger context, i.e. its functionality in the complete system, the VTA schedule is a reasonable but not the best choice.

In accordance with an embodiment of the present invention a novel schedule for the processing of data during multi-level filtering of data structures is proposed which leads to the same tree memory requirements as VTA, while introducing a negligible increase of the filtering memory, but which provides a large decrease in the memory access cost.

For minimizing the memory access cost, the scheduling should favour the HTA horizontal traversal trajectory, passing as long as possible through one particular level. However, to reduce the memory size cost, the elapsed time between the creation and consumption of data should be shortened. The scheduling should therefore follow, in the topological representation, the overall direction of the data-dependency links, which is vertical, i.e. perpendicular to the direction of the levels. VTA and HTA are two mutually conflicting traversing methods which each provide different but also desirable properties.

Figure 11:
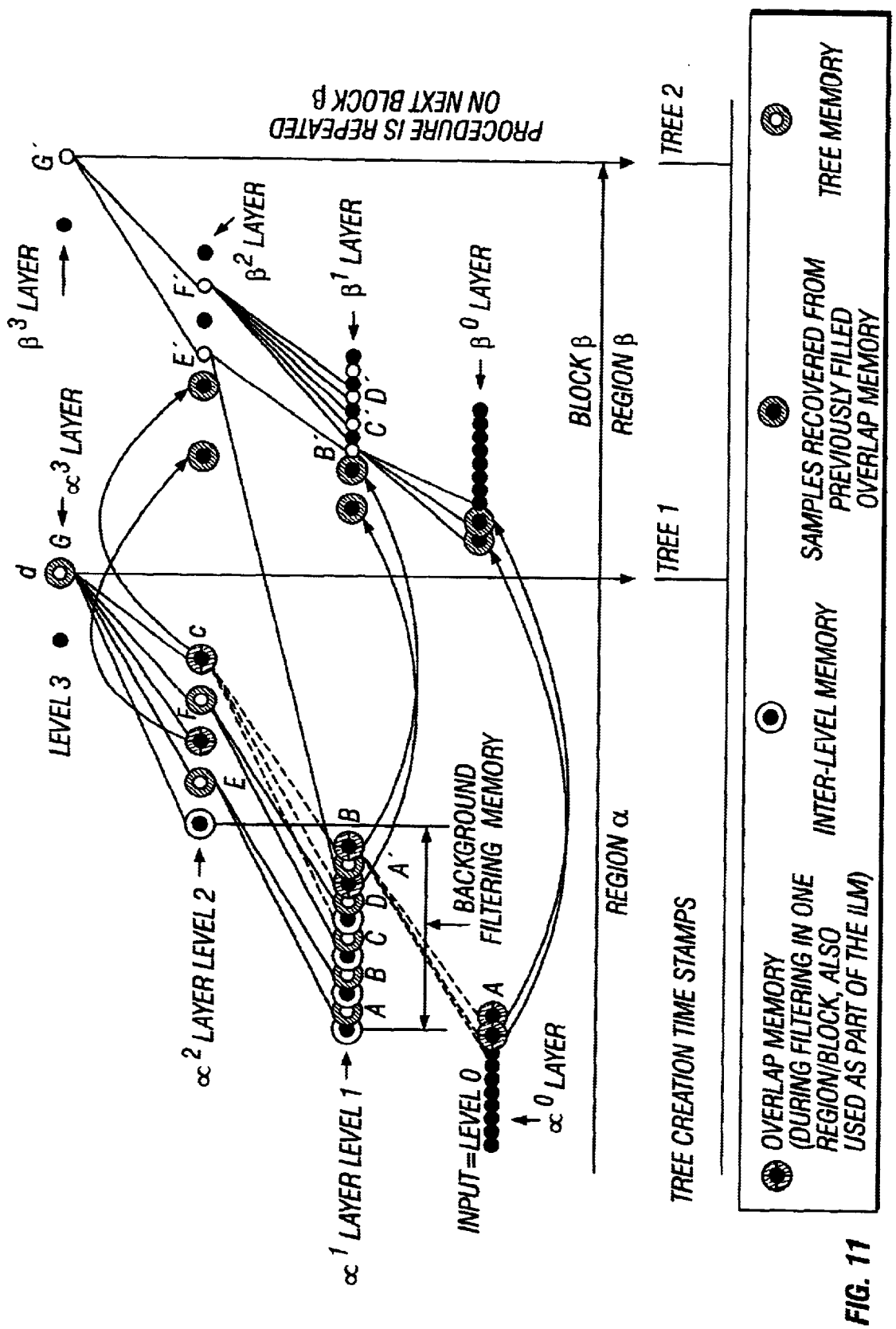
FIG. 11 is a schematic representation of the Mixed Traversal Activation Schedule in accordance with one embodiment of the present invention.

The HTA is clearly preferred for memory access cost minimization, while the VTA minimizes the memory size cost (see Table 6). What is proposed in the present invention is a scheduling strategy which recognises the constraint that the data creation trajectory should be as vertical as possible for memory size minimization as well as the constraint that the creation trajectory should be as horizontal as possible for minimizing the number of memory accesses in the configuration of FIG. 5(*c*). A configuration in accordance with an embodiment of the present invention which solves this apparently unresolvable conflict is shown in FIG. 11. The traversing strategy in accordance with this embodiment of the present invention will be called a Mixed Traversal Activation (MTA) schedule. The data of a zero layer $\alpha^0$ in the zero level 0 of a region $\alpha$ (input data) is filtered to create the data A, B, C, D A', b of a first layer $\alpha^1$ in the first level of the same region. This data is used in turn to calculate the data E, F, c of a second layer $\alpha^2$ of the second level and so on for all levels in the region $\alpha$. Thus each layer in a region except the zero layer is the result of one filtering step of the multi-level filtering process. All levels are processed for the layers $\alpha^0$–$\alpha^L$ before a first data point in zero layer $\beta^0$ in the zero level of a second region $\beta$ is used to start calculating the points B' etc. of a first layer $\beta^1$ in the first level of the region $\beta$. In accordance with this schedule the image data is subdivided into regions, each region including a series of layers in the various levels, each layer in one region being related to the other layers in the same region by data dependency. Any layer may include one or more, not necessarily an integral number of blocks. The layers of one region need not all have the same number of blocks. A block may be as small as a single point. Within a region the data is traversed horizontally within each layer before moving to the next layer in the next level in the same region. The last level contains at least one Highpass point G. Thus at least one parent-children tree may be extracted at the completion of processing of one region, i.e. through all its layers. The data for the creation of the next parent-children tree is calculated by sequentially traversing the layers of the next region horizontally and storing the data required for processing the adjacent unprocessed regions in future stages.

Note that as lapped-region or lapped-block processing is preferred in accordance with the present invention, some of the last data values in each layer are used for the calculations on the first data in the layer of the next region which is on the same level. In one dimension the next region is the next region in the processing. In two or more dimensions there are as many next regions as dimensions as "next" may be applied along any dimension. Hence, in the processing of a current normal or steady-state region in two dimensions, data is stored from two previous regions for complete processing of the current region. For example, data is stored from one region back horizontally and one region back vertically. For example in one dimension, as shown in FIG. 11, two lowpass data points from the $\alpha^0$ layer are used with the first lowpass data point in the layer $\beta^0$ of the next region $\beta$ to calculate the Highpass point B' in layer $\beta^1$. The two data values from the $\alpha^0$ are fed forward to the $\beta^0$ layer of the next region. In accordance with the present invention lapped region or lapped block processing requires storage of some data between regions or between blocks in each region. As described above the data is stored from a previous region but the present invention also includes storing data in the reverse direction, i.e. a layer of a first region may use the first data points from a layer in a second subsequent region to calculate the last point or points of the next layer in the first region. In this case the data values from the layer in the subsequent region are fed back to the layer in the currently processed region. In both feed forward and feed back cases, block or region artefacts are eliminated by using data values which span the block or region boundaries for calculation of the data values close to the boundaries.

According to eq. (1), the data involved in the creation of the first parent-children tree (A, B, C, D, E, F, G) is the sum of the data in the $\alpha$ region which is quite large, due to the large data-dependencies involved in the successive filtering processes. Because of the Lowpass-Highpass couple creation principle of the Lifting Scheme, a number of Highpass values, not being part of this first parent-children tree, are inevitably created (e.g. sample A' for the fictitious 3-tap Lowpass/3-tap Highpass wavelet transform shown in FIG. 11). Because of this, the creation of the next parent-children tree (A', B', C', D', E', F', G') from the next region has already been initiated and the additional effort needed in the creation of the missing data for this new parent-children tree (e.g. from the $\beta$ region which may be a so-called steady-state region) is relatively small compared to the first tree obtained from the $\alpha$ region. Indeed, since for each layer in each level of the second region the first filtering operations have already been performed during the start-up phase (region $\alpha$), each additional output sample from a layer to be created in each level requires only one additional input sample in that layer. Thus, for creating one additional parent-children tree containing $2^{L-i}$ Highpass values in level i, only $2^{L-i}$ additional filtering operations should be performed in level i. In accordance with one embodiment of the present invention, the filtering operations in all levels are initiated by a start-up phase including at least one so-called seed region ($\alpha$ region), are then followed by successive so-called steady-state phases ($\beta$ regions) contributing to one additional parent-children tree per stage and are terminated by a so-called finishing stage, in which a region, similar to region S of FIG. 10 vanishes ($\overline{\alpha}$ region).

In accordance with the present invention an $\alpha$ region will be called a basic seed region. It is the data in this region from which the filtering starts in an efficient and controlled manner so that errors do not ripple through the filtering and memory usage and access are at an optimum. In this region there is sufficient data to calculate all the data in all the other levels up to at least one data point G in the last level.

Figure 12:
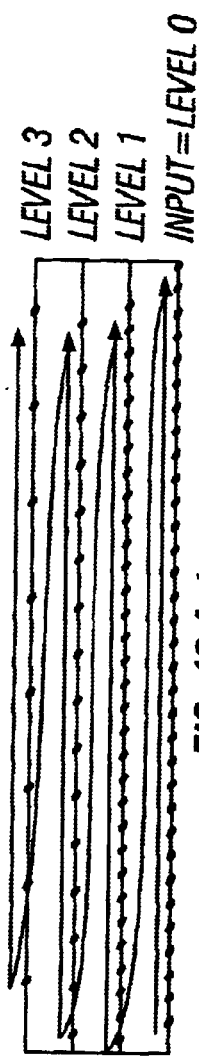
FIGS. 12(*a*1), (*b*1) and (*c*1) are topological representations of the of the 1D HTA, VTA and MTA schedules respectively.
Figure 12:
Figure 12:
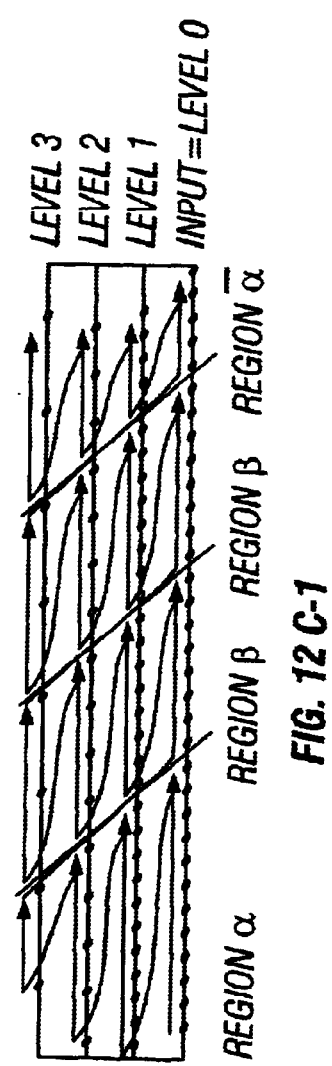
Figure 12:
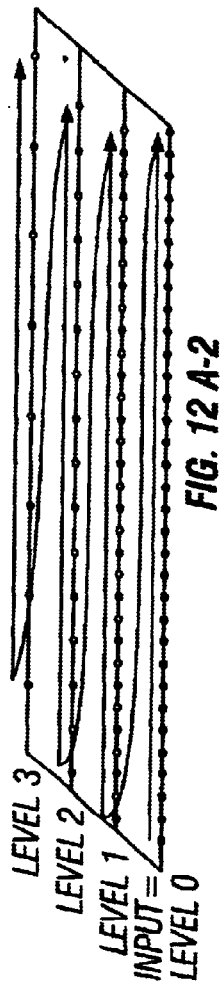
Figure 12:
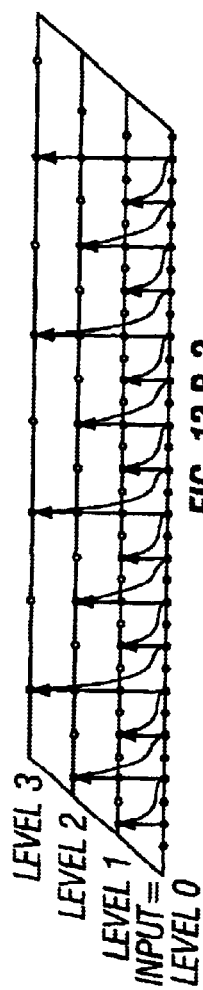
Figure 12:
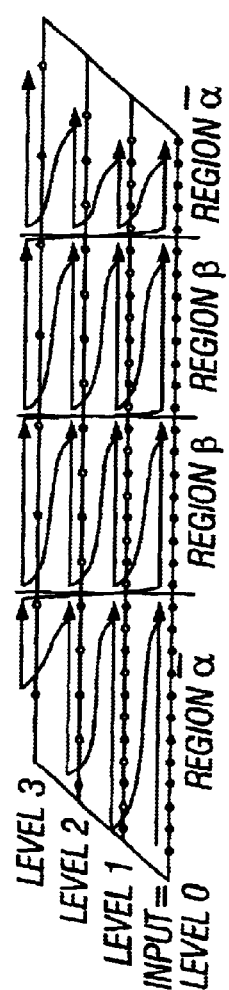

FIG. 12 shows how this new schedule relates to the HTA and VTA for one dimension. FIGS. 12(*a*1) to (*c*1) are topological representations and FIGS. 12(*a*2) to (*c*2) are temporal representations. The FIGS. 12(*a*. 1, 2) relate to HTA, FIGS. 12(*b*. 1, 2) relate to VTA and FIGS. 12(*c*. 1,2) relate to MTA. For MTA within each region, the level switching which is expensive for the filtering memory access is avoided by using a horizontal traverse in each layer in each level. The filtering memory size cost of such horizontal processing is avoided by reducing the horizontal span of the traverse within each region. This traverse for the steady state $\beta$ regions; which make up the majority of a large image, is relatively narrow, e.g. one block. The width of these regions is typically equal to the number of children in the leaves of a parent-children tree, yielding the equivalent of $2^L$ input samples. However, the designer can vary the equivalent input region width, between $2^L$ and N, depending on the application constraints. For instance, when using a scalable DCT codec, the parent of such a tree should preferably have a width equal to 8 samples, for being able to perform the inverse 8-point DCT. In general, the region span is at least $N_L.2^L$ input samples, with $N_L$ representing the number of parent pixels (1 for DWT, 8 for DCT).

The background filtering memory in accordance with the present invention is split in two parts: one part transfers overlapping information between layers in adjacent regions and therefore stores 2M samples for each level i (i=0 to L−1). The second part stores, as in FIG. 7, $n_i$ Lowpass values of level i (i=1 to L−1) for later consumption in the processing of level i+1. The maximum value of $n_i$ is reached in level 1. For $N_L$=1, we get a total of $(\alpha_L - \alpha_1)/2 + 1$ Lowpass values in regions $\alpha$ and $\overline{\alpha}$, and $2^{L-1}$ in $\beta$ region. For $N_L \neq 1$, the additional $(N_L - 1).2^{L-1}$ Lowpass samples must be stored, yielding the result of Table 6 (formula (d2)). Reducing the background filtering memory in region $\alpha$ can of course be accomplished by a further subdivision of region α into adjacent regions of smaller width, i.e. it is particularly preferred if the regions are subdivided into blocks as is explained later with reference to FIG. 19. The corresponding increase of the value of formula (d7) in Table 6 is negligible for large input signal sizes (see formula (d8)).

The total tree memory size is restricted to the span of region α for $N_L=1$, yielding a total memory of $\sigma_L$ Highpass values (see Table 1 for numerical values). For $N_L \neq 1$, $N_L-1$ additional 1-pixel parent-children trees must be counted for, which represents a total of $(N_L-1).(2^L-1)$ Highpass values. The part of the tree memory corresponding to one full $N_L$-pixel parent-children tree represents the foreground tree memory, leading to the results of Table 6. The tree memory management (foreground memory, background memory and transfers) is exactly the same as in FIG. 10. Except for start-up effects (region α), the creation of these trees is quite uniformly spread over time. The interface memory is therefore limited to typically one tree (or possibly two trees, if double buffering is required).

Table 6 provides an overview of the characteristics of the HTA, VTA and MTA schedules, from which it is clear that the latter extracts the best features of the HTA and the VTA: the large background memories of the HTA are avoided in favour of the foreground memories of the VTA, while avoiding the latter's high filtering memory read access cost: in practice (d8)<<((b8) or (c8)). Comparing (a7) to (d8) reveals that for $N \rightarrow \infty$, the memory access cost of HTA and MTA are similar: the input size (N) of HTA is replaced by the input block size of each region $\beta$ $(=N_L.2^L)$ in the MTA. Table 4 shows adequate choices for $N_L$, to bring the memory access cost of MTA very close to the optimal value of HTA (=2 read accesses per output sample): for a 4-level (L=4), 7/9-tap (M=4) wavelet decomposition, $N_L=4$ or even $N_L=8$ should be chosen. From Table 6 it can also be seen that the MTA's interface memory cost is as small as VTA's, since the parent-children trees are created quite uniformly in time.

Figure 4:
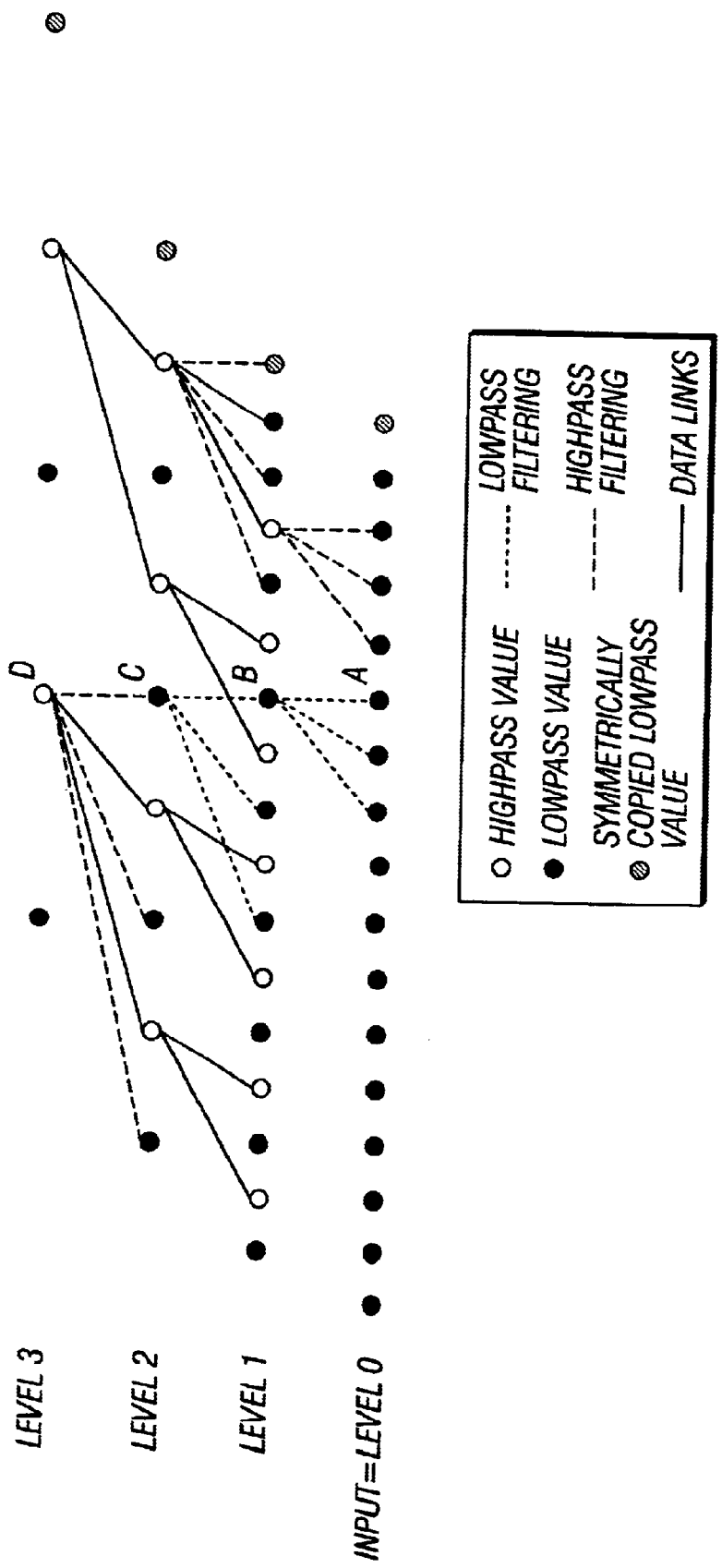
FIG. 4 is a temporal representation of the wavelet transform of FIG. 3(*a*) with vertical time front lines.
Figure 13A:
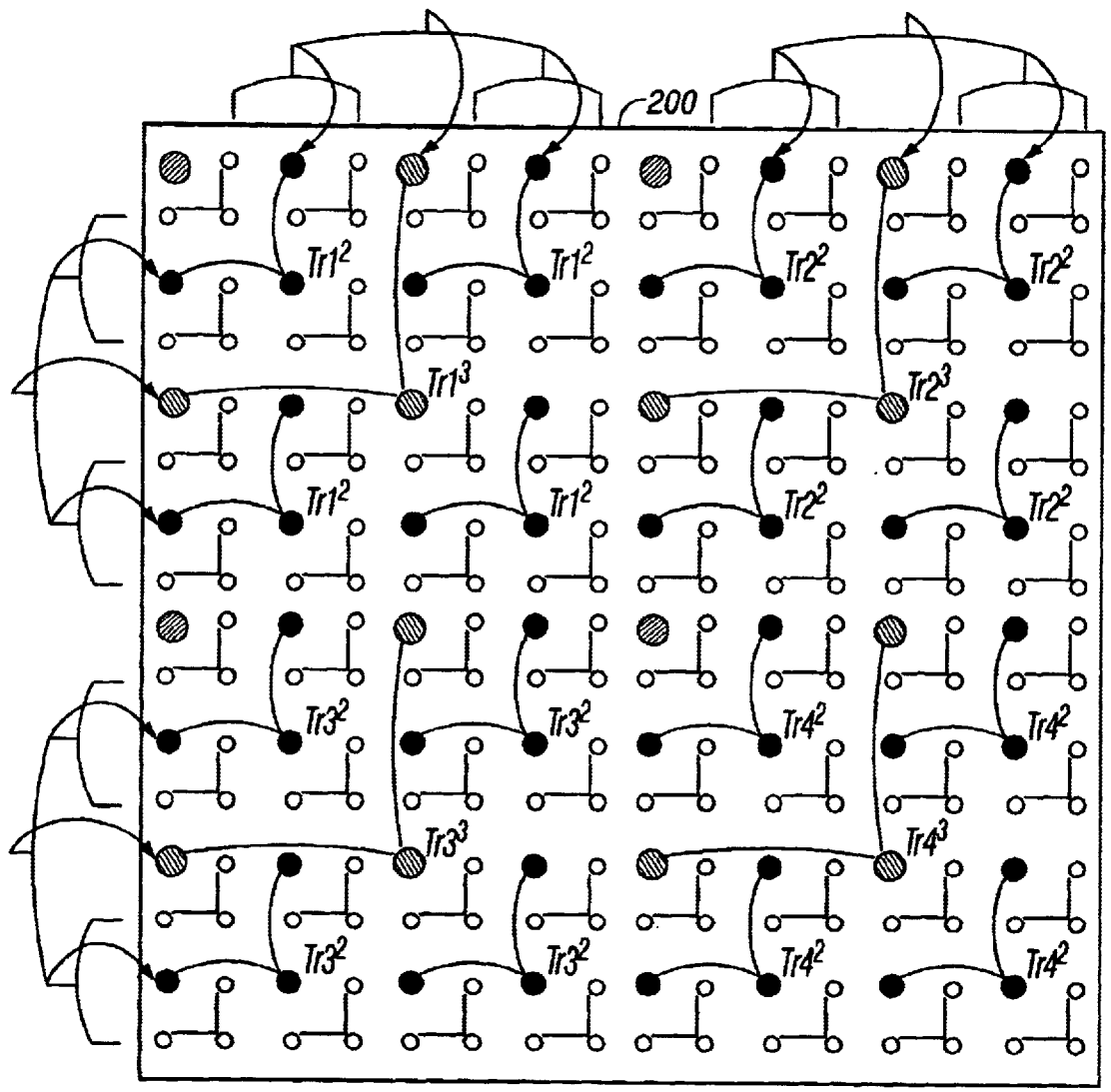
FIGS. 13(*a*) and (*b*) are topological and temporal of the in-place data organisation of the 2D lifting scheme of FIG. 3, respectively.
Figure 13B:
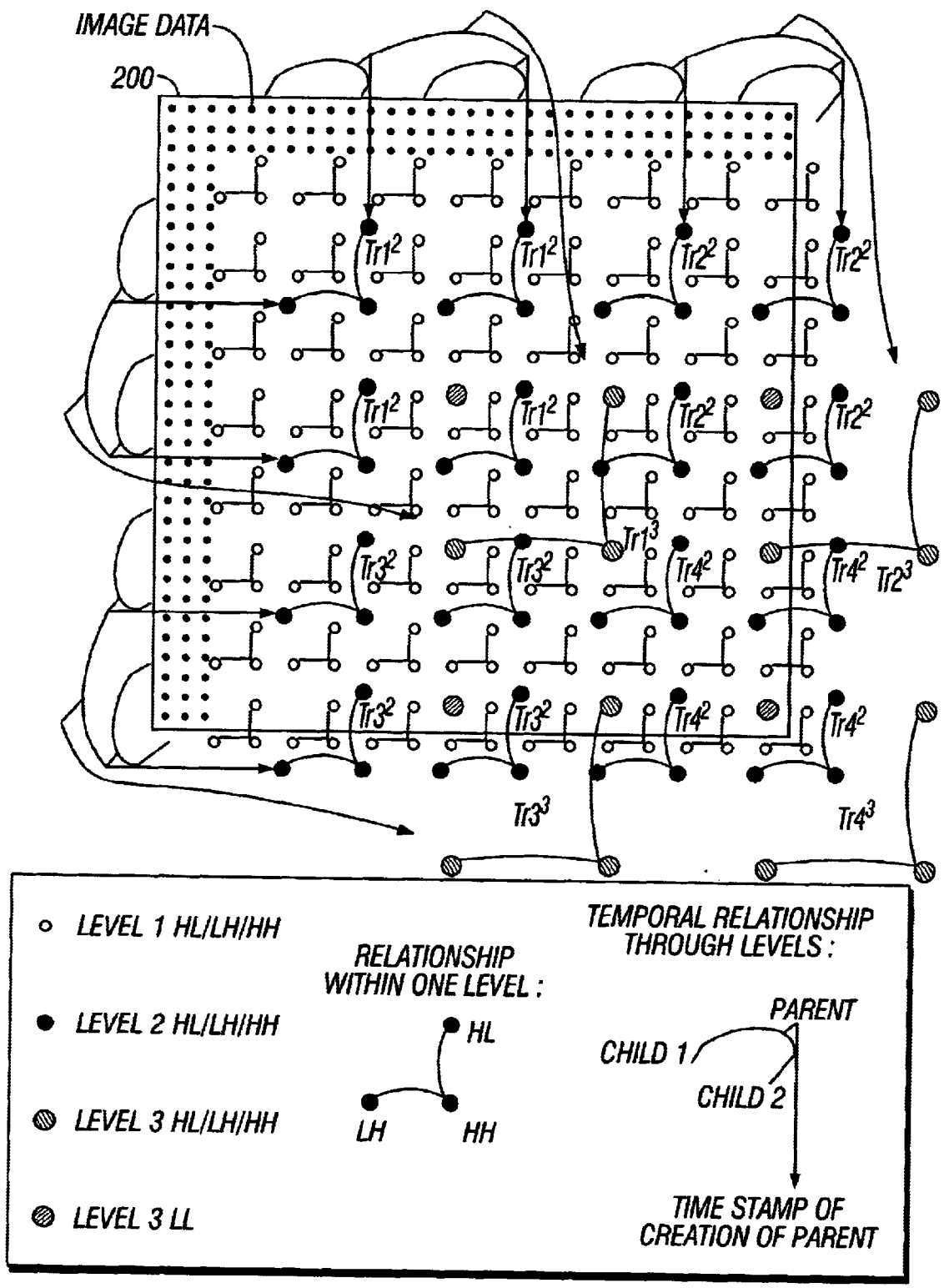

In the following the extension of the MTA to more than one dimension is described and this embodiment of the present invention is compared with conventional row-column and row-row approaches. FIG. 13(a) shows the topological representation of a fictitious 3-level, 3-tap Lowpass/3-tap Highpass filter two dimensional (2D) wavelet transform of an image 200, using the lifting scheme. This figure is the extension of FIG. 3 to a two-dimensional wavelet transform. Since the samples of all levels are projected onto the sheet, the difference in level information is visualized by different bullet sizes and shadings. Four trees TR1–TR4 are shown. Each tree is formed by first filtering a region of the original image 200 in one direction (along rows or columns) and then in the other direction (e.g. columns or rows). The levels of the trees are indicated by a superscript, e.g. $TR4^3$ are data values which relate to the third level fourth tree. The first level values are not marked, however, the first level values in each quadrant of the image 200 are the first level values of the tree in that quadrant. When the filtering is started at the top left hand corner, the time taken to calculate the data values in each level results in data appearing at different times, data towards the bottom right hand corner and in the higher levels appearing later which is shown in FIG. 13(b). To obtain the temporal representation of FIG. 13(b), the representation of FIG. 13(a) has been skewed, so that the Time Front lines become perpendicular to the paper sheet, in the same way as those of FIG. 4 are perpendicular to the input data axis. To understand the topological position of any data value in any level in FIG. 13(b), reference should be made to FIG. 13(a) as both figures show the same trees TR1–TR4 in their respective topological and temporal representations.

In accordance with an embodiment of the present invention an optimal order in processing the data for achieving a memory cost minimization is determined. Firstly, however, conventional processing methods will be described. Conventional 2D wavelet transform row-column filtering involves first applying a 1D row filtering along the rows of the complete image, followed by an 1D column filtering along the columns of the complete filtered image. The row filtering creates data along lines across the image, called creation lines. For the column filtering, data is consumed along consumption lines. Since the creation and consumption lines do not match, the column filtering cannot be started as long the row filtering has not been finalized. Consequently, the schedule processes each level completely in the following way:

Row filtering level 1→column filtering level 1→row filtering level 2→column filtering level 2→ . . . .

This is basically an extension of the 1D HTA schedule and exhibits similar features (see Table 7). Since each horizontal or vertical filtering pass always remains in the same level, the configuration of FIG. 5(c) can be used with the minimum number of memory accesses to the filtering memory ((a7) in Table 7).

The filtering foreground memory just consists of a FIFO memory with 2M+1 registers, that are adequately filled with the data, along the rows for the row filtering or along the columns for the column filtering. The background filtering memory however, is much larger, since a full frame memory must be used between two successive row and column filtering passes. Furthermore, all parent-children trees are created step by step from bottom to top, so that all parent-children trees are almost fully built up at the moment that the parent pixel of the first parent-children tree is created. The tree memory therefore also consists of a large frame memory which is not preferred. Further, the parent-children trees are created in burst mode, so that a large interface memory is required to spread the consumption of these trees in time (see FIG. 8) which is also not preferred.

The main reason that the Row-Column approach requires so much background filtering memory is that the creation and consumption lines do not match. To make them match, the column filtering should consume and create data along rows. At first sight, this seems to be a contradiction, since the column filtering consumes data necessarily along columns. However, no contradiction occurs if for each new row filtered value a column filtering is initiated in the corresponding column. Since each column filtering requires not only the new row filter output, but also the previous 2M row filter outputs in the same column, a 2M sample filter memory is required in each column. The total filtering memory is therefore equal to 2M rows+2M samples in the 2M+$1^{st}$ row, yielding the same foreground filtering memory requirements as the conventional delay line memory approach. The column filtering operation continuously jumps from one column to the next column, which implies that with a processor implementation such as that of FIG. 5(c), this leads to continuous reloading of all samples into the filter FIFO registers 101–105 and consequently results in a large read access count which is not preferred.

If the levels are still processed one after the other, the results of each level must be stored so that they are available in the processing of the next level, increasing the above-mentioned delay-line memory with an additional background filtering memory of $N^2/4$ samples. Matching the creation and consumption lines of the row and column filtering passes is thus a necessary, but not a sufficient condition to reduce the memory cost. In fact, the memory can only be reduced by minimizing the time period between the creation of data in level i and its consumption in level i+1, which can be achieved by favouring the traversal through the levels, as was done in the 1D VTA schedule. The full frame background filtering and tree memory would clearly be avoided. Filtering memory would therefore be restricted to 4M delay lines (sum of 2M delay lines over all levels).

This VTA configuration still has the disadvantage that a lot of memory accesses are needed as a consequence of (i) continuously switching from one level to another with the VTA schedule and (ii) continuously switching from one column to the next column in the row-by-row traversal. In fact, the processing can be performed level-by-level in a region contributing to the same parent-children tree. In such a region, the column-switching phenomenon can be reduced by accumulating the results of $\gamma$ ($\gamma$>1) row filtering operations in one column, prior to starting the column filtering passes. Each column filtering pass then processes $\gamma$ row filtered values, prior to jumping to the next column. In one column, $\gamma$ samples are thus processed without full reloading of the FIFO registers 101–105 of FIG. 5(c), aligned along that column. The memory access bottleneck has thus been reduced.

Figure 15:
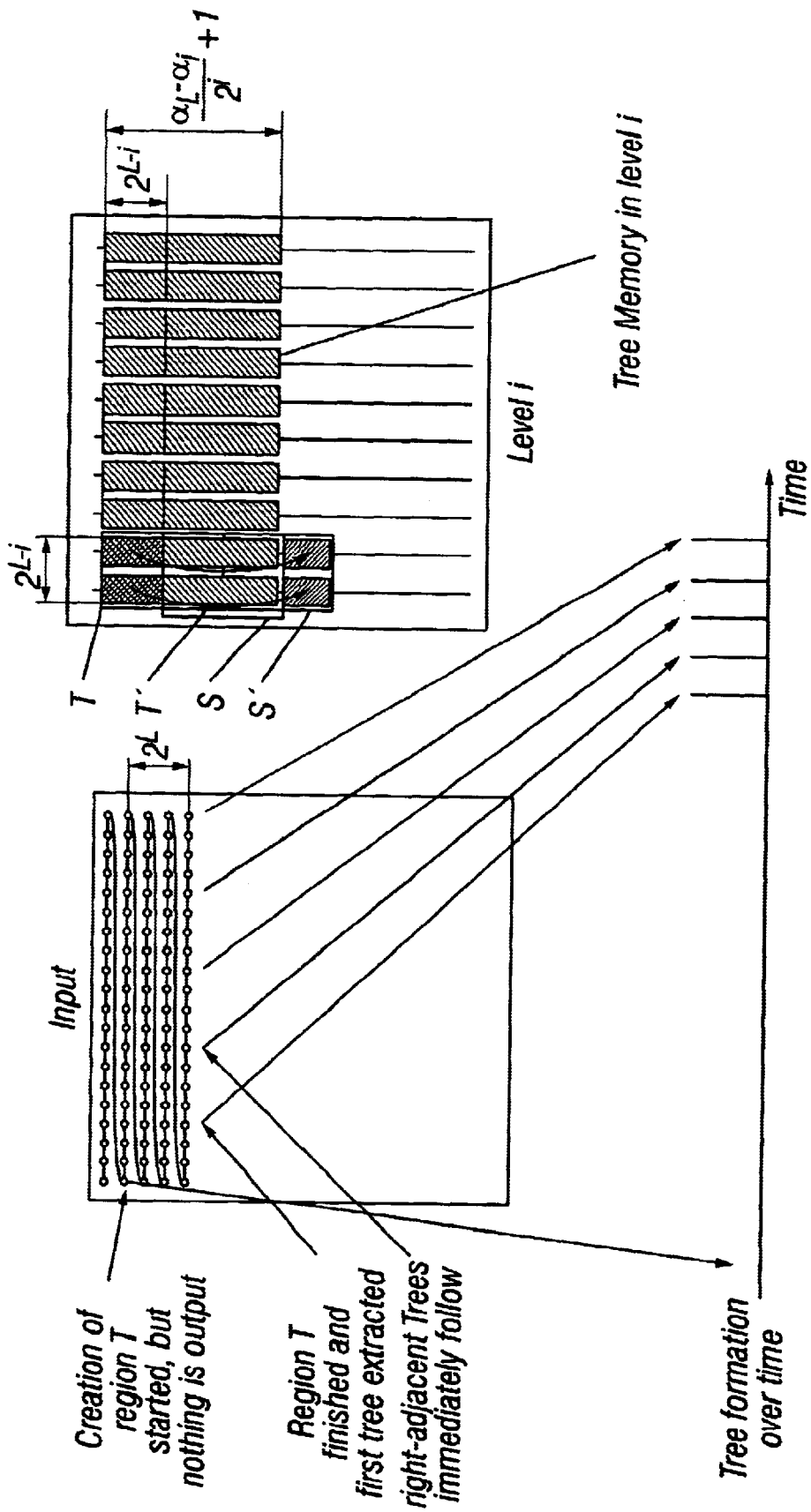
FIG. 15 is a schematic representation of the bursty creation of parent-children trees in the 2D row-by-row approach.

The tree memory requirements, however, are still large. Indeed, the tree memory collects all the HL, LH or HH samples which are created after the column filtering pass and which contribute to one parent-children tree. Not surprisingly, tree memory is aligned along columns for allocating one column filtering memory to each column. Each such tree memory extends in one column over a region $(\alpha_L-\alpha_i)/2^i+1$, with $\alpha_i$ being the latency of eq. (1). All these column-aligned tree memories cluster to a large memory region, spread over the full image width. The tree memory management in each column, corresponds to the process of FIG. 10, extended to 2D as shown in FIG. 15: each time a 2D parent-children tree is extracted, the corresponding square memory region is freed and moved downward, for preparing the bottom-adjacent tree. As shown in FIG. 15, the row-by-row data processing creates the trees, lying in an input band of height $2^L$, in a quite bursty way: during the first $2^{L-1}$ input rows, all trees are incrementally erected, but their formation is only finalized at the $2^L$-th pass, during which suddenly all trees are transferred to the interface memory. For spreading out the activities uniformly over time, the interface memory has a size of the order of magnitude of $2^L$. The main characteristics of this configuration are summarized in Table 7. In FIG. 15, T and T' are the foreground tree memories for two adjacent trees and S and S' are the corresponding background tree memories.

Due to the row-by-row processing, the parent-children trees are formed in a bursty way, as explained above which is not preferred. This can be avoided in accordance with a preferred embodiment of the present invention by not letting either the row or column filtering extend over more than the width of the region contributing to the current parent children tree. The processing in a full row or column of the image is thus partitioned into adjacent regions. One aspect of the present invention is to filter a data structure, e.g. an image made up of pixels which has been subdivided into regions whereby the scheduling of the calculations in all the levels is substantially regionally synchronised. Regional synchronisation in accordance with the present invention may be described as scheduling the data processing such as to provide availability of a cluster of all topologically related pixels in all the levels from one region at the same time while avoiding the complete calculation of the next such cluster. A typical cluster is a parent-children tree. Another aspect of the present invention is that the calculation of the first layer and all layers in the other levels in a first seed region starting at the zero level (data input) is scheduled so that any substantial calculation of data in any layer of the next region is delayed until all the calculations in all levels of the first region have been completed.

In accordance with one embodiment of the present invention in each 2D region of the obtained partitioning, the processing is performed as follows: full row filtering over the first region in layer 0 of level 0, full column filtering over layer 0 in the first region in level 0, row filtering over the first layer in the first region in level 1, column filtering over the first layer in the first region in level 1, etc. until all levels have been processed. Then the next regions are processed in the same way. In a general case with the data structure to be filtered having "n" dimensions, the elements of the data structure being in the zero level and the data structure being subdivided into "m" regions, the scheduling comprising: filtering a zero layer in the zero level in a first region in a first dimension followed by filtering the zero layer in the zero level in the first region in a second dimension and so on up to filtering the zero layer in the zero level in the first region in the $n^{th}$ dimension; filtering each subsequent layer of the first region in each dimension in this way up to the last layer in the last level in the first region; filtering a zero layer in the zero level of a second region in a first dimension followed by filtering the zero layer in the zero level of the second region in a second dimension and so on for each subsequent dimension up to the $n^{th}$ dimension for the zero layer in the zero level in the second region; filtering each subsequent layer of the second region in each dimension in this way up to the last layer in the last level of the second region; and filtering each subsequent region in this way through all the layers thereof and in each dimension up to the last layer in the last level in the $m^{th}$ region.

Figure 14:
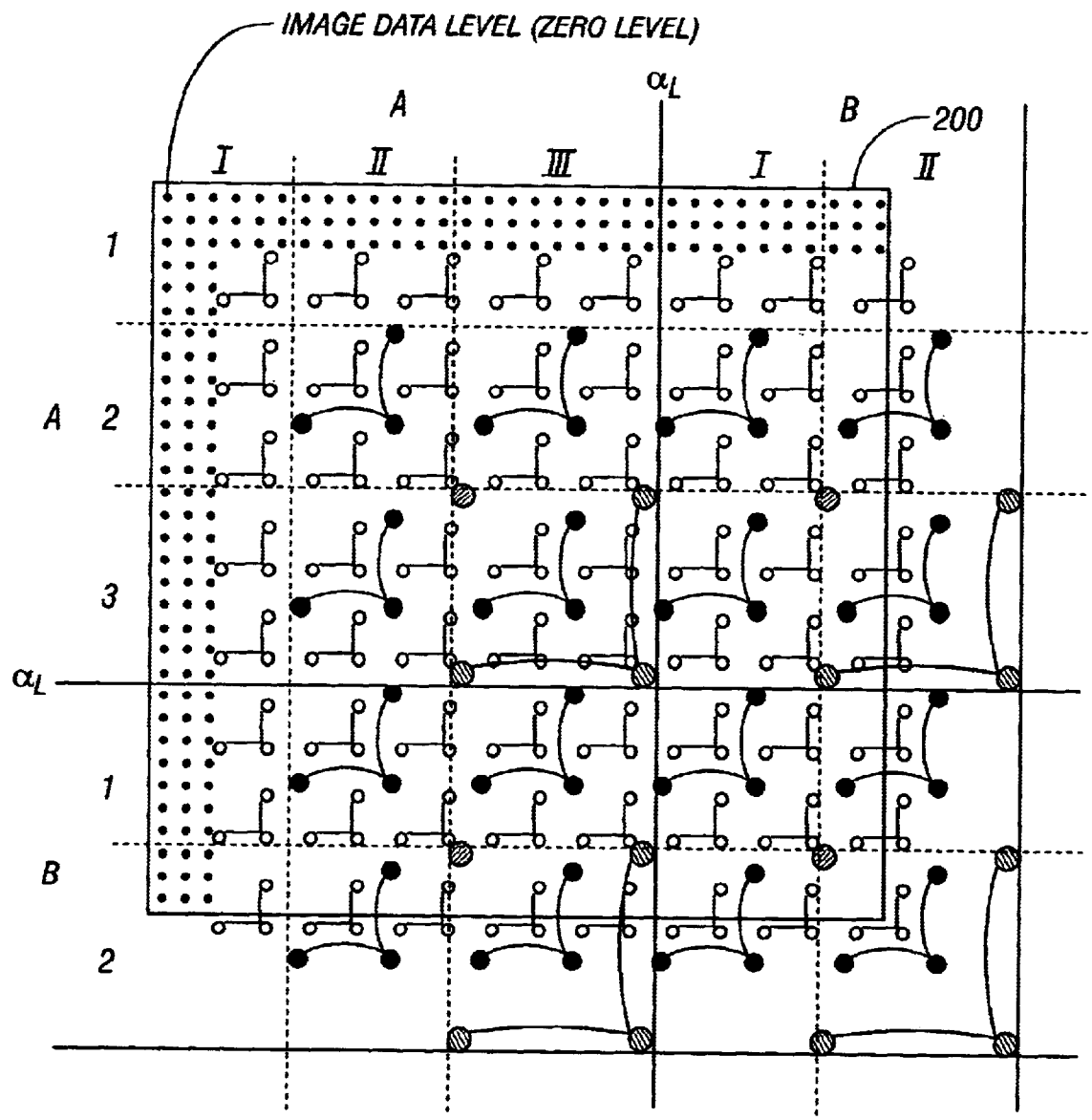
FIG. 14 is a temporal representation of the extension of the ID MTA schedule into a 2D block-based schedule according to another embodiment of the present invention.

FIG. 14 illustrates a full process in accordance with an embodiment of the present invention, using the temporal representation of a fictitious 3-level, 3-tap Lowpass/3-tap Highpass 2D wavelet transform: the representation of FIG. 13(b) has been subdivided into regions traversed in the order Aa, Ba, Ab, Bb. The marking of the trees in FIG. 13(b) has not been included in FIG. 14. Region A is a basic seed region in accordance with the present invention. The regions Ba and bA are supplementary seed regions. The region made up of bB is the first steady-state region and may be as small as one block. In a filtering process of a multi-dimensional data structure in accordance with the present invention, a seed region is a first processed region of the data structure having the same number of dimensions as the data structure to be filtered. For a three dimensional data structure it is therefore a three-dimensional region. A basic seed region includes sufficient data to create at least the first parent children tree. A supplementary seed region contains sufficient data which, with the data available from the basic seed region or another supplementary region, results in extraction of at least a further parent-children tree. The basic and supplementary seed regions together in accordance with the present invention also contain sufficient data to provide steady-state regions with the overlap data in all levels so that all data is available for the processing of the steady state region to generate at-least a further parent-children tree. One aspect of the present invention is to subdivide an image into seed and steady-state regions whereby the seed regions are relatively large but once processed they allow efficient processing of the majority of the image which is made up of small steady-state blocks.

In each region only one foreground filtering memory is required, i.e. a FIFO memory that contains the last 2M+1 input values during the row filtering or the column filtering. Background filtering memory, equal to the area of the respective region ((1) and (2) in Table (e2), respectively at start-up and in steady state), is required to transfer the results between the row and column filtering passes. We call this memory "Inter-pass memory" (IPM). Furthermore, the information that has to be transferred (overlap data) row-wise from one region to a row-wise adjacent region for enabling the row filtering in the latter region, is stored temporarily in an additional background filtering memory, aligned along the column boundary between these two regions (see (4) in Table 7(e2) and FIG. 21=$OM_1$). This memory will be called "overlap memory" (OM). Similarly, an overlap memory is required to transfer information column-wise for the column filtering in the column-wise adjacent region (see (3) in Table 7 (e2) and FIG. 21=$OM_2$). The tree memory contains all the HL, LH and HH samples in the currently processed region. Except for the start-up phase at the top and left image borders (i.e. including all the seed regions, both the basic seed and the supplementary seed regions), the time elapse between two adjacent trees is constant. Trees are thus created almost uniformly in time, so that the interface memory is restricted to the size of one tree in the LH, HL and HH subbands (possibly two trees if double-buffering is required). The memory requirements (and reuse) are summarized in FIG. 21 and Table 7 (column e).

Figure 21:
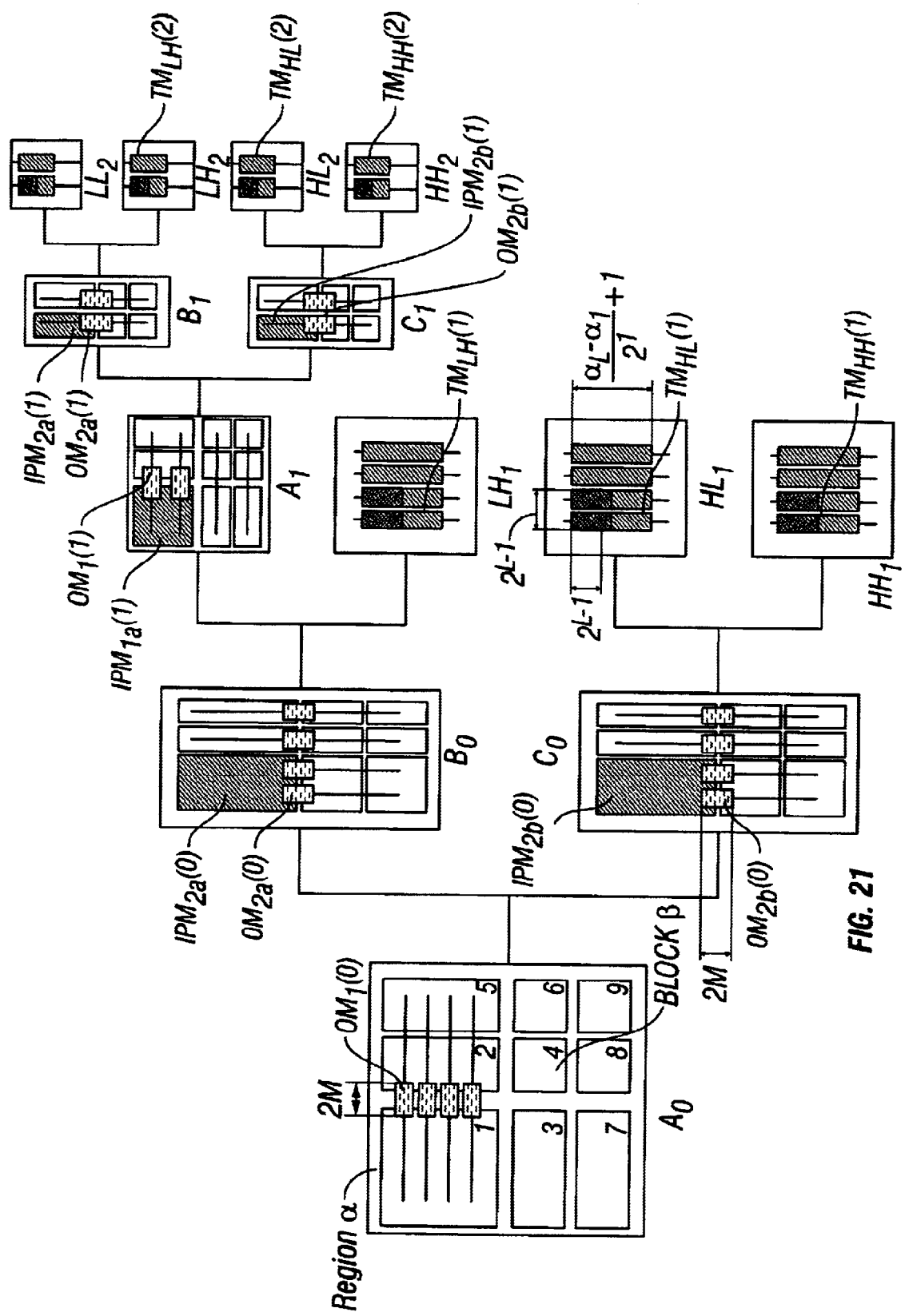
FIG. 21 is a schematic representation of the development of the overlap, tree and inter-pass memories in accordance with an embodiment of the present invention.

FIG. 21 shows how the regions are processed throughout the image. The image is subdivided into α-regions=seed regions and β-blocks=steady-state blocks, without further subdivision of the α-regions. The regions or blocks are traversed according to the numbers indicated in A0. For each region or block, the different levels of the wavelet transform are traversed, creating the corresponding region or block in the images B0, C0, A1, LH1, HL1, HH1, B1, C1, LL2, LH2, HL2 and HH2. The regions or blocks in B0 and C0 are created out of the corresponding region or block of A0 by respectively a lowpass and highpass filtering along dimension d1 (row filtering), constrained to that particular region or block. By an additional Lowpass and Highpass filtering along dimension d2 (column filtering) in the region or block, the corresponding regions or blocks of images A1, LH1, HL1 and HH1 are created in level 1. A1 is further row filtered in the current region or block to create the corresponding region or block of images B1 and C1, which, after column filtering in the region or block creates the regions or blocks in LL2, LH2, HL2 and HH2. For storing the intermediate results of the row filtering process of one particular region or block (e.g. region number 1) in level 0, the $IPM_{2a}(0)$ is used in B0 and the memory $IPM_{2b}(0)$ is used in C0. $IPM_{2a}(0)$ and $IPM_{2b}(0)$ form together the inter-pass memory. The memory $OM_1(0)$ holds overlapping information that will be used during the row filtering of region number 2 in A0. $OM_{2a}(0)$ and $OM_{2b}(0)$ hold overlapping information that will be used during the column filtering of the next block to be processed in images B0 and C0. $OM_1(0)$ corresponds to the Overlap Memory of level 0 in the row dimension, while $OM_{2a}(0)$ and $OM_{2b}(0)$ correspond to the Overlap Memory in the column dimension of level 0.

After having performed the row and column filtering of the first region or block in level 0, the first region or block is created in image A1 in level 1. The corresponding region or block information that is created in images LH1, HL1 and HH1 is stored into the Tree Memories $TM_{LH}(1)$, $TM_{HL}(1)$ and $TM_{HH}(1)$.

The first region or block of A1 is now processed in a similar way, creating the first region or block in images B1, C1, LL2, LH2, HL2, and HH2. The processing requires the memory $IPM_{1a}(1)$ during the row filtering. The corresponding results are written back in the $IPM_{2a}(1)$ and $IPM_{2b}(1)$ memories. Some information is stored in memory ($OM_1(1)$, $OM_{2a}(1)$ and $OM_{2b}(1)$) for processing the next adjacent region or block in a later stage. The information created in images LH2, HL2 and HH2 is stored into the tree memories $TM_{LH}(2)$, $TM_{HL}(2)$ and $TM_{HH}(2)$.

After having processed all levels for the first region of A0, the next region (number 2) can be processed in a similar way. The processing will use information that has been previously stored into the Overlap Memories $OM_1(0)$, $OM_{2a}(0)$, $OM_{2b}(0)$, $OM_1(1)$, $OM_{2a}(1)$ and $OM_{2b}(1)$. All the Overlap Memories are simultaneously active, meaning that the information from one Overlap Memory is not allowed to replace some information stored in another Overlap Memory. The situation is different for the IPM memories. Indeed, once the memory $IPM_{1a}(1)$ starts to read or store some valuable information, the information that was present in $IPM_{2a}(0)$ and $IPM_{2b}(0)$ is useless. Therefore, $IPM_{1a}(1)$ is physically just a part of $IPM_{2a}(0)+IPM_{2b}(0)$. Similarly, $IPM_{2a}(1)$ and $IPM_{2b}(1)$ are physically part of $IPM_{1a}(1)$. In general, it is sufficient to allocate one IPM memory which has the size of $IPM_{2a}(0)+IPM_{2b}(0)$ at start-up and reuse this memory throughout the different levels.

Figure 18A:
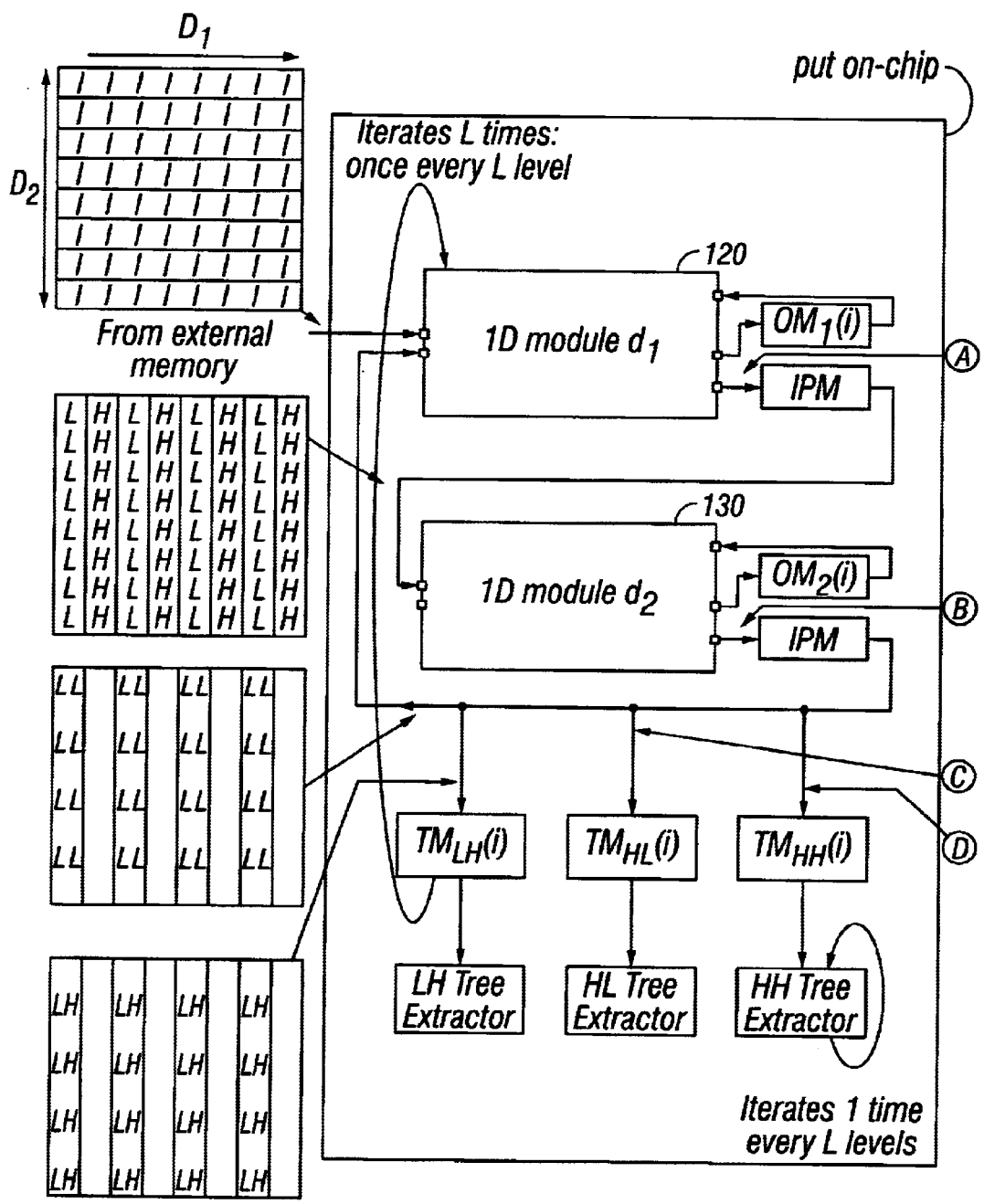
FIG. 18 is a schematic representation of a 2D filtering apparatus in accordance with another embodiment of the present invention.
Figure 18B:
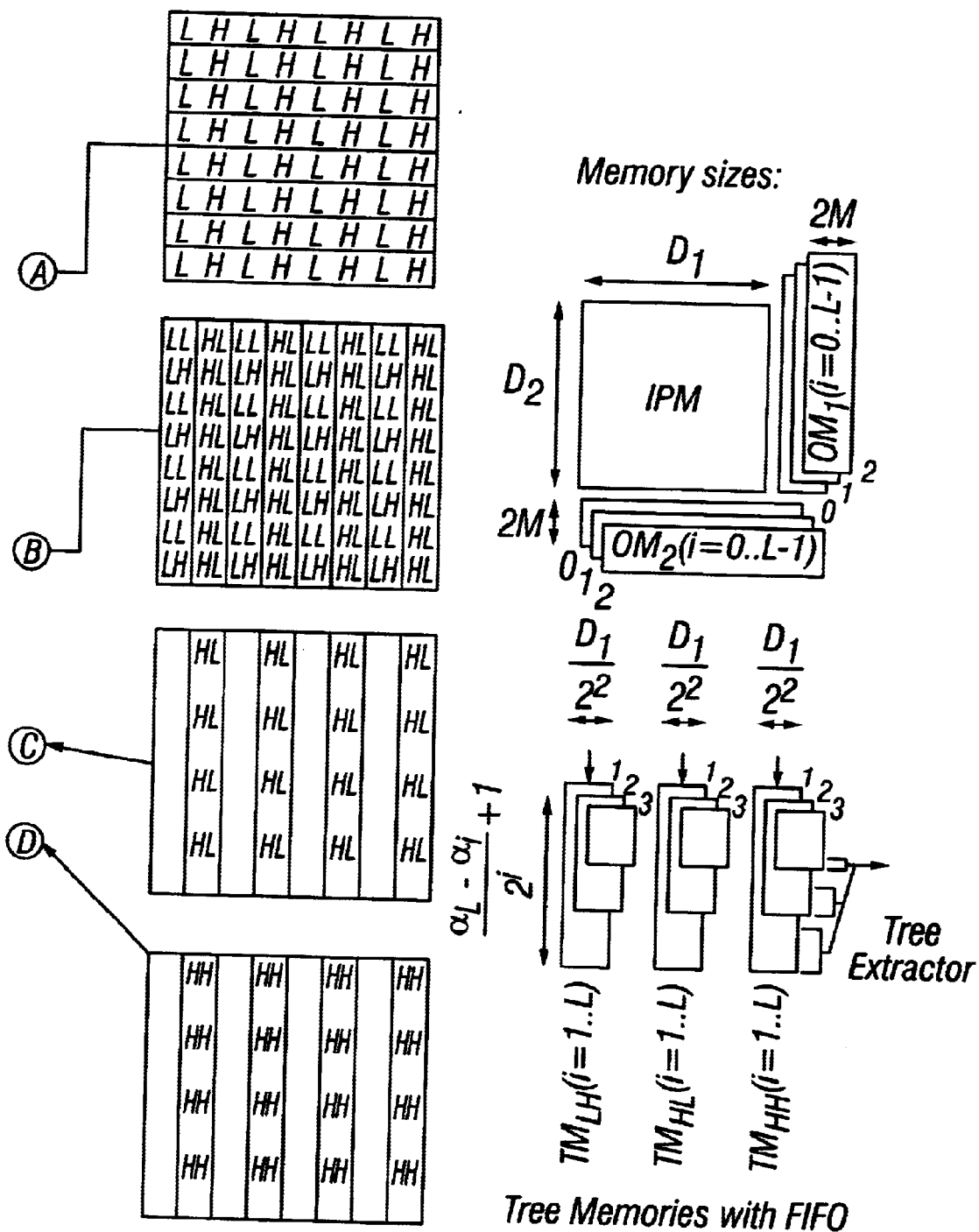

The Tree Memories for one-dimensional images are basically FIFO memories aligned along the columns of the LH1, HL1, HH1, LH2, HL2 and HH2 images. Their sizes are judiciously chosen throughout the levels, so that once the first pixel in the highest level of the wavelet transform is created, the data that is coming out of these FIFO memories correspond exactly to one tree in the HL, LH and HH images. For two- or more dimensions these memories are preferably memory arrays, e.g. in RAM, whereby the accessing of the data in the array is controlled by a delay which is related to equation 1 and the subsampling process. More precisely, for each level i, the data corresponding to a tree should be extracted [M*(2^i−1>>level] samples earlier out of the RAM, in each dimension (rows and columns for the two-dimensional case). The corresponding delays are thus different in each level in order to maintain synchronisation. Accordingly, these memory arrays are effectively skewed with respect to both column and rows as best shown in FIG. 18, "Tree memories with FIFO". As for the one-dimensional case, the size and the accessing of these memory arrays should be chosen so that once the first pixel in the highest level of the wavelet transform is created, the data that is coming out of these memory arrays corresponds exactly to one tree in the HL, LH and HH images.

Since the Inter-Pass memory (IPM) is determined by the maximum area of the regions, which can be quite large according to eq. (1), further memory savings can be obtained by further subdividing region Aa into blocks as well as sub-dividing regions Ba, Ab yielding the partitioning with the dashed lines in FIG. 14 (AI1, AII1, AIII1, AI2, AII2, AIII2, AI3, AII3, AIII3, BI1, BI2, BI3, BII1, BII2, BII3, bAI1, bAII1, bAIII1, bAI2, bAII2, bAIII2, bBI1, bBI2, bBII1, bBII2). The blocks need not be rectangular in shape in accordance with the present invention nor need they all be of equal size. A block may be as small as a single data point. We will refer to the MTA schedule for filtering of multi-dimensional data structures as "the Block-based approach" in accordance with the present invention. The number of required memory read accesses is given in Table 7 (e7). Formulae (e7) and (a7) are similar if the image border effects are neglected (large image size: N→∞): the image size in (a7) is replaced by the block size in (e8).

In a general case for performing the N dimensional wavelet transform, successive filtering operations are performed in the different dimensions and throughout different levels in a synchronized fashion. The input image is partitioned into non-overlapping, adjacent regions and/or blocks. Each region or block is iteratively filtered along its different dimensions, in order to create the wavelet transformed data for that particular region or block. For each input region or block, one region or block is created for each level of the wavelet transform. A region or block in a seed region (α region) initiates the filtering operation in the corresponding dimension. Any seed region or block can be followed by a steady state region or block (β block), which utilizes the initiated data of the seed region or block. For example, to create the block D in FIG. 16, a basic seed region filtering must first be performed in each dimension of the A region followed by filtering the supplementary seed regions B and C in each dimension.

Figure 16:
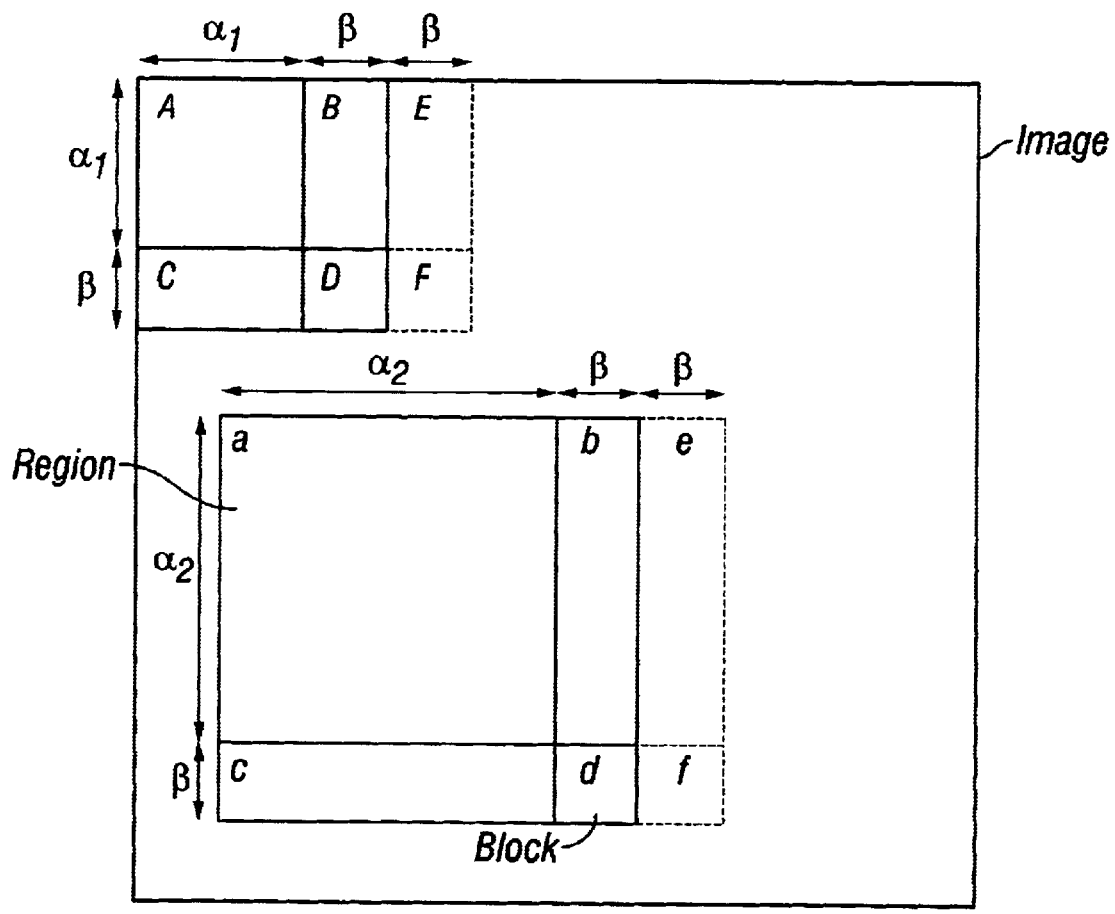
FIG. 16 is a schematic representation of the subdivision of an image into basic seed, supplementary seed and steady-state regions in accordance with an embodiment of the present invention.

Notice from FIG. 16 that a basic seed region "A" may be located along the borders of the image or may be a basic seed region "a" located within the image. A basic seed region "a" within the image appears larger than a basic seed region "A" adjacent the borders because the latter duplicates some pixel values (symmetrical extension, zero padding) along the edges of the region in order to have enough data for performing the filtering operation, while the former do not need to duplicate any data (but they could in which case they would be the same size). Further, the data values in all levels which are located adjacent to the borders of an "a" region and which would be required (overlap data) for starting up in any direction may be stored in a special memory, e.g. background memory.

A filtering apparatus in accordance with the present invention, whether it is used for encoding or for decoding, may include a control means, a filtering module, an output memory and background memory. For instance, the output memory for encoding may be the interface memory 8. The control means controls the data flow from the input to the filtering module and the background memory. In particular the control means may control the operations of the switches in the filtering module for controlling the flow of data through the module. The control means in accordance with the present invention may be a microprocessor, a microcontroller, a personal computer, work station or similar intelligent device. The filtering module in accordance with the present invention may include specialised memories such as the overlap memory, tree memory and inter-pass memory. The processing steps for the basic seed regions (A of FIG. 16) of the border and the within the image type (a) as well as the steady-state blocks (D or d) for the operations along one dimension are described for a module 115 of FIG. 17 in Tables 8, 9 and 10. The extension to N dimensions is shown in FIG. 18 (here two dimensions). All data is stored in the Overlap Memories (one for each level and each dimension) and the Inter-Pass Memory (IPM), which is common through all levels and all dimensions.

Figure 17:
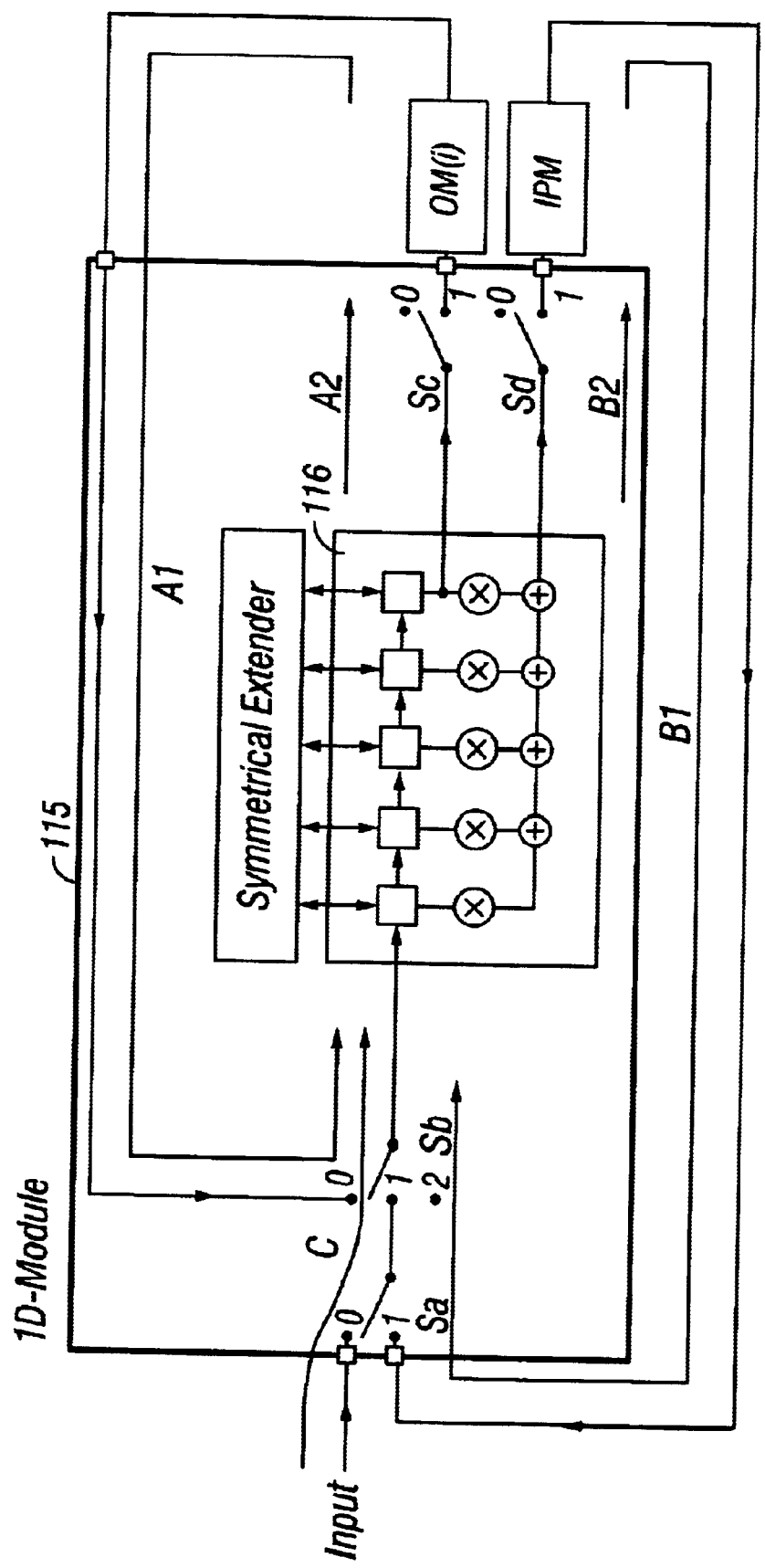
FIG. 17 is a schematic representation of a ID filtering module in accordance with an embodiment of the present invention.

With reference to FIG. 17, the data can flow through different dataflow paths A1, A2, B1, B2 and C by a proper configuration of the switches Sa, Sb, Sc and Sd. Each configuration transports one pixel of the image at a time in a number of successive cycles. This number of cycles is indicated by "# cycles" in tables 8 to 10. If a switch that is connected to a memory input port (e.g. switch Sd of the IPM in FIG. 17) is closed (put in state 1), the corresponding memory will read data through this switch and store it. If a switch that is connected to a memory output port (e.g. switch Sa of the IPM in FIG. 17) is closed (put in state 1), the corresponding memory will provide some of its data through the switch to the module it is connected to. In tables 8 to 10, an R indicates that a pixel is Read from the corresponding memory, a W indicates a write operation and an X indicates that the corresponding memory has no function at that particular time stamp. Since different Overlap Memories exist (one per level: 0 to L−1), a number between brackets indicates the level number of the corresponding Overlap Memory that is addressed. Since there is only one Inter-Pass Memory (IPM), which is common to all levels, such a number is not used for the IPM. Also notice that the input channel can only be in status R (Read from) or X (not active).

With reference to FIG. 17, the 2M+1 tap filtering is basically performed by the structure of FIG. 5c, with a 2M+1 register FIFO 116. One Lowpass (L) and one Highpass (H) value is created in level i for every two Lowpass values in level i−1. Since all the Lowpass and Highpass values are written into the IPM memory in sequential order, the gap between the Lowpass values in the IPM is equal to $2^i$. The Overlap Memory (OM) however, only contains Lowpass values, so that all read and write operations to and/or from the OverlapMemory (OM) are performed sequentially, without skips.

When processing a steady state block, the module 115 of FIG. 17 basically has two loops. Loop A (=A1+A2) has the function of transferring information between two adjacent blocks. Before a filtering step is started, the filter FIFO memory 116 is filled by data of the previous level by reading along path A1, through switch Sb. After a filtering operation is performed on a block, the values in the filter FIFO memory 116 are transferred to the Overlap Memory (OM) along path A2 for preparing the overlap operation with an adjacent block in a much later stage.

Loop B (=B1+B2) is used for the actual filtering by reading data from the successive levels through path B1, performing the filter calculations and writing the results back into memory (IPM) along path B2.

Processing a basic seed region is different from the processing a steady state block in that path A1 does not exist with a basic seed region. The reason is that for a basic seed region the first block is prepared in the corresponding traversal dimension. Basic seed region processing also requires a larger number of cycles than for steady-state blocks, since additional filtering operations must be performed for preparing the first meaningful values in the Overlap Memories. This is reflected by the difference in the number of cycles in steps 3 and 5 of tables 8 and 9.

Notice in step 4 of table 9 that during the basic seed region processing, the Overlap Memories (OM) are written into, preparing the content of these memories for being used in steady state block processing. As shown in table 8, steady state block processing reads from (step 2 and 4 in table 8) and writes to (step 4 in table 8) the Overlap Memories. The read operation is used to extract information from a left- or top-adjacent region or block (a basic seed region, a supplementary seed region or a steady-state block), while the write operation prepares the information transfer to the right- or bottom-adjacent supplementary seed region or steady-state block.

The difference between the processing of the basic seed regions at the image border or within the image, relates to the way the data needed for the filtering is read. Processing of basic seed regions at the border of an image will be called α1-mode, processing basic seed of regions within the image will be called α2-mode and processing of a steady-state block will be called β-mode processing. A 2M+1 tap filter needs 2M+1 data samples (pixels) in order to be able to perform the first filtering operation. The α2-mode and β-mode both read 2M samples in step 2 (or 4) and 1 additional sample during the first cycle of step 3 (or 5) in tables 8 and 9. In α1 mode these 2M+1 samples are created from M+1 pixels, read during step 2a (or 4a) in table 10, by copying the M first pixels during steps 2b and 2c (4b and 4c). Thus, while the α1 mode only reads M+1 samples from the previous level (step 2a or 4a in table 10), the α2-mode must read 2M+1 samples from the previous level (step 2+first cycle of step 3 or step 4+first cycle of step 5).

Figure 19:
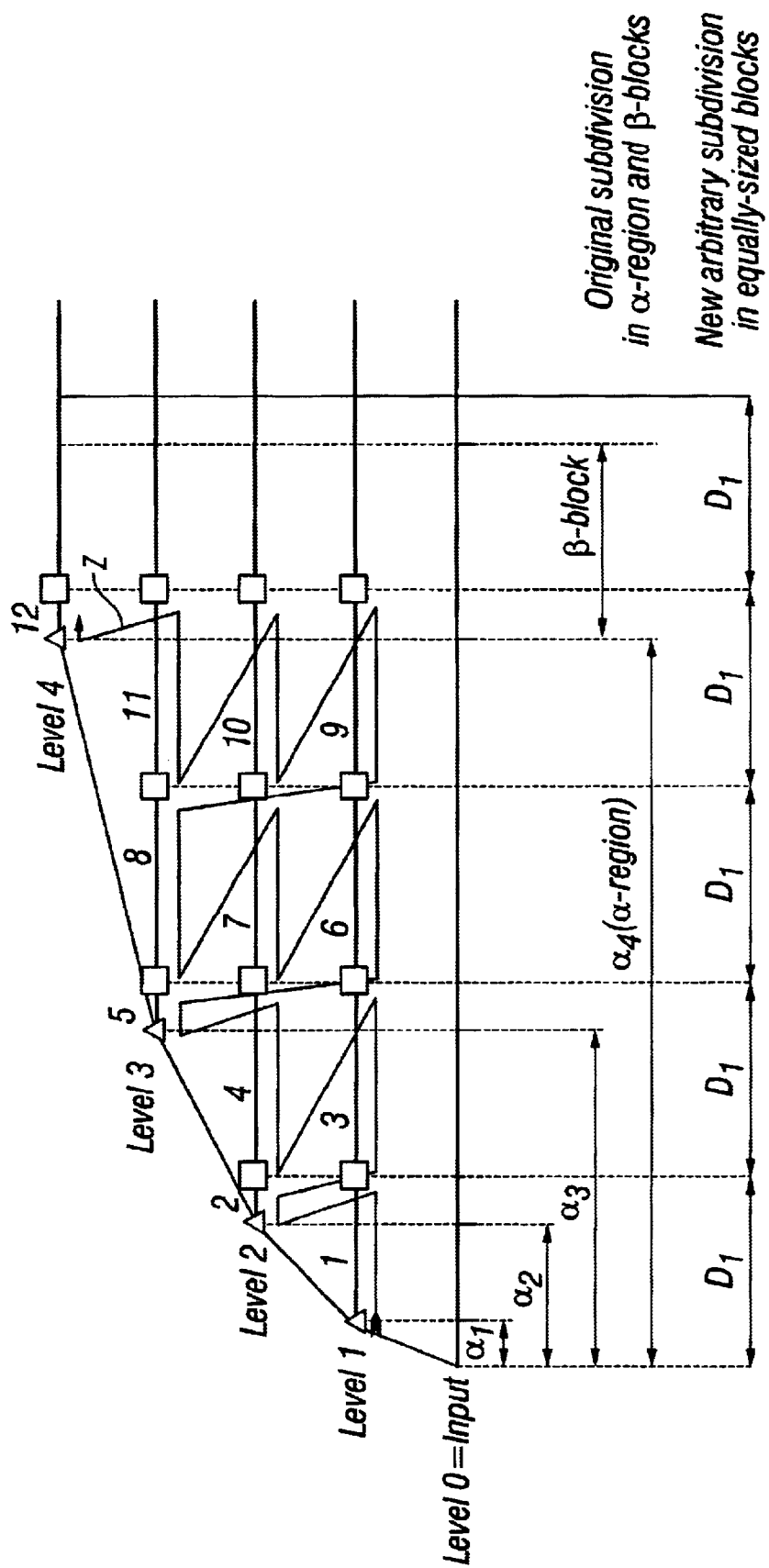
FIG. 19 is a schematic representation of the 1D traversal schedule for a seed region including blocks in accordance with an embodiment of the present invention.

Proper synchronisation between the different levels is obtained by scrupulously applying the number of cycles in steps 3 and 5 of tables 8 and 9: the number of calculated data samples in the different levels i of a seed region takes the data-dependencies expressed in equation (1) into account and ensures that the minimum number of data samples are calculated for rippling-through these data-dependencies from the lower level of the wavelet transform to the highest level. FIG. 19 shows the traversal for the calculation of the seed region (α-region with processing delays $\alpha_1, \alpha_2, \alpha_3, \alpha_4$), followed by the calculation of a steady-state block (β-block), using the temporal representation of the wavelet transform (for 4 levels of the wavelet transform). FIG. 19 is a one dimensional representation but it should be understood that each block is traversed in all dimensions and levels before moving to the next block. Notice that the seed region is much larger than the steady-state block as a result of the much higher number of cycles in steps 3 and 5 (table 8 and 9) in the α1 and α2 modes compared to the β-mode. The corresponding memory requirements can be decreased by partitioning the seed region into blocks of width $D_1$ and traversing the levels according to the MTA traversal scan "Z". The input block size $D_1$ can be arbitrarily chosen, but is preferably equal to the size of a steady-state block. The following defines a number of rules, which basically emanate from tables 8 to 10 and which summarise the processing steps of FIG. 19:

General Rules i_old=0 at start-up;

At any time, following holds:

The values in level i are created from level i−1;

Every time another level is processed, i_old is set to the previously processed level value;

In the Processing of Seed Regions (α-mode)

Rule r1 if(α1-mode)

{ if (i==1) read M+1 samples from input;

else read M+1 lowpass samples from the IPM /*one every $2^{i-1}$ samples, thus only Lowpass values */;

Perform symmetrical extension;

} else

{ if (i==1) read 2M+1 samples from input;

else read 2M+1 samples from the IPM /*one every $2^{i-1}$ samples, thus only Lowpass values */;

}

Perform a filtering operation;

Rule r2 if (i>1) write each sample getting out of the filter FIFO into the Overlap Memory of level i−2;

In the Processing of Steady-state Blocks (β-mode)

Rule r3

Read 2M samples for the Overlap Memory of level i−1;

Rule r4 if (i>1) write each sample getting out of the filter FIFO into the Overlap Memory of level i−2;

else if (i=1) write each sample getting out of the filter FIFO into the Overlap Memory of level i_old-1;

Rule r5 if (i==1) read 1 pixel from input;

else read 1 pixel from the IPM /*skip $2^{i-1}$ samples for selecting only Lowpass values */;

Perform a filtering operation;

Rule r6 write the filter output pixel into the IPM on the same position as the previous read operation from the IPM;

With reference to FIG. 19, 3 important pixels can be defined:

1. The triangles correspond to the start of a seed block and therefore rules r1 and r2 should be applied.
2. The squares correspond to the start of a steady-state block and therefore rules r3 and r4 should be applied.
3. For any sample point between triangles and squares, rules r5 and r6 must be applied.

By traversing the blocks in the temporal representation of FIG. 19, as shown by the arrows or traversal scan [Z], one of the 3 kinds of sample points stated above are traversed. For each sample point, the corresponding action must be performed.

As already stated before, each block is traversed along all dimensions before traversing the next block in the next higher level of the wavelet transform or if no higher levels are available, the next adjacent block of the zero level. A description of FIG. 18 illustrates the concept in two dimensions, but can easily be generalized to N dimensions. Two 1D filtering modules 120, 130 are present. As will be clear later, the two modules 120, 130 are triggered one after the other, so that they can be merged into one hardware module (see FIG. 20). For clarity in the data flow, this merging is not shown in FIG. 18. Each module 120, 130 in the figure corresponds to the structure of FIG. 17, with the input channels at the left and the memory ports at the right. Each module 120, 130 for filtering the dimension j of level i, has its own Overlap Memories OMj(i). All modules 120, 130 share the same Inter-Pass Memory IPM. For one specific input block of level i, all modules 120, 130 are traversed from top to bottom in time, without increasing the level i. After having traversed the last module "i" is incremented by one. This procedure is repeated until the highest level is reached. At that time, the level is set to 1 and the next block is processed according to the same procedure. The first block in a given dimension is processed in α-mode, the next adjacent blocks in the same dimension are processed in β-mode. Each dimension has a traversal order equivalent to that of FIG. 19 (with or without subdividing the α-region).

A particular N-dimensional (N=2) block of size D1×D2 is read row-by-row and each row is filtered by module 120. The results are written to the IPM in row by row fashion. Once the block has fully been traversed in the d1 dimension, the IPM memory will be read along the d2 dimension (column by column) and will be processed by module 130. The filtered data is then written back to the IPM. For this last dimension, the non-LL values are stored in a tree memory (1 for each kind of the non-LL values). The next level can now be processed by reinjecting the LL-values of the IPM into module 120 and choosing a block size D1×D2 (possibly different from previous size), corresponding to the number of pixels in each dimension d1 and d2 in the next higher level, as read from FIG. 19. This process is repeated for each level in each block.

In FIG. 18, two filtering hardware modules 120, 130 are shown, one for each dimension. The number of processors can be incremented by unrolling the loop that iterates over the levels. In these circumstances, some processors are calculating the first level, others are calculating the next levels, etc. For obtaining a single-processor implementation, the two modules 120, 130 of FIG. 18 should be merged. Since the two modules 120, 130 are activated at a different time stamp, this can easily be done. This results in the configuration of FIG. 20, in which the switches SA, SB, . . . SF must be set according to table 11.

In a general case in which the data structure has "n" dimensions, the data structure being subdivided into "m" regions and the elements of the data structure being in the zero level, a preferred scheduling for one embodiment of the present invention is: filtering a first block in the zero layer in the zero level of the first region in a first dimension followed by filtering the first block in the zero layer in the zero level of the first region in a second dimension and so on for each dimension up to filtering the first block in the zero layer in the zero level in the first region in the $n^{th}$ dimension; filtering each subsequent layer in each subsequent level in each dimension in the first block up to the last layer in the last level; filtering each subsequent block in each layer in each level of the first region for all the dimensions up to the last block in the last level in the first region; and filtering each layer in each level in each dimension in each block in each subsequent region up to the last block in last layer in the last level for the $m^{th}$ region.

Minimization of filtering memory by the Row-Row approach in the VTA schedule mentioned above is not the best choice for optimising filtering memory access, especially when parent-children trees also have to be extracted. The optimal choice is obtained with the Block-based approach in accordance with the present invention, using blocks of $2^{L-i}.N_L \times 2^{L-i}.N_L$ pixels in level i. According to Table 4, the number $N_L$ of parent-pixels in one block should be chosen at least equal to 4 in a 4-level (L=4), 7/9-tap (M=4) wavelet decomposition, for guaranteeing a negligible increase of the filtering memory access, compared to the optimal value of 2.67 read accesses per output sample (the Row-Column approach: (a8) in Table 7). On the contrary, if one chooses $N_L$=1, 4.67 filtering memory read accesses must be performed per output sample, which is almost twice as large as the former minimum value.

Using the Row-Row/VTA technique (column (c) of Table 7) reduces the filtering and tree memory requirements from 2 M samples (full frame memories of size $N^2$ in columns (a) and (b) of Table 7) down to 103 k Samples for a 4 level, 7/9-filter tap, 1024×1024 pixels wavelet codec. With the Block-based technique according to the present invention, the memory size (filtering and tree memory only) increases by only 0.6%, while the memory accesses are reduced with a factor between 2.4 (for $N_L$=1) and 4.2 (for $N_L$=4) ((c8) or (d8) divided by (e8) of Table 7). If the Interface memory is also taken into account (its precise size depends on the implementation—the value of (c–d,5–6) is taken in Table 7), the total memory size actually decreases by 15% from the Row-Row/VTA to the Block-based approach.

Observe that for $N_L$=1, a 4-level wavelet decomposition is perfectly manageable by subdividing the input image in 16×16 pixel blocks, creating a perfect compatibility with the macroblock size in DCT codecs. One advantage of the Block-based technique according to the present invention is thus that the wavelet (de)coding can be performed macroblock by macroblock, without introducing blocking artefacts as in a DCT codec. Indeed, algorithmically the wavelet transform has not been altered: only the calculations have been "topologically localized". For better performances (e.g. $N_L$=4), the macroblock size should be chosen larger (e.g. 4×4 DCT macroblocks), but still remains much smaller than the full image size. The novel Block-Based approach in accordance with the present invention combines the advantages of the Horizontal (HTA) and Vertical Traversal Activation (VTA) schedules, i.e. reduced memory access cost of the HTA and small memory size of the VTA. The memory access cost can be controlled by adequately varying the number $N_L$ of parent-pixels, between 1 and 8. In practice, for $N_L$=8 the optimal value of 2.67 memory read accesses per output sample is closely approached.

In the above the filtering apparatus for an encoder in accordance with the present invention has been described in detail. The present invention also includes a filtering apparatus for a decoder. As the decoder basically performs the inverse of the encoder function, the decoder will mainly be described for the one dimensional case. The skilled person will appreciate that it can be extended to a plurality of dimensions. Further, the decoder will be described with reference to the inverse wavelet transform but the present invention is not limited thereto. A decoder in accordance with the present invention may use output from a filtering scheme which produces a multi-level representation from the original image data, the multi-level representation comprising clusters of all topologically related pixels in all the levels resulting from the filtering of one area of the original image. Such a cluster may be a parent-children tree.

Figure 22A:
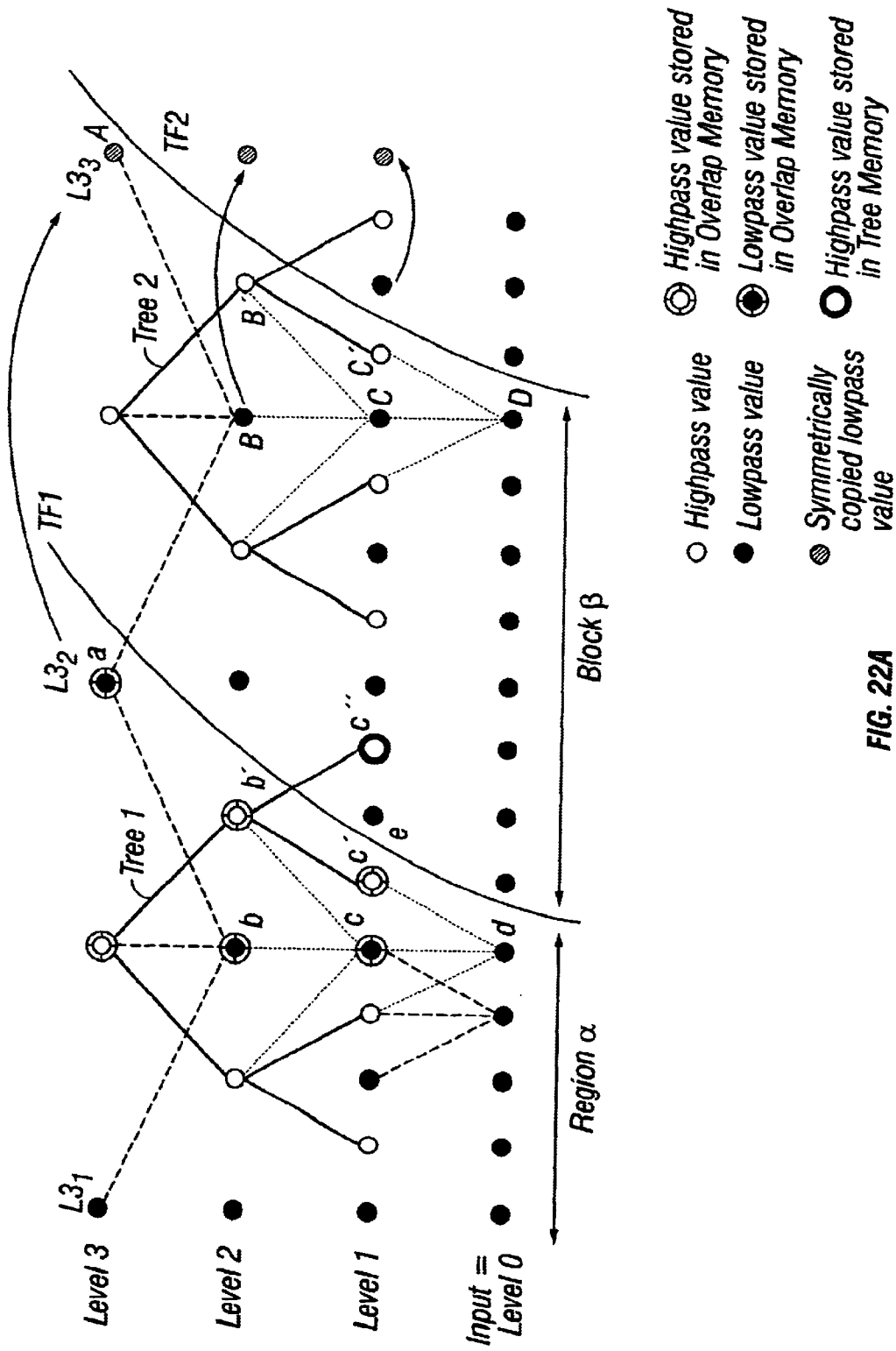
FIG. 22(a) represents the multi-level wavelet inverse transform with data-dependency links and parent-child trees and FIG. 22(b) summarizes the transformation rules.
Figure 22B:
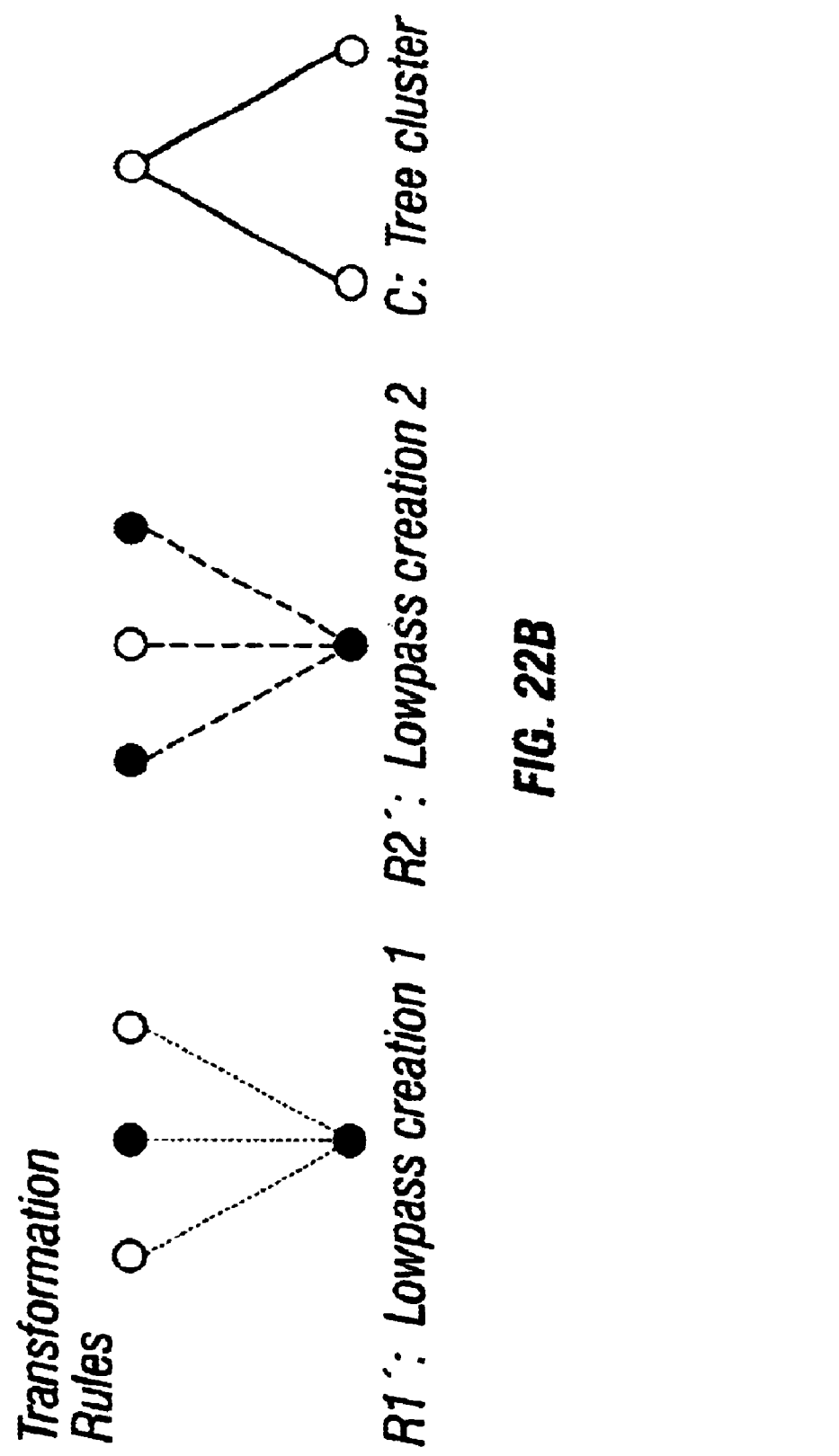
FIG. 22 shows the topological representations of the in-place data organisation of the 1D inverse wavelet transform for a fictitious 3-tap wavelet in accordance with an embodiment of the present invention, whereby

FIG. 22 shows the topological representation of an embodiment of a one dimensional inverse wavelet transform which can be used in a filtering apparatus in accordance with the present invention for a decoder. This embodiment uses lapped cluster processing, that is the data from a neighbouring cluster (tree) is stored and used in the calculation of the image region associated with the current cluster. Three levels are shown, but the method may be applied to any number of levels. Three-tap filters are shown, but the method may be applied to N-tap filters (preferably N=2M+1) as well. The inverse wavelet transform reconstructs the original image (level zero) starting from the highest level (level 3) and working down to the input level (level 0). When filtering level i to create level i–1, the transformation rules of FIG. 23 are applied. As shown in FIG. 23(a1), the lowpass values and Highpass values of level i are upsampled (i.e. introduction of zero values) and filtered to create the lowpass values of level i–1. For instance, to create lowpass value O1 in level i–1, the input values i1, i2 and i3 (i1 and i3 are the lowpass values of level i, while i2 is an injected zero value) are filtered and combined with the filtered result of the input values I1, I2 and I3 (I2 is a Highpass value and I1 and I3 are injected zero values). For the next lowpass value of level i–1 (O2), the roles of the zero and non-zero values are reversed. Therefore, each lowpass value of level i–1 is created through transformation rule R1 or R2 of FIG. 23(b1). Obviously, the influence of the zero values can be discarded, leading to the transformation rules R1' and R2' of FIG. 23(b2). As shown in FIG. 23(a2), these rules can be applied on level i to create level i–1, with the assumption that the lowpass and highpass values are interleaved, as shown in FIG. 23(a2). Applying these rules iteratively from the highest level, down to the lowest level, the inverse wavelet transform of FIG. 22 is created for a fictitious 3-tap Highpass/3-tap Lowpass inverse wavelet filter. The input values fed to an inverse wavelet transform module in accordance with the present invention are the parent-children trees (Tree1, Tree2, . . . ) and the Lowpass values of the highest level of the wavelet transform ($L3_1$, $L3_2$, . . . ). Parent-children trees may be transmitted from the encoder to the decoder in indivisible clusters. Alternatively, parts of trees or clusters may be transmitted from the encoder to the decoder. The Lowpass values $L3_1$, $L3_2$, . . . can be transmitted at any time, depending on the transmission order. For instance, in a progressive transmission scheme, all the Lowpass values $L3_1$, $L3_2$, . . . could be transmitted prior to any parent-children tree. Alternatively, Lowpass values and a selection of Highpass values may be transmitted to the decoder, that is partial trees or clusters may be transmitted.

Suppose that at a given time stamp, Lowpass values $L3_1$, $L3_2$ and the first parent-children tree (Tree 1) are transmitted to the decoder. Level 3 of the decoder contains thus all the information up to sample a. All lowpass values of level 2 can be calculated up to sample b, using the rules R1' and R2' of FIG. 23($b2$) or FIG. 22($b$). The highpass values are not calculated, since they are transmitted from the encoder to the decoder. Obviously, all highpass values of level 2, up to sample b' are available at the decoder. Applying rules R1' and R2' again on level 2, the lowpass values of level 1 can be calculated up to sample c, while the highpass values of level 1 are available up to sample c". Between sample c' and c", the lowpass value e cannot be calculated, because there is not sufficient data available in level 2 to do so. Thus, from parent-children Tree 1, only the highpass values of level 1 up to c' will be used in the next iteration, creating the input level 0, up to sample d. Sample c" is stored in memory (Tree Memory) for later use. All samples in the different levels of region α, delimited by the line TF1, have been calculated/read during the above processing steps. The TF1 line can be considered as the Time Front Line for calculating region α. If the second parent-children tree (Tree 2) is input, together with $L3_3$ (which is here a symmetrically copied sample), all samples up to the Time Front Line TF2 can be calculated/read, thus allowing reconstruction of the β-block, containing $N_L.2^L$ samples in level 0 ($N_L$ is the number of parent-children trees that are read for processing the current block—here $N_L=1$). Similar to the processing in the wavelet transform (filtering apparatus as described above, encoder), the processing in the inverse wavelet transform (filtering apparatus, decoder) is thus performed region by region (or block by block), where in each region the processing is performed level by level (or layer by layer). The difference is that in the inverse wavelet transform:

1) the processing in each region or block is performed from the highest level down to the input level.
2) The seed region α of the inverse transform is typically smaller than a β-block such, as a steady-state block belonging to a central part of the image of the inverse transform. In fact, the size of region α of the inverse transform is determined by the data dependency links emanating from the first tree and lying at the left of line TF1, and the associated, calculated lowpass values. Therefore, in this embodiment the region α has an extent smaller than one tree. For filters with a large number of taps N, it is possible that the region α must input several successive trees in order to be able to create at least one sample in level 0 of region α as will be described below with respect to the next embodiment.

Figure 20:
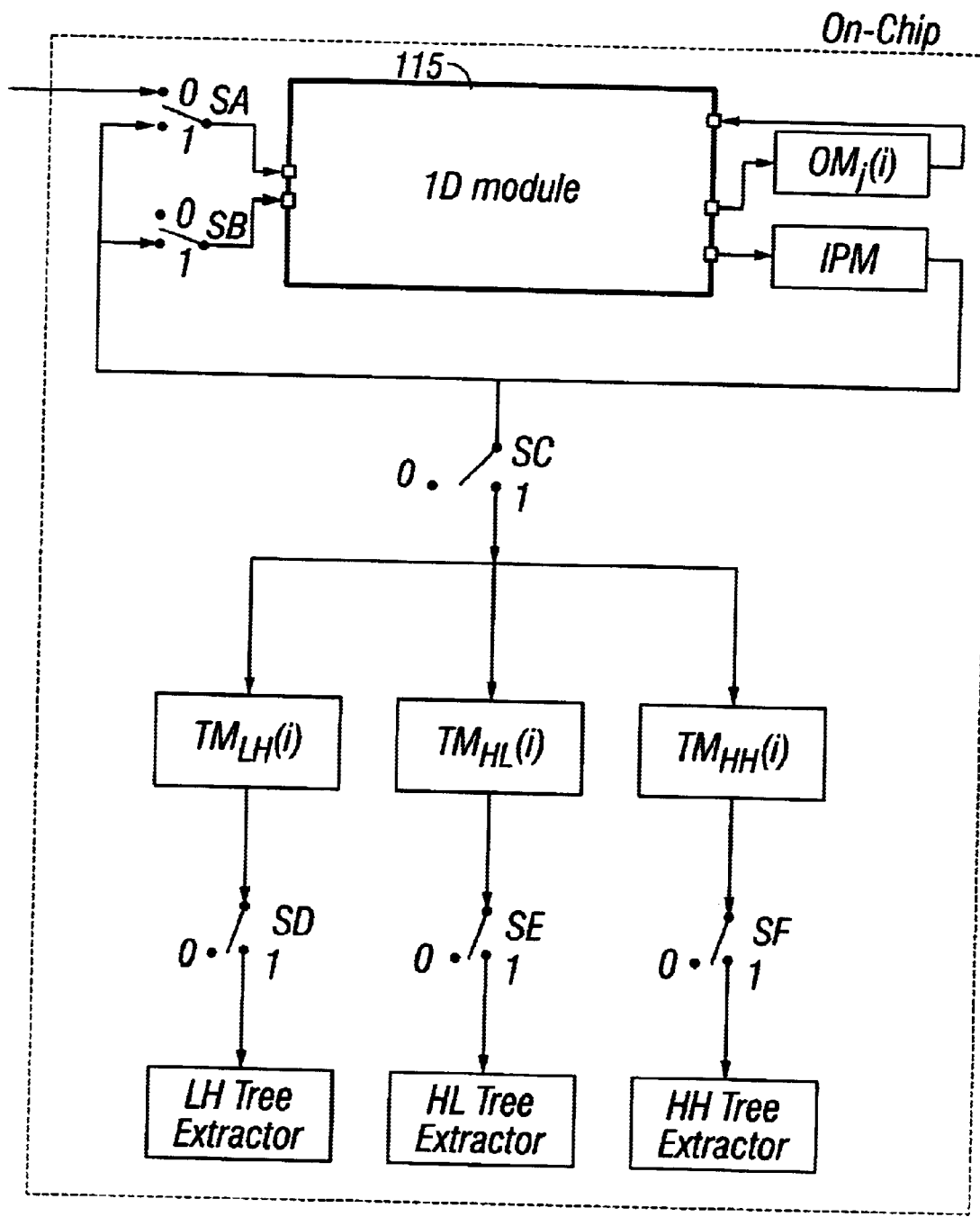
FIG. 20 is a schematic representation of a filtering module based on a single-processor architecture in accordance with another embodiment of the present invention.

The processing of the inverse wavelet transform is similar to the processing of the wavelet transform described above including the MTA schedule in accordance with the present invention, with the exception that everything is performed in the inverse. order. Any of the processors described above as suitable for use with the present invention may be adapted for use for the inverse transform. When using a processor as shown in FIG. 20 for decoding, for instance, the parent-children trees received by the decoder are first input into the Tree Memories (which are essentially FIFO memories with different lengths for different levels), before being processed in the filtering module. These Tree Memories introduce different delays between the different layers of a parent-children trees, in order that all data coming out of these Tree Memories at a particular time stamp are involved in the calculation of the current region. The Tree Memories, are thus used for extracting the relevant information for the current processing, which may use different parts in the different levels of adjacent trees.

The Highpass values of the parent-children trees that are not involvedin the current processing of the current region, will be kept in the Tree Memory for later use. Referring to FIG. 22, this situation occurs with Highpass value c" that is read when processing region α, but which will only be used when processing the adjacent region β.

Figure 24:
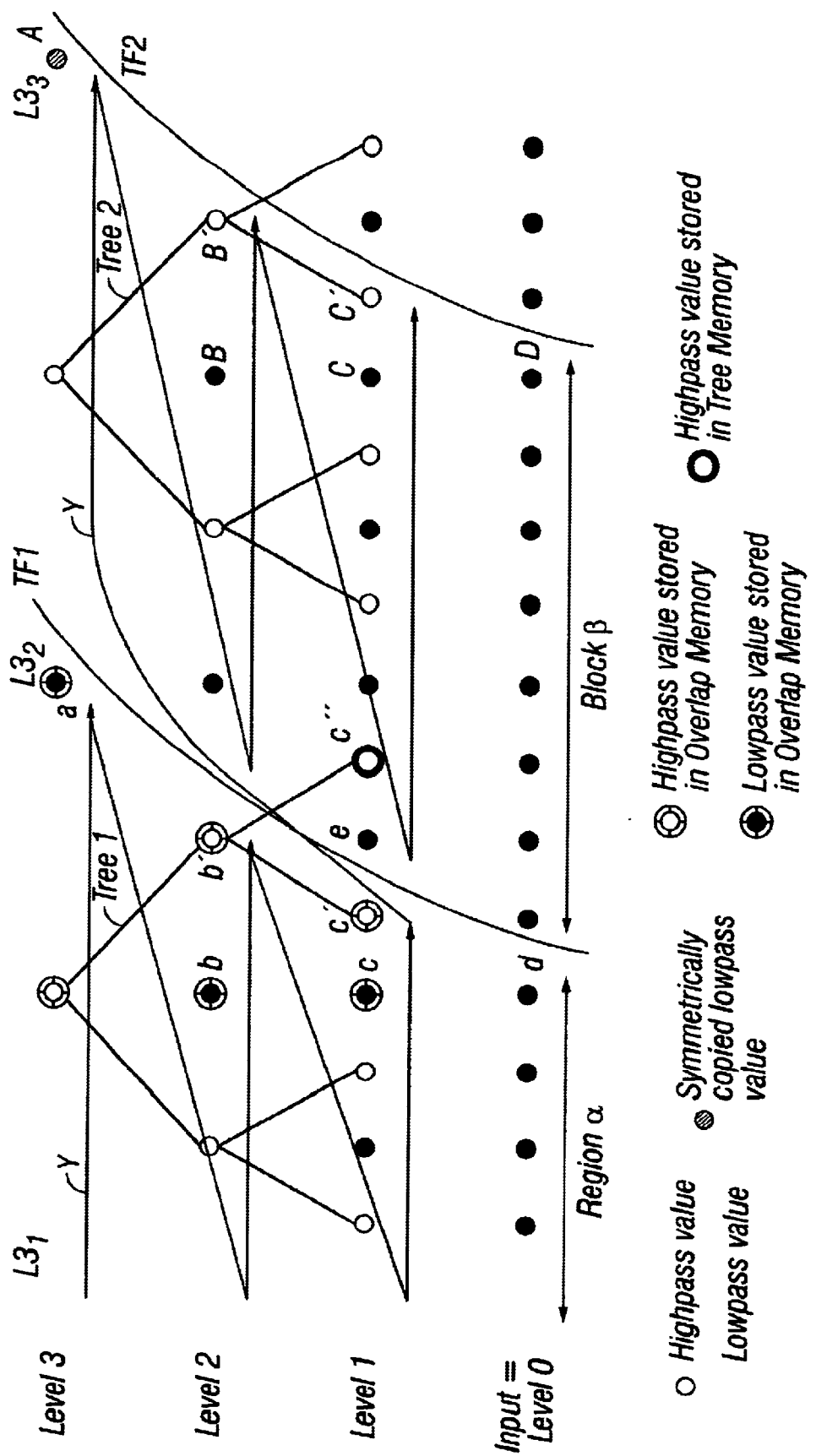
FIG. 24 is the topological representation of FIG. 22(a) showing the inverse MTA traversal scheme in accordance with an embodiment of the present invention.

In a particular region, the data is processed from the highest level, down to level 1, along the traversal (Y) of FIG. 24. The processing is then continued with the next tree to generate the adjacent region β. For processing this region, some overlapping information from the previous region must be recovered. This is made possible by previously storing that information into overlap memories, as shown in FIG. 24: b' and c' for instance are stored into a Highpass overlap memory, while a, b and c are stored into a Lowpass Overlap Memory, during the processing of the previous region. Inter Pass Memory (IPM) is used to pass information from one level to the next lower level, when performing the processing in one region. The overlapping information is used in accordance with the present invention to avoid (eliminate) block edge effects. Hence, the decoding process in accordance with the present invention may be called lapped cluster processing or lapped tree processing in an analogous way to the lapped region or lapped block processing of the encoder.

Similar to the processing of the wavelet transform, the Inter-Pass Memory can be reduced by subdividing the region into adjacent blocks, as has been explained with reference to FIG. 19. The one-dimensional inverse wavelet transform can now be extended in a similar way as has been discussed for the wavelet transform previously, i.e. each region or block is successively traversed in all the dimensions in one level, before starting the processing in a next lower level, or in case level 0 is reached, before starting the processing in the adjacent region.

Figure 25A:
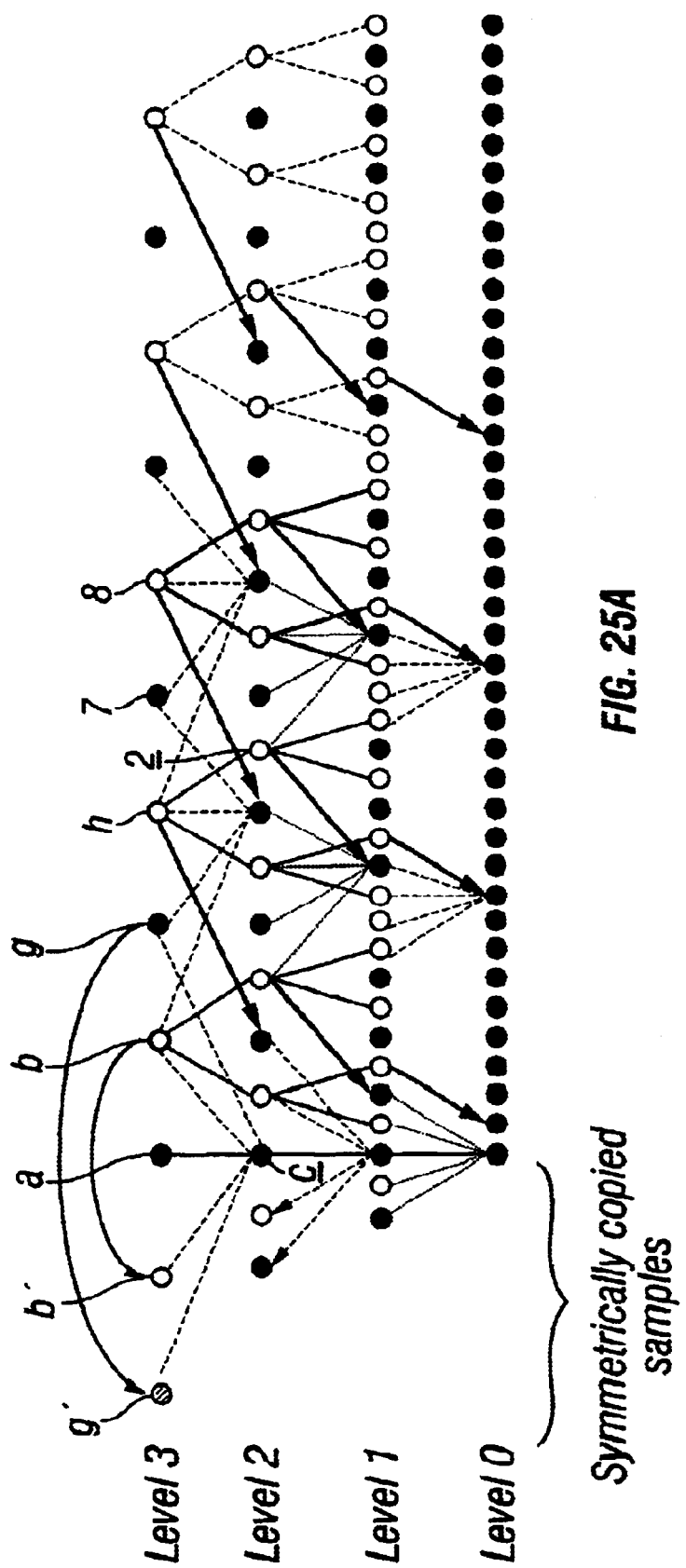
FIGS. 25A, B and C are schematic representations of a decoding scheme in accordance with an embodiment of the present invention for a one-dimensional signal (image).
Figures 25B, 25C:
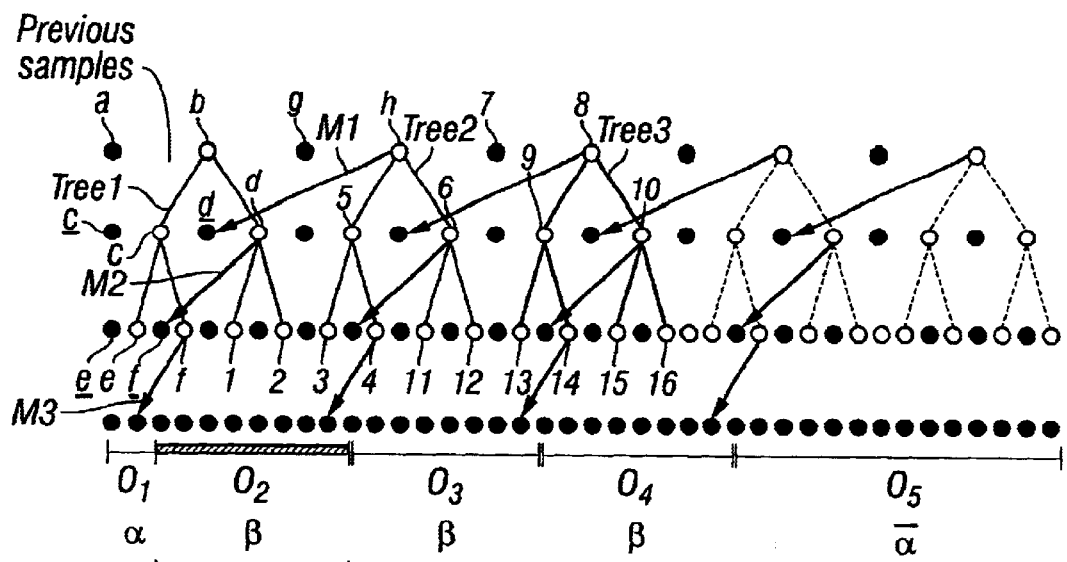
Figure 25C:
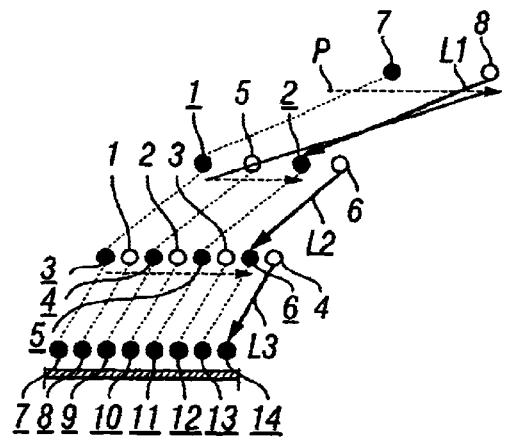

FIG. 25 shows the data dependency lines involved in the calculation of the inverse wavelet transform with a fictitious one dimensional 5-tap Lowpass/5-tap Highpass wavelet filter in accordance with a further embodiment of the present invention. The description is however also valid for any 2M+1 tap wavelet filter. All Lowpass samples from a level are calculated by successive filtering operations, in which Lowpass and Highpass samples of the next higher level are involved (for 5-tap filter, 5 samples are involved in the calculation). Iterating this process from the Highest level, down to level zero, recreates all Lowpass samples, corresponding to the data recovered by the inverse wavelet transform.

As in the wavelet transform, samples that are not available (not there) at one side of the image border may be symmetrically copied, as shown in FIG. 25A. For instance, for calculating sample c, samples g', b', a, b and g from the higher level (level 3) should be read. Since g' and b' do not physically exist (they are over the left of the image border), they are reconstructed from samples b and g by a simple copy process (see arrows).

To reduce memory requirements, the inverse wavelet transform used in the decoder, is preferably calculated block-by-block. For each additional DC-value (a in FIG. 25B) and Tree-samples (b, c, d, e, f, 1 and 2 in FIG. 25B), a new output block is created by filtering operations using a Filtering Memory FM, Overlap Memories OM and an Inter-Pass Memory IPM. Since not all the Tree-samples contribute to the reconstruction of a current output block, some of them are preferably stored in a Tree Memory and retrieved for future output blocks to create. Only transmitting those Tree-samples to the decoder that are actually involved in the calculation of the current output block is a preferred embodiment in accordance with the present invention, since the Tree Memory can be reduced by this procedure. However, in applications where data is coded along a zero-tree structure, all samples along this tree are often made available at the decoder as one cluster, requiring the introduction of the Tree Memory.

Figure 26A:
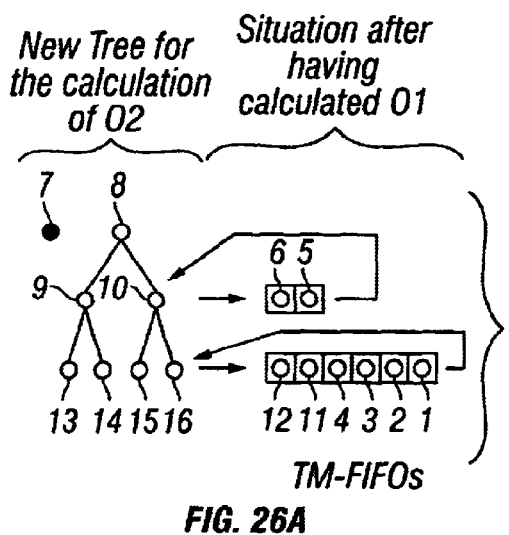
FIGS. 26A, B, C are schematic detailed representations, of the decoding scheme of FIG. 25.

As in the forward wavelet transform, the blocks at the borders of the reconstructed (signal) image (the initial α-block at the left and the final $\bar{\alpha}$-block at the right) do not have the same size as the blocks inside the body of the signal (image), which are called β-blocks or steady-state blocks. For the purpose of clarity, the process for β-blocks will be explained supposing that all the memories are brought into an initial state using the α-blocks. Indeed, for creating α-block O1 in FIG. 25B, all the samples at the left side and on the time front lines M1, M2 and M3 have been created/used (see FIG. 25B). This means that from Tree 1, only the samples a, b, c, d, e and f of FIG. 25B have been used and from Tree 2, only samples g and h are used. Samples 1 and 2 from Tree 1 and samples 3, 4, 5, 6, 11 and 12 from Tree 2 are stored in the Tree Memory TM, leading to the configuration of FIG. 26A. As for the encoder case, processing of sufficient first data is carried out for the first reconstructed region to generate all data necessary for the correct filtering of subsequent data. It may be necessary to process more initial data than for a later steady-state block to achieve this. For instance, in the above scheme two trees are read for being able to calculate initial block O1.

Figure 26B:
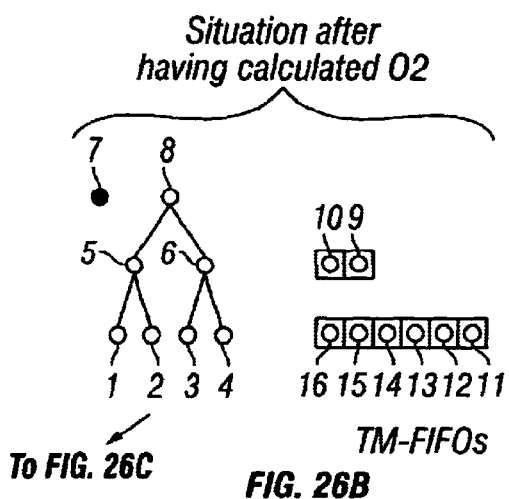

For calculating output block O2 in FIG. 25B, the third Tree (Tree 3) must be read. The data of Tree 3 is used, together with previously stored data, to create output block O2, along the calculation path P of FIG. 25C, i.e. from top level, down to level 0 (which corresponds to the reconstructed block O2). The DC-value (7) in FIG. 25C, together with the Highpass values 1, 2, 3, 4, 5, 6 and 8 are involved in this process. Since these Highpass values are not all available in the current Tree (Tree 3) (see FIG. 25B), some data is accessed from the Tree Memories TM (see FIG. 26A). These Tree Memories are basically FIFOs, in which values of the current Tree are pushed (see FIG. 26A). The values that are popping out of the FIFOs are reinjected into the Tree (see FIG. 26A), resulting in the configuration of FIG. 26B. The so-created Temporal Tree of FIG. 26B (samples 1, 2, 3, 4, 5, 6, 7 and 8) is transferred to the Inter-Pass Memory EPM. All filtering operations are performed in this IPM memory. As shown in FIG. 27, the complete filtering process consists of different iterations. First, the Filtering Memory FM is prepared by reading for each level the last 2M samples that have been involved in the filtering operation of the previous block for that particular level. Thus, after having created the output block O1, the samples a, b, g and h of level 3, the samples c, c, d and d of level 2 and e, e, f and f of level 1 are stored in their respective Overlap Memories OM (see FIG. 26C). During the filtering operations for creating output block O2, these samples are read from the Overlap Memories OM and transferred to the Filtering Memory FM, according the schedule of FIG. 26C.

Figure 26C:
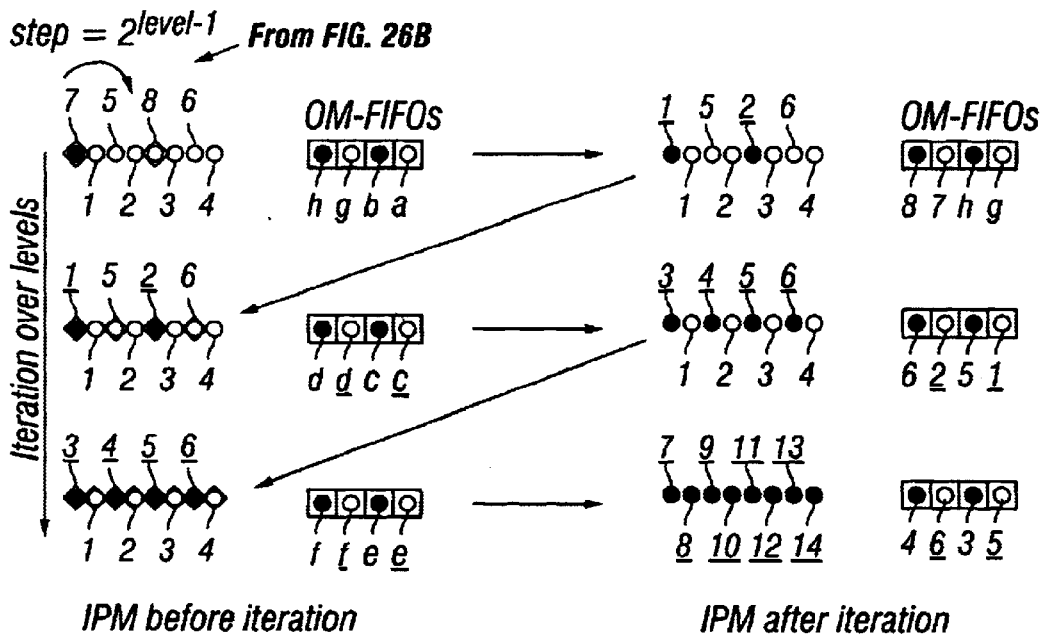
Figure 27:
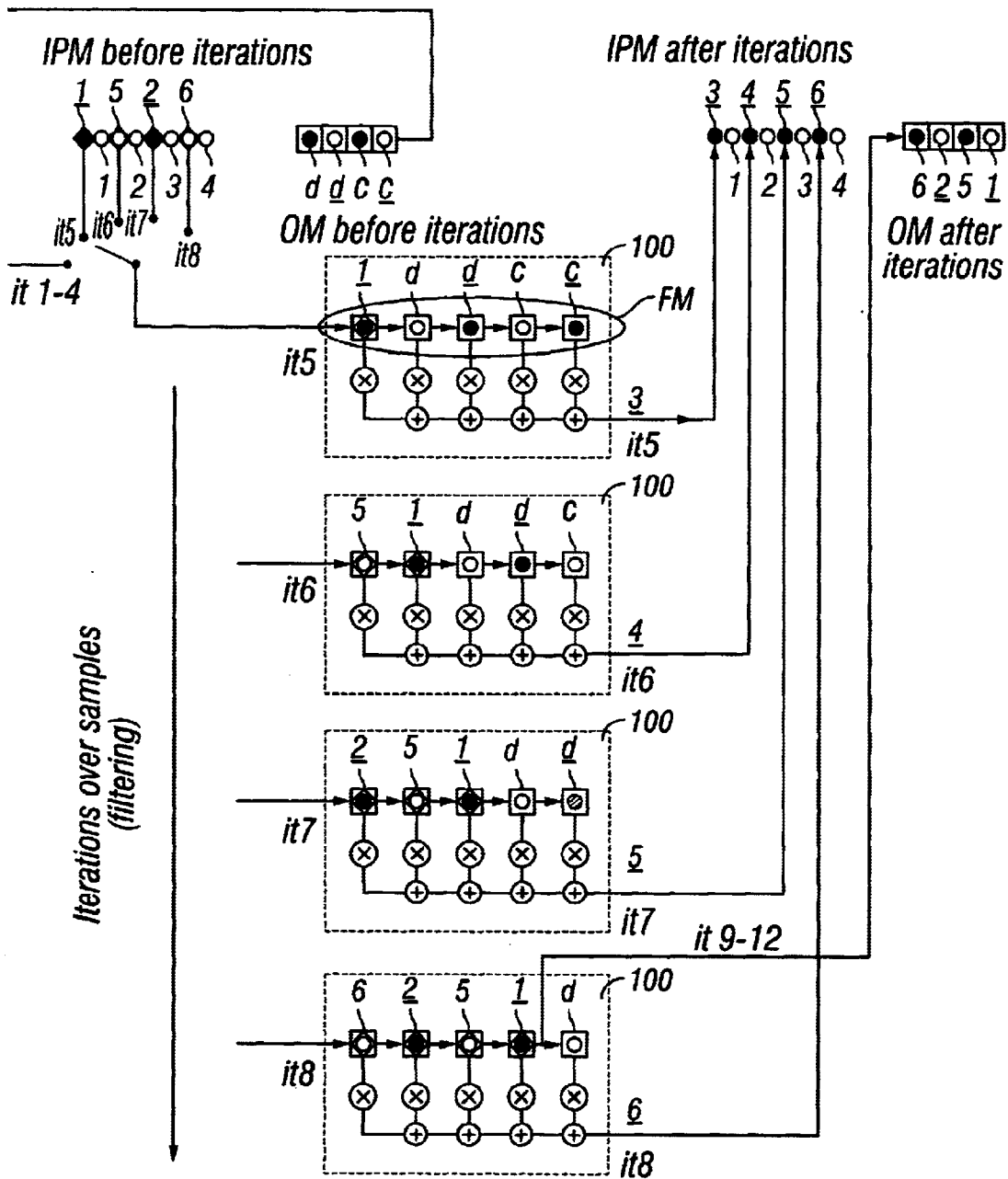
FIG. 27 is a schematic representation of data flow in carrying put the iterations of FIG. 26C.

FIG. 27 shows in more detail the process behind the symbolic representation of FIG. 26C, row2. The samples 1, 1, 5, 2, 2, 3, 6 and 4 of the EPM memory undergo a filtering process by successive iterations (it 1 to it 12—see FIG. 27) using a processor 100 similar to that shown in FIG. 5C. During iterations 1 to 4(it 1–4), the filtering Memory FM is filled with data (c, c, d and d) that has been previously stored in the Overlap Memory OM. Then, for iterations 5 to 8 (it5 to it8), one sample is read from the IPM Memory (i.e. samples 1, 5, 2 and 6, indicated by a special diamond-shaped symbol) and one output sample is created (i.e. 3, 4, 5, and 6), which is stored at the corresponding position in the same IPM memory. Finally, during iterations 9 to 12 (it 9–12), the content of the Filtering Memory FM is flushed to the Overlap Memory of the current level. As shown in FIG. 26C, this process is repeated as many times as the number of levels. The number of samples to process increases with a factor two, as shown by the diamond-shaped symbols in FIG. 26C. The above process is repeated for all blocks, tree by tree, resulting in the full inverse wavelet transform.

Similar to the process of the one-dimensional inverse wavelet transform, the extension to a two-dimensional inverse wavelet transform is calculated by applying two-dimensional filtering operations from the highest down to the lowest level. To reduce the memory requirements, the reconstruction is preferably performed block-by-block. At the borders of the reconstructed image, the reconstructed blocks do not have the same size as those inside the body of the reconstructed image. Border image blocks are referred to as (α,α), (α, β), . . . ($\bar{\alpha},\bar{\alpha}$), as shown in FIG. 28G.

In the following reference will be made to the decoding of a multi-level representation of an image in order to reconstruct the image. The present invention is not limited to the specific memories described in the following—these are provided in order to explain the procedure. For two or more dimensions these memories are preferably memory arrays, e.g. RAM. The skilled person will appreciate that the memories mentioned may be implemented in several different ways, each of which is an embodiment of the present invention. In two dimensions data is required from the current tree for the block as well as the two trees from adjacent blocks in the column and row directions, respectively. Each triple of Trees (each including Low-High, High-Low and High-High values) and one DC value reconstruct exactly one additional steady-state (β,β)-image block, by applying one-dimensional filtering operations horizontally and vertically on a triple of Temporal Trees (see FIG. 28C), that are constructed from a triple of Topological Trees (FIG. 28A) by applying the process of FIG. 26A both horizontally (see FIG. 28A) and vertically (see FIG. 28B) on horizontal and Vertical Tree Memories TM. The Temporal tree is skewed in both dimensions with respect to the Topological tree.

The samples of the Tree triple of FIG. 28C are rearranged in one block, as in FIG. 13a, creating the data of the Inter-Pass Memory IPM of FIG. 28D. This data is processed in each direction by a one-dimensional filtering process, similar to that of FIG. 26C and FIG. 27, using Overlap Memories in all directions: OM horizontal for the horizontal filtering (FIG. 28E) and OM vertical for the vertical filtering (FIG. 28F). This creates exactly one correct inverse wavelet transformed data block in the final image (see FIG. 28G).This process is then repeated with all incoming trees to generate all the blocks of the reconstructed image, i.e. to create the inverse wavelet transformed image.

Figure 29:
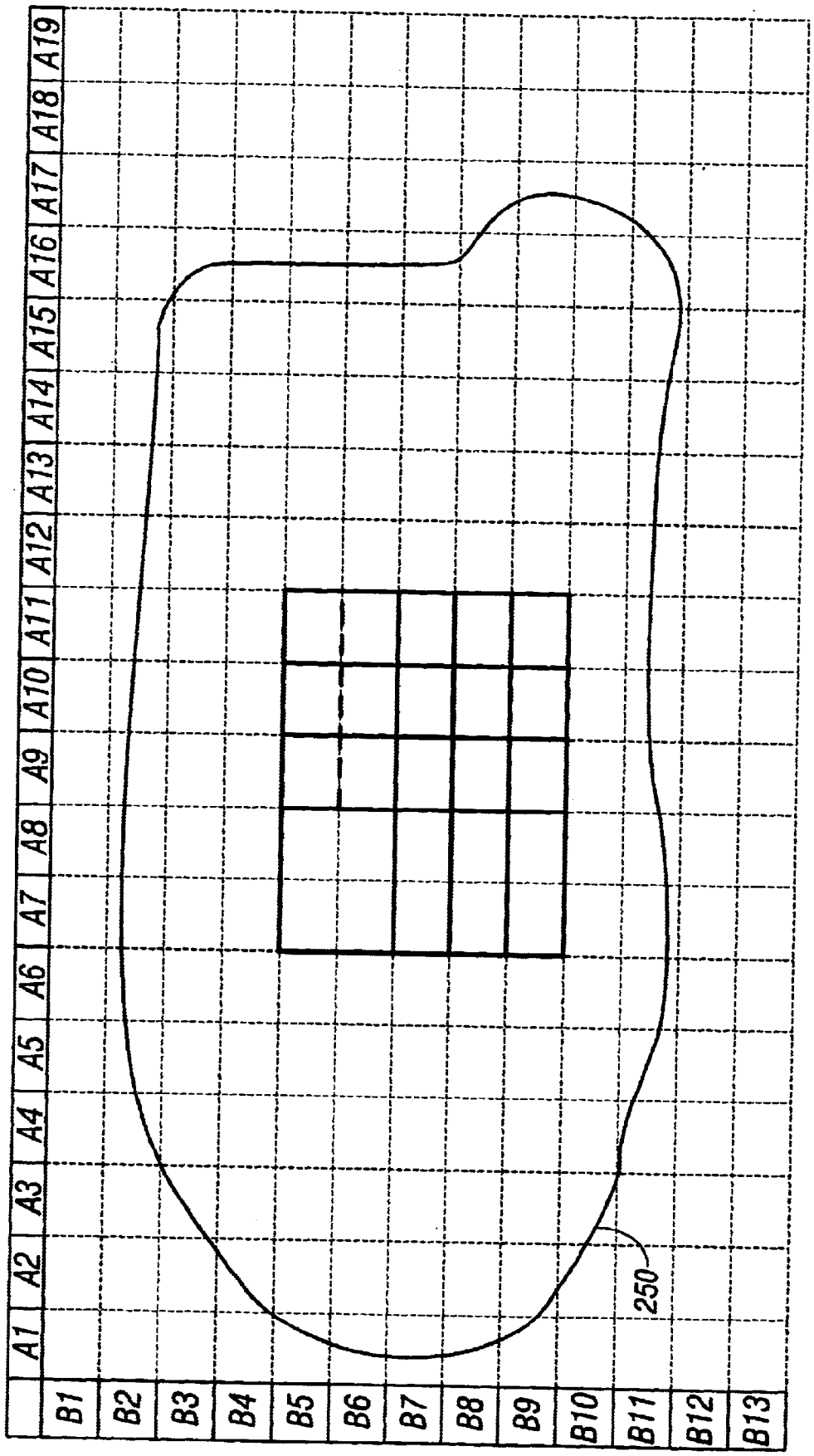
FIG. 29 shows a regular subdivision of a texture map which may be used with the present invention.

An application of the present invention will now be described. Compression and decompression of the image data will not be described. FIG. 29 shows a texture map 250 within an area subdivided into blocks. Texture map 250 contains the data for the display of the texture of a three-dimensional object, e.g. within a game. As the object is three-dimensional the texture map 250 contains all the information for the complete surface of the object. In the first display of the object, not all of the surface of the object can be seen, hence the decoder requests from the encoder the part of the texture map which is relevant. We will assume this texture image is smaller than the rectangular area defined by the corners A7B5; A11B5, A7B9 and A11B9. Instead of encoding and transmitting the complete image, the encoder in accordance with the present invention may start processing within the image. For instance, processing may start with a basic seed region made up of the blocks A7B5, A8B5, A7B6 and A8B6 (α2-mode). After processing this basic seed region in all dimensions and levels and storing and/or transmitting the resulting tree components and Lowpass values, the processing of the first supplementary seed region begins, e.g. A9B5+A9B6 (alternatively it could start with A7B7+A8B7). After processing this supplementary seed region in all dimensions and levels and storing and/or transmitting components of one further tree, the second supplementary seed region A7B7+A8B7 is traversed in all levels and dimensions and the resulting tree components stored and/or transmitted. Next the steady state blocks are processed while creating a supplementary region as required, e.g. A10B5+A10B6 followed by A10B7; A11B5+A10B6 followed by A11B7; A7B8+A8B8 followed by A9B8, A10B8, A11B8; A7B9+A8B9 followed by A9B9, A10B9, A11B. As explained above a single tree is used to generate one further block of the reconstructed image but the present invention is not limited thereto. Coloured images may be separated into their individual colour components and each colour component image processed separately. When the encoder stops processing at the end of the last region, all the data already received which belongs to the non-reconstructed regions adjacent to the regions just reconstructed is stored so that processing with the former may continue at any time.

Let us assume that the object in the display is moved so that new areas of texture must be transmitted. If the new areas are on the right of the already transmitted area the processing may be continued by starting with the supplementary seed region A12B5+A12B6. Alternatively, if the new area is at the bottom of the already transmitted region, the processing may continue with the supplementary seed region A7B10+A8B10. If the new area is on the left or at the top of the already transferred image, the boundary values in all levels on the left hand or top boundary must be recalled from memory (if they have been stored during processing of the basic seed and supplementary seed regions). Alternatively a new basic seed region may need to be created.

If the new area is far from already transmitted region then a new basic seed region may need to be created. However, when the object moves, the method and filtering apparatus in accordance with the present invention is capable of transmitting selected data which provides a high quality image without block effects and without requiring the processing and/or transmission of large quantities of data not relevant to the currently displayed objects.

From the above description it should be clear that the present invention provides a flexible way of coding and compressing parts of images or complete images in a memory and memory access efficient way. Further it allows transmission of any small area of an image in the highest resolution available—it is only necessary to create and process the appropriate basic seed and supplementary seed regions and to then process the required number of steady state blocks. Further, the present invention allows transmission of only a low resolution image and then to await the selection of a small zone for high definition display. On receipt of the demand for a high definition of the small zone, the encoder sends the tree components necessary to reconstruct and display this small zone.

Although the specific embodiments have been described with respect to particular applications, modifications and changes of the illustrated embodiments lie within the scope of the invention. In particular, the above encoder and decoder have been described without detailed reference to compression of the data. The present invention includes encoding the data, compressing the data, transmitting the data to a receiver, followed by decompressing and decoding the data in the receiver, whereby at least one of the encoding and decoding steps is carried out in accordance with the present invention. Similarly, the present invention includes combined encoders and compression circuits as well as combined decompression circuits and decoders, whereby the encoders and/or decoders are in accordance with the present invention. Further, the present invention has mainly been described with reference to generation, transmission and decoding of complete trees, but the present invention also includes generation, transmission and decoding of parts of trees, that is of data clusters, for example a particular selection of lowpass and highpass values from the iterative multi-level filtering step.

Any limitations to the scope of this invention are not intended by the illustrated embodiments and/or specific configurations, architectures, etc. described above, and the invention is only to be limited by the scope of the appended claims.

TABLE 1

Latencies $\alpha_i$ and associated tree memory requirements $\sigma_i$ for a 1D, i-level, n/m-tap wavelet transform (n and m represent the number of taps of respectively the Lowpass and Highpass filter).

| Level i | 3/3-tap wavelet | | 9/7-tap wavelet | | 9/7-tap wavelet with lifting scheme[2] | |
|---|---|---|---|---|---|---|
| | $\alpha_i$ | $\sigma_i$ | $\alpha_i$ | $\sigma_i$ | $\alpha_i$ | $\sigma_i$ |
| 1 | 2 | 1 | 5 | 1 | 6 | 1 |
| 2 | 7 | 3 | 13 | 6 | 16 | 7 |
| 3 | 15 | 10 | 29 | 19 | 36 | 23 |
| 4 | 31 | 25 | 61 | 48 | 76 | 59 |
| 5 | 63 | 56 | 125 | 109 | 156 | 135 |

TABLE 2

VLSI cost in gates for basic functionalities.

| | Number of gates |
|---|---|
| 16 × 16 bit multipliers | 2000 |
| 16 bit adder | 160 |
| 16 bit delay element | 160 |
| 3-input 16-bit MUX | 70 |

TABLE 3

Assessments of the arithmetic and memory cost in the multi-processor and single processor architectures of FIG. 5 (a, b and c). Each configuration can be in Single-I/O mode (S), with 1 input and 1 output channel, or in Multiple-I/O mode (M) with as many I/O channels as levels ($\delta = 0$ in S-mode, $\delta = 1$ in M-mode).

| Implementation style | Multi-processor a | Single-processor b | Single-processor c |
|---|---|---|---|
| Foreground filtering mem. | L · (2M + 1) | L · (2M + 1) | 2M + 1 |
| Multipliers cost | L · (2M + 1) | 2M + 1 | 2M + 1 |
| Adders cost | L · 2M | 2M | 2M |
| Arithmetic cycle cost | 1 cycle per output | ≈2 cycles per output | ≈2 cycles per output |
| Multiplexer cost | 0 | (2M + 1)*L-input + L-output | δ*L-input + δ*L-output |
| Memory read access cost (refinement: see section 7) | 1 per output | 1 per output | Without level switching: 1 per output With level switching: 2M + 1 per output |

TABLE 4

Theoretical number of read accesses per output sample in the 1D MTA schedule and the 2D Block-based approach, for a 4-level, 2M + 1-tap wavelet decomposition, with $N_L$ parent-pixels in each block.

|  | 1D (optimal value = 2) | | | | 2D (optimal value = 2.67) | | | |
| --- | --- | --- | --- | --- | --- | --- | --- | --- |
|  | $N_L = 1$ | $N_L = 2$ | $N_L = 4$ | $N_L = 8$ | $N_L = 1$ | $N_L = 2$ | $N_L = 4$ | $N_L = 8$ |
| M = 1 | 2.5 | 2.25 | 2.125 | 2.063 | 3.17 | 2.92 | 2.795 | 2.733 |
| M = 2 | 3 | 2.5 | 2.25 | 2.125 | 3.67 | 3.17 | 2.92 | 2.795 |
| M = 3 | 3.5 | 2.75 | 2.375 | 2.118 | 4.17 | 3.42 | 3.045 | 2.858 |
| M = 4 | 4 | 3 | 2.5 | 2.25 | 4.67 | 3.67 | 3.17 | 2.92 |

TABLE 5

Parameter settings for 1D schedules in the evaluation of the mathematical formulae of Table 6 and Table 7.

|  | $n_{i,A}$ | $n_{i,B}$ | $n_1 = n_{i,A} + n_{i,B}$ |
| --- | --- | --- | --- |
| HTA | — | — | 1 |
| RPA | — | — | $L_i$ |
| MRPA | — | — | $L_i$ for $i \neq 1$; $L_1/2$ for $i = 1$ |
| MTA | 2 | $\dfrac{N - \alpha_L}{N_L \cdot 2^L}$ | $2 + \dfrac{N - \alpha_L}{N_L \cdot 2^L}$ |

TABLE 6

Memory cost for 1D-DWT in the configuration of FIG. 5(c), using different schedules

|  | a) HTA | b) VTA (RPA) | c) VTA (MRPA) | d) MTA (min $N_L$; $N_L = 1$ for DWT, $N_L = 8$ for DCT) |
| --- | --- | --- | --- | --- |
| 1) Foreground Filtering Mem. | 2M + 1 | 2M + 1 | 2M + 1 | 2M + 1 |
| 2) Background Filtering Mem. | N | $L \cdot 2M$ | | $\left\{ \begin{array}{ll} \dfrac{\alpha_L - \alpha_1}{2} + 1 + (N_L - 1) \cdot 2^{L-1} & \text{in } \alpha, \overline{\alpha} \\ N_L \cdot 2^{L-1} & \text{in } \beta \end{array} \right\} + L \cdot 2M$ |
| 3) Foreground Tree Mem. | — | $2^L - 1$ | | $N_L \cdot (2^L - 1)$ |
| 4) Background Tree Mem. | $N - \dfrac{N}{2^L} \approx N$ | $\sigma_L - (2^L - 1)$ | | $\sigma_L - (2^L - 1)$ |
| 5) Foreground Interface Mem. | — | $2^L - 1$ | | $N_L \cdot (2^L - 1)$ |
| 6) Background Interface Mem. | N | — | | — |
| 7) Filtering Read accesses per Highpass output | $\dfrac{2ML}{N} + 2$ | 2M + 2 | $\dfrac{3M}{2} + 2$ | $\dfrac{4ML}{N} + \dfrac{N - \alpha_L}{N} \cdot \dfrac{2ML}{N_L \cdot 2^L} + 2$ |
| 8) Filtering Read accesses per Highpass output | 2 | 2M + 2 | $\dfrac{3M}{2} + 2$ | $\dfrac{2ML}{N_L \cdot 2^L} + 2$ |
| 9) Tree formation | Bursty | Uniform | | Uniform |

$$\sigma_L = \sum_{i=1}^{L} \left\{ \dfrac{\alpha_L - \alpha_i}{2^i} + 1 \right\} = M \cdot (2^L - L - 1) + L \quad \text{(see Table 1)}$$

| Bursty |  |
| --- | --- |
| Uniform | 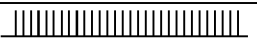 |

TABLE 7

Memory cost for 2D-DWT with different schedules. The final schedule corresponds to the Block-based approach

| | a) Row-Column | b) Row-Row (level by level) | c) Row-Row (with RPA) | d) Row-Row (with MRPA) | e) Block-based (min $N_L$; $N_L = 1$ for DWT, $N_L = 8$ for DCT) |
|---|---|---|---|---|---|
| 1) Foreground Filtering Mem. | $2M + 1$ | $2M + 1$ | $2M + 1$ | $2 \cdot (2M + 1)$ | $2M + 1$ |
| 2) Background Filtering Mem. | $N^2$ | $2MN + \dfrac{N^2}{4}$ | $4MN$ | | $\left\{\dfrac{\alpha_L - \alpha_1}{2} + 1 + (N_L - 1) \cdot 2^{L-1}\right\}^2$ (1) $\left\{N_L \cdot 2^{L-1}\right\}^2$ (2) $+4MN$ (3) $+2M\sigma_L$ (4) |
| 3) Foreground Tree Mem. | — | — | $4^L = 1$ | | $N_L^2 \cdot (4^L - 1)$ |
| 4) Background Tree Mem. | $N^2$ | $N^2$ | $3 \cdot N \cdot \theta_L - (4^L - 1)$ | | $3 \cdot N \cdot \theta_L + N \cdot (N_L - 1) \cdot 2^L - N_L^2 (4^L - 1)$ |
| 5) Foreground Interface Mem. | — | — | $4^L - 1$ | | $N_L^2 \cdot (4^L - 1)$ |
| 6) Background Interface Mem. | $N^2$ | $N^2$ | $\left(\dfrac{N}{2^L} - 1\right) \cdot (4^L - 1)$ | | — |
| 7) Filtering Read accesses pernl Highpass output | $\dfrac{8M}{N} + \dfrac{8}{3}$ | $\dfrac{8}{3} \cdot (M+1)$ | $\dfrac{8}{3} \cdot (M+1)$ | $\dfrac{13}{6} \cdot M + \dfrac{8}{3}$ | $\dfrac{8M}{N} + \dfrac{N - \alpha_L}{N} \cdot \dfrac{8M}{N_L \cdot 2^L} + \dfrac{8}{3}$ |
| 8) Filtering Read accesses per Highpass for $N \to \infty$ | $\dfrac{8}{3}$ | $\dfrac{8}{3} \cdot (M+1)$ | $\dfrac{8}{3} \cdot (M+1)$ | $\dfrac{13}{6} \cdot M + \dfrac{8}{3}$ | $\dfrac{8M}{N_L \cdot 2^L} + \dfrac{8}{3}$ |
| 9) Tree formation | Bursty | Bursty | Band-Bursty | | Uniform |

$$\theta_L = \sum_{i=1}^{L} \left\{\left(\dfrac{\alpha_L - \alpha_i}{2^i} + 1\right) \cdot \dfrac{1}{2^i}\right\} \approx \dfrac{\alpha_L - 2M + 2}{3}$$

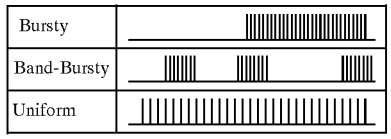

TABLE 11 switch positions for a single-processor implementation. i = Level iterator (i = 1 ... L). j = dimension iterator (j = 1 ... N).

| Switch | status 1 | status 0 |
|---|---|---|
| SA | otherwise | (i==1) and (j==1) |
| SB | (i>1) and (j==1) | otherwise |
| SC | j==N | otherwise |

TABLE 11-continued switch positions for a single-processor implementation. i = Level iterator (i = 1 ... L). j = dimension iterator (j = 1 ... N).

| Switch | status 1 | status 0 |
|---|---|---|
| SD | (j==N) and (i==L) | otherwise |
| SE | (j==N) and (i==L) | otherwise |
| SF | (j==N) and (i==L) | otherwise |

TABLE 8

| | | | | | | | β-mode in dimension j | | | | |
|---|---|---|---|---|---|---|---|---|---|---|---|
| Step | control | Sa | Sb | Sc | Sd | # cycles | Overlap Memory (R/W/x, level) | Inter-Pass Memory (R/W/x) | Input (R/x) | Dataflow paths | Function | Performed actions |
| 1 | i = 1 | | | | | | | | | | Prepare the creation of level 1 | |
| 2 | | x | 0 | 0 | 0 | 2M | R(0) | x | x | A1 | | Load data from the overlap memory of the input level into the filter FIFO |

TABLE 8-continued

β-mode in dimension j

| Step | control | Sa | Sb | Sc | Sd | # cycles | Overlap Memory (R/W/x, level) | Inter-Pass Memory (R/W/x) | Input (R/x) | Dataflow paths | Function | Performed actions |
|---|---|---|---|---|---|---|---|---|---|---|---|---|
| 3 | | 0 | 1 | 0 | 1 | $N_L \cdot 2^L$ | x | W | R | C + B2 | | Load data from input, perform the filtering and write results in the IPM |
| 4 | | x | 0 | 1 | 0 | 2M | R(i), W(i − 1) | x | x | A1 + A2 | Prepare the creation of next level | Load data from the overlap memory of the current level into the filter FIFO for preparing the creation of the next level. Copy the last filter FIFO register into the overlap memory of the previous level for preparing the overlap with the adjacent block in the same level (at a much later stage). |
| 5 | | 1 | 1 | 0 | 1 | $N_L \cdot 2^{L-1}$ | x | R/W | x | B1 + B2 | The creation of next level is actually started. | Load data from the IPM, perform the filtering and write results at the same place in the IPM |
| 6 | i++; if (i > L) break; else goto step 4; | | | | | | | | | | | |

TABLE 9

α-mode (α2) within the image (full loading of 2M + 1 input values before starting the filtering) in dimension j

| Step | control | Sa | Sb | Sc | Sd | # cycles | Overlap Memory (R/W/x, level) | Inter-Pass Memory (R/W/x) | Input (R/x) | Dataflow paths | Function | Performed actions |
|---|---|---|---|---|---|---|---|---|---|---|---|---|
| 1 | i = 1 | | | | | | | | | | Prepare the creation of level 1 | |
| 2 | | 0 | 1 | 0 | 0 | 2M | x | x | R | C | | Load data from the input into the filter FIFO, without performing any calculations |
| 3 | | 0 | 1 | 0 | 1 | $\alpha_L^2 - (2M + 1)$* | x | W | R | C + B2 | | Load data from input, perform the filtering and write results in the IPM |
| 4 | | 1 | 1 | 1 | 0 | 2M | W(i − 1) | R | x | A1 + B2 | Prepare the creation of next level | Load data from the IPM of the current level into the filter FIFO for preparing the creation of the next level. Copy the last filter FIFO register into the overlap memory of the previous level for preparing the overlap with the adjacent block in the same level (at a much later stage). |
| 5 | | 1 | 1 | 0 | 1 | $\dfrac{\alpha_L^2 - \alpha_i^2}{2^i - 2M}$ | x | R/W | x | B1 + B2 | The creation of next level is actually started. | Load data from the IPM, perform the filtering and write results at the same place in the IPM |
| 6 | i++; if (i > L) break; else goto step 4; | | | | | | | | | | | |

*Note: $\alpha_i^2$ represents the number of values which have to be read in the input level in order to create the first value in level i in the α2 mode

TABLE 10

α-mode (α1) at the image borders (symmetrical extension, zero-padding, . . . ) in dimension j

| Step | control | Sa | Sb | Sc | Sd | # cycles | Overlap Memory (R/W/x, level) | Inter-Pass Memory (R/W/x) | Input (R/x) | Dataflow paths | Function | Performed actions |
|---|---|---|---|---|---|---|---|---|---|---|---|---|
| 1 | i = 1 | | | | | | | | | | Prepare the creation of level 1 | |
| 2a | | 0 | 1 | 0 | 0 | M + 1 | x | x | R | C | | Load data from the input into the filter FIFO, without performing any calculations |

TABLE 10-continued

α-mode (α1) at the image borders (symmetrical extension, zero-padding, ...) in dimension j

| Step | control | Sa | Sb | Sc | Sd | # cycles | Overlap Memory (R/W/x, level) | Inter-Pass Memory (R/W/x) | Input (R/x) | Data-flow paths | Function | Performed actions |
|---|---|---|---|---|---|---|---|---|---|---|---|---|
| 2b | | x | 2 | 0 | 0 | M − 1 | x | x | x | x | Symmetrical copy of the filter values | Symmetrically copy M-1 coefficients without any filter calculation. |
| 2c | | x | 2 | 0 | 1 | 1 | x | W | x | B2 | | Symmetrically copy the Mth input value and perform 1 filter calculation |
| 3 | | 0 | 1 | 0 | 1 | $*$ $\alpha_L^1$ | x | W | R | C + B2 | | Load data from input, perform the filtering and write results in the IPM |
| 4a | | 1 | 1 | 1 | 0 | M + 1 | W(i-1) | R | X | A1 + B1 | Prepare the creation of next level | Load data from the IPM of the current level into the filter FIFO for preparing the creation of the next level. Copy the last filter FIFO register into the overlap memory of the previous level for preparing the overlap with the adjacent block. |
| 4b | | x | 2 | 1 | 0 | M − 1 | W(i − 1) | x | x | A1 | | The Overlap Memory was not completely finished in previous step. This action is continued, while providing symmetrical extension in the FIFO filter structure. |
| 4c | | x | 2 | 0 | 1 | 1 | x | W | x | B2 | | The symmetrical extension is finalized and the first filtered value is output |
| 5 | | 1 | 1 | 0 | 1 | $\dfrac{\alpha_L^1 - \alpha_i^1}{2^i - M}$ | x | R/W | x | B1 + B2 | The creation of next level is actually started. | Load data from the IPM, perform the filtering and write results at the same place in the IPM |
| 6 | i++; if (i > L) break; else goto step 4a; | | | | | | | | | | | |

*Note: $\alpha_i^1$ represents the number of values which have to be read in the input level in order to create the first value in level i in the α1 mode

What we claim is:

1. A method of multi-level iterative digital filtering of a data structure, whereby the elements of the data structure form the zero layer in the zero level and the data layer each subsequent level is given by the results of one iteration, comprising:
   subdividing each level into a plurality of regions, there being data dependency between the data in one data layer in one level and the data layers in any other level of a region;
   filtering each level by lapped-region processing; and
   scheduling the data processing of each level to provide substantially regional synchronization of the filtering at each level.

2. The method of claim 1, wherein the output from the filtering is a multiresolutional data structure.

3. The method of claim 1, wherein said filtering includes calculating and outputting a first data layer in a first level from filtering on the zero data layer in the zero level of a first region as well as substantially all the other data layers in the other levels of the first region before outputting any data layer of a second region.

4. The method of claim 1, wherein each region may contain one or more blocks.

5. The method of claim 4, additionally comprising block dependent expanding data dependencies between two data layers in two successive levels.

6. The method of claim 5, wherein the outputs from processing the blocks are scheduled to occur at substantially equal time intervals.

7. The method of claim 1, wherein the filtering includes traversing the data of one data layer in one level before traversing the data layer of the next level.

8. The method of claim 1, wherein the data structure has a plurality of dimensions and the filtering includes traversing the data of one data layer in one dimension before traversing the data layer in the next dimension.

9. A method of multi-level iterative digital filtering of a data structure, whereby the elements of the data structure form the zero layer in the zero level and the data layer in each subsequent level is given by the results of one iteration, comprising:
   subdividing each level into a plurality of regions, there being data dependency between the data in one data layer in one level and the data layers in any other level of a region;
   filtering each level by lapped-region processing; and
   selecting the sequence for traversing the regions so that outputs from processing the regions are scheduled to occur at substantially equal time intervals.

10. The method of claim 9, wherein the output from the filtering is a multiresolutional data structure.

11. The method of claim 9, wherein said filtering step includes calculating and outputting a first data layer in a first level from filtering on the zero data layer in the zero level of a first region as well as substantially all the other data layers in the other levels of the first region before outputting any data layer of a second region.

12. The method of claim 9, wherein each region may contain one or more blocks.

13. The method of claim 12, additionally comprising block dependent expanding data dependencies between two data layers in two successive levels.

14. The method of claim 13, wherein the outputs from processing the blocks are scheduled to occur at substantially equal time intervals.

15. The method of claim 9, wherein the filtering includes traversing the data of one data layer in one level before traversing the data layer of the next level.

16. The method of claim 9, wherein the data structure has a plurality of dimensions and the filtering includes traversing the data of one data layer in one dimension before traversing the data layer in the next dimension.

17. The method of multi-level iterative digital filtering of a data structure, whereby the elements of the data structure form the zero layer in the zero level and the data layer in each subsequent level is given by the results of one iteration, comprising:

subdividing each level into a plurality of regions, there being data dependency between the data in one data layer in one level and the data layers in any other level of a region; filtering each level by lapped-region processing;

stopping the processing at the end of one region; and storing the data relating to data dependencies included in adjacent unprocessed regions.

18. The method of claim 17, wherein the output from the filtering is a multiresolutional data structure.

19. The method of claim 17, wherein said filtering includes calculating and outputting a first data layer in a first level from a filtering on the zero data layer in the zero level of a first region as well as substantially all the other data layers in the other levels of the first region before outputting any data layer of a second region.

20. The method of claim 17, wherein each region may contain one or more blocks.

21. The method of claim 20, additionally comprising block dependent expanding data dependencies between two data layers in two successive levels.

22. The method claim 21, wherein the outputs from processing the blocks are scheduled to occur at substantially equal time intervals.

23. The method of claim 17, wherein the filtering includes traversing the data of one data layer in one level before traversing the data layer of the next level.

24. The method of claim 17, wherein the data structure has a plurality of dimensions and the filtering includes traversing the data of one data layer in one dimension before traversing the data layer in the next dimension.

25. A method of multi-level iterative filtering of a multi-level representation of a data structure to reconstruct the data structure, the multi-level representation including data clusters, comprising:

receiving the multi-level representation;

filtering the multi-level representation by lapped-cluster processing; and scheduling the filtering process so that substantially only the data which is required for reconstructing a region of the data structure is processed before beginning with the filtering to reconstruct the next region of the data structure.

26. The method of claim 25, wherein the filtering includes traversing the data of one data layer in one level before traversing the data layer of the next level.

27. The method of claim 25, wherein the data structure has a plurality of dimensions and the filtering includes traversing the data of one data layer in one dimension before traversing the data layer in the next dimension.

28. The method of claim 25, additionally comprising: stopping the processing at the end of one reconstructed region; and storing the data relating to data dependencies required for the processing of adjacent unprocessed regions.

29. A filtering apparatus for multi-level iterative digital filtering of a data structure, whereby the elements of the data structure form the zero level and each subsequent level is defined by the results of one iteration, comprising:

a control means for subdividing the data layer of each level into a plurality of regions, there being data dependency between the data in one data layer in one level and the data layers in any other level of a region; and a filtering module for filtering each level by lapped-region processing, said filter module being adapted to schedule the data processing of each level to provide substantially regional synchronization of the filtering at each level.

30. The apparatus of claim 29, wherein said filtering module is adapted to traverse the data of one data layer in one level before traversing the data layer of the next level.

31. The apparatus of claim 29, wherein the data structure has a plurality of dimensions and said filtering module is adapted to traverse the data of one data layer in one dimension before traversing the data layer in the next dimension.

32. A filtering apparatus for multi-level iterative digital filtering of a data structure, whereby the elements of the data structure form the zero level and each subsequent level is defined by the results of one iteration, comprising:

a control means for subdividing the data layer of each level into a plurality of regions, there being data dependency between the data in one data layer in one level and the data layers in any other level of a region; and a filtering module for filtering each level by lapped-region processing, said filter module being adapted to stop the processing at the end of one region and to store the data relating to data dependencies included in adjacent unprocessed regions.

33. The apparatus of claim 32, wherein said filtering module is adapted to traverse the data of one data layer in one level before traversing the data layer of the next level.

34. The apparatus of claim 32, wherein the data structure has a plurality of dimensions and said filtering module is adapted to traverse the data of one data layer in one dimension before traversing the data layer in the next dimension.

35. A filtering apparatus for multi-level iterative digital filtering of a multi-level representation of a data structure to reconstruct the data structure, the multi-level representation including data clusters, comprising:

a filtering module for filtering the multi-level representation by lapped-cluster processing, a controller for controlling the flow of data through said filtering module, said controller being adapted to schedule the data processing in said filtering module so that substantially only the data which is required for reconstructing a region of the data structure is processed before beginning with the filtering process to reconstruct the next region of the data structure.

36. The apparatus of claim 35, said filtering module is adapted to traverse the data of one data layer in one level before traversing the data layer of the next level.

37. The apparatus of claim 35, wherein the data structure has a plurality of dimensions and said filtering module is adapted to traverse the data of one data layer in one dimension before traversing the data layer in the next dimension.

38. A filtering apparatus for multi-level iterative digital filtering of a multi-level representation of a data structure to reconstruct the data structure, the multi-level representation including data clusters, comprising:
- a filtering module for filtering the multi-level representation by lapped-cluster processing,
- a controller for controlling the flow of data through said filter module, said controller being adapted to stop the processing at the end of one region and to store the data relating to the data dependencies included in adjacent non-reconstructed regions.

39. The apparatus of claim 38, said filtering module is adapted to traverse the data of one data layer in one level before traversing the data layer of the next level.

40. The apparatus of claim 38, wherein the data structure has a plurality of dimensions and said filtering module is adapted to traverse the data of one data layer in one dimension before traversing the data layer in the next dimension.

* * * * *